United States Patent [19]

Gotou

[11] Patent Number: 5,959,418
[45] Date of Patent: Sep. 28, 1999

[54] MOTOR WITH ELECTRONIC DISTRIBUTING CONFIGURATION

[75] Inventor: Makoto Gotou, Nishinomiya, Japan

[73] Assignee: Matsushita Electric Industrial Co., Ltd., Osaka-fu, Japan

[21] Appl. No.: 09/018,301

[22] Filed: Feb. 5, 1998

[30] Foreign Application Priority Data

| Feb. 7, 1997 | [JP] | Japan | 9-024917 |
| May 15, 1997 | [JP] | Japan | 9-125341 |
| Sep. 5, 1997 | [JP] | Japan | 9-240671 |

[51] Int. Cl.$^6$ ........................................ H02P 1/00
[52] U.S. Cl. ................................ 318/254; 318/138
[58] Field of Search .................... 318/138, 254, 318/439, 800, 801, 807–811; 363/34, 37, 74, 95–97, 131–132

[56] References Cited

U.S. PATENT DOCUMENTS

| 4,359,674 | 11/1982 | Gotou . |
| 4,494,053 | 1/1985 | Gotou . |
| 4,535,276 | 8/1985 | Yokobori . |
| 4,855,652 | 8/1989 | Yamashita et al. . |
| 5,661,382 | 8/1997 | Enami et al. . |

FOREIGN PATENT DOCUMENTS

| 0 482 913 A2 | 10/1991 | European Pat. Off. . |
| 0 505 577 A1 | 9/1992 | European Pat. Off. . |
| 0 663 718 A2 | 1/1995 | European Pat. Off. . |
| 0 753 933 A1 | 1/1996 | European Pat. Off. . |
| 56-123791 | 9/1981 | Japan . |
| 59-122395 | 7/1984 | Japan . |
| 07046877 | 2/1995 | Japan . |

Primary Examiner—William M. Shoop, Jr.
Assistant Examiner—Rina I. Duda
Attorney, Agent, or Firm—Panitch Schwarze Jacobs & Nadel, P.C.

[57] ABSTRACT

As shown in FIG. 9, a switching control part 310 detects voltage drops of FET power transistors 81 to 83, and outputs a switching control signal Vd responding with a modulated signal changed in synchronization with a movement of a motor, and a detected operation voltage. The switching operation of a switching transistor 61 is controlled responding with the switching control signal Vd, so that a converted DC voltage of a voltage converting part 52 is controlled. The converted DC voltage of the voltage converting part is supplied to power amplifying parts 11 to 17. The power amplifying parts configured by FET power current-mirror circuits analoguely alter current paths from the converted DC voltage of the voltage converting part to three-phase windings 2, 3, and 4, whereby pulsation of drive currents I1, I2, and I3 to the windings is reduced and a motor vibration is decreased in level.

47 Claims, 22 Drawing Sheets

MOTOR WITH ELECTRONIC DISTRIBUTING CONFIGURATION

BACKGROUND OF THE INVENTION

The invention relates to a motor in which a current path is electronically altered by means of plural transistors.

Recently, motors in which a current path is electronically altered by means of plural transistors have been widely used as driving motors for an OA apparatus or an AV apparatus. In a prior art example of such a motor, a current path to windings is electronically altered by using PNP-type and NPN-type power transistors.

FIG. 25 shows a motor of the prior art. The operation of the motor will be briefly described. A rotor 2011 has a field part configured by permanent magnets. A position detecting block 2041 produces two sets of three-phase voltage signals K1, K2, and K3, and K4, K5, and K6, responding with the rotation of the rotor 2011. A first distributing block 2042 produces three-phase lower-side conduction control signals L1, L2, and L3 responding with the voltage signals K1, K2, and K3, to control the conduction of lower-side NPN-type bipolar power transistors 2021, 2022, and 2023. A second distributing block 2043 produces three-phase upper-side conduction control signals M1, M2, and M3 responding with the voltage signals K4, K5, and K6, to control the conduction of upper-side PNP-type power transistors 2025, 2026, and 2027. According to this configuration, three-phase drive voltages are supplied to windings 2012, 2013, and 2014.

However, this prior art motor has the following problems.

(1) Large Power Loss

In the configuration of the prior art, the emitter-collector voltages of the NPN-type power transistors 2021, 2022, and 2023, and the PNP-type power transistors 2025, 2026, and 2027 are analoguely controlled so as to supply drive currents of an amplitude required for the windings 2012, 2013, and 2014. In each of the power transistors, therefore, the voltage drop across the power transistor is large, and a large power loss is generated by a product of the voltage and the current of the power transistor. Particularly, the drive currents of the motor windings are large and the power loss is extremely large. As a result, the motor has a very low power efficiency.

(2) High Production Cost

In order to reduce the production cost, it is effective to assemble transistors, resistors, and other devices into a one-chip integrated circuit (IC). However, the formation of the PNP-type power transistors 2025, 2026, and 2027 requires a large chip area, thereby producing a large factor of increasing the production cost. Because of an effect due to a parasitic capacitance formed as a result of the integration, the PNP-type power transistors are difficult to operate at a high speed. Since the power transistors consume a large power and generate a large amount of heat, moreover, it is difficult to integrate power transistors into one chip. Particularly, the drive currents of the motor windings are large and hence there is a high risk that heat generated by the power transistors causes a thermal breakdown of an integrated circuit to occur. When a heat radiating plate is attached to an integrated circuit in order to prevent a thermal breakdown from occurring, the production cost is greatly increased.

(3) Large Motor Vibration

In recent optical disk apparatuses such as a DVD-ROM or magnetic disk apparatuses such as an HDD, a motor with small vibration has been requested as development of recording and/or playbacking of a high-density disk. In the configuration of the prior art, however, rapid switching of a power transistor causes a spike voltage to be produced in a winding, thereby pulsating the drive current. As a result, the generated force of the motor is pulsated and a large motor vibration occurs.

It has been eagerly desired to develop a motor in which each of or all of these problems are solved.

The object of the present invention is to dissolve the above-mentioned various problems one by one or at the same time, and to provide a motor which is suitable for combination with an integral circuit.

BRIEF SUMMARY OF THE INVENTION

A motor in accordance with the present invention comprises: movable body; plural-phase windings; voltage supplying means for supplying a DC voltage; Q (Q: an integer of 2 or more) pieces of first power amplifying means each including a first power transistor and forming a current path from a negative output terminal side of said voltage supplying means to one of said plural-phase windings; Q pieces of second power amplifying means each including a second power transistor and forming a current path from a positive output terminal side of said voltage supplying means to one of said plural-phase windings; altering signal producing means for producing plural-phase altering signals, first distribution control means for controlling distribution of current from said Q pieces of first power amplifying means responding with output signals of said altering signal producing means; and second distribution control means for controlling distribution of current from said Q pieces of second power amplifying means responding with output signals of said altering signal producing means; wherein, said voltage supplying means includes inductor means for storing a magnetic energy; capacitor means for storing an electric energy; switching means having a switching transistor of which current output terminal side is connected to a negative terminal side of a DC power source and a current input terminal side is connected to one end of said inductor means and performing high frequency on-off switching of a power supply path for replenishing a magnetic energy to said inductor means from said DC power source, and current path forming means forming a current path from said inductor means to a circuit including said capacitor means, by means of a complementary off-on operations corresponding to a switching on-off operations of said switching transistor, said voltage supplying means is configured so as to output a converted DC voltage between one end of said capacitor means and one end of said DC power source and supply said converted DC voltage to said Q pieces of first power amplifying means and said Q pieces of second power amplifying means, and said switching transistor, said first power transistors, said second power transistors and at least one semiconductor element are integrated together in a one-chip integrated circuit.

According to this configuration, the power losses of the first and second power transistors are largely reduced, and also the power loss of the switching transistor of the voltage supplying means is small. As a result, the power efficiency of the motor is extremely improved. Even when these power devices are integrated into one chip, the amount of generated heat is very small and a thermal breakdown of the integrated circuit does not occur. The above-mentioned configuration prevents parasitic transistor devices formed as a result of the integration, from operating. In other words, even when the switching transistor performs high-frequency switching, an undesirable operation due to parasitic transistors does not occur. Therefore, the power devices such as the switching transistor and the power transistors can be formed at a high density together with necessary semiconductor devices in a one-chip integrated circuit, with the result that a low cost motor can be realized. In a configuration wherein first and second distributed current signals analoguely varying are supplied to the conduction control terminal sides of the first and second power amplifying means, for example, bidirectional drive currents analoguely varying can be supplied to the windings, so that the drive currents are largely reduced in pulsation level. As a result, the pulsation level of the generated force is reduced and a motor of high-performance can be realized.

A motor in accordance with another aspect of the invention comprises: movable body; plural-phase windings; voltage supplying means having a switching transistor for outputting a converted DC voltage which is a conversion of a DC voltage of a DC power source by switching a power supply path of said DC power source with said switching transistor at a high frequency; Q (Q: an integer of 2 or more) pieces of first power amplifying means each including a first power transistor and forming a current path from a negative output terminal side of said voltage supplying means to one of said plural-phase windings; Q pieces of second power amplifying means each including a second power transistor and forming current path from a positive output terminal side of said voltage supplying means to one of said plural-phase windings; altering signal producing means for producing plural-phase altering signals; first distribution control means for controlling distribution of current from said Q pieces of first power amplifying means responding with output signals of said altering signal producing means; and second distribution control means for controlling distribution of current from said Q pieces of second power amplifying means responding with output signals of said altering signal producing means; and further comprises: switching control means which includes modulating means for producing a modulated signal by analoguely varying an amplitude in synchronization with a movement of said movable body, and voltage detecting means for detecting voltage drops in either said first power transistors or said second power transistors, wherein said switching control means controls switching operation of said switching transistor responding with an output signal of said voltage detecting means and an output signal of said modulating means.

According to this configuration, the power losses of the first and second power transistors and switching transistor are largely reduced, and the power efficiency of the motor is extremely improved. The voltage drop of a power transistor in the conduction state is controlled to a small value in the active operation region, and the switching operation of the switching transistor is controlled responding with the output signal of the modulating means and the output signal of the voltage detecting means. As a result, fluctuation of the voltage drop due to affection of the back electromotive force waveforms of the winding can be remarkably reduced, and the voltage drop of each power transistor can be always controlled to the minimum necessary value. Consequently, the power loss and the heat generation in a power transistor in the conduction state are further reduced.

A motor in accordance with another aspect of the invention comprises: movable body; plural-phase windings; voltage supplying means for supplying a DC voltage; Q (Q: an integer of 2 or more) pieces of first power amplifying means each including a first FET power current-mirror circuit having a first FET power transistor and forming a current path from a negative output terminal side of said voltage supplying means to one of said plural-phase windings; Q pieces of second power amplifying means each including a second FET power current-mirror circuit having a second FET power transistor and forming a current path from a positive output terminal side of said voltage supplying means to one of said plural-phase windings; altering signal producing means for producing plural-phase altering signals; first distribution control means for producing first Q-phase current signals, each analoguely varying at least in rising and falling slopes, responding with output signals of said altering signal producing means and supplying said first Q-phase current signals to conduction control terminal sides of said Q pieces of first power amplifying means, respectively; and second distribution control means for producing second Q-phase current signals, each analoguely varying at least in rising and falling slopes, responding with output signals of said altering signal producing means and supplying said second Q-phase current signals to conduction control terminal sides of said Q pieces of second power amplifying means, respectively.

According to this configuration, each of the first power amplifying means is configured by the first FET power current-mirror circuit using the first FET power transistor, and each of the second power amplifying means is configured by the second FET power current-mirror circuit using the second FET power transistor. As a result, although FET power transistors with nonlinearity and a large variation of the gain are used, the nonlinearity and variation of the current amplifying ratios among the first and second power amplifying means can be remarkably reduced. Therefore, variation of the drive currents to the windings is reduced, and a motor vibration is remarkably reduced. Furthermore, the first distribution control means and the second distribution control means produce the first Q-phase current signals and the second Q-phase current signals, each current signal varying analoguely at least in rising and falling slopes, and supply the first Q-phase current signals and the second Q-phase current signals to the conduction terminal sides of the first power amplifying means and the second power amplifying means, respectively. Therefore, the operation of altering the current paths by using Q pieces of the first FET power transistors of the first power amplifying means and Q pieces of the second FET power transistors of the second power amplifying means can be analoguely performed by the above mentioned operation of the first distribution control means and the second distribution control means, so that pulsation of the bidirectional Q-phase drive currents to the windings due to alteration of the current paths can be remarkably reduced. Consequently, a motor with reduced vibration can be realized.

A motor in accordance with still other aspect of the invention comprises: movable body; plural-phase windings; voltage supplying means for supplying a DC voltage; Q (Q: an integer of 2 or more) pieces of first power amplifying means each including a first power transistor and forming a current path from a negative output terminal side of said voltage supplying means to one of said plural-phase windings; Q pieces of second power amplifying means each including a second power transistor and forming a current path from a positive output terminal side of said voltage supplying means to one of said plural-phase windings; altering signal producing means for producing plural-phase altering signals; first distribution control means for controlling distribution of current from said Q pieces of first power amplifying means responding with output signals of said altering signal producing means; and second distribution control means for controlling distribution of current from said Q pieces of second power amplifying means responding with output signals of said altering signal producing means;

and further comprising: bypass switch means having a bypass transistor for interrupting or connecting a current path between the positive output terminal side of said voltage supplying means and a common terminal side of said plural-phase windings; shut-off means having a shut-off transistor for connecting or interrupting a current path between the positive output terminal side of said voltage supplying means and the current input terminal sides of said second power amplifying means; and diode means allowing uni-directional current flow from a current output terminal side toward a current input terminal side of at least one of said second power transistors.

According to this configuration, a motor can operate with adequately altering the first activating mode wherein bidirectional currents are supplied to the windings so as to obtain a large generated force, and the second activating mode wherein unidirectional currents are supplied to the windings so as to perform a high-speed rotation. Particularly, the diode means which is connected in the direction from the current output terminal side of the second power transistor to the current input terminal side is provided to allow a reverse current to flow in response to the back electromotive forces generated in the windings in the second activating mode. However, the reverse current flow is prevented from occurring by the shut-off transistor of the shut-off means, thereby performing the motor to normally operate. Furthermore, the motor is configured so that, when the first and second power transistors, the bypass transistor, and the shut-off transistor are integrated, for example, an undesirable operation due to many parasitic devices (including the diode means) formed in the integrated circuit is prevented from occurring, and the above-mentioned first and second activating modes are stably operated. In a configuration wherein first and second distributed current signals analoguely varying are supplied to the conduction control terminal sides of the first and second power amplifying means, for example, bidirectional or unidirectional drive currents analoguely varying can be supplied to the windings, so that the drive currents are largely reduced in pulsation level. As a result, the pulsation level of the generated force is remarkably reduced and a motor of high-performance can be realized.

A motor in accordance with still other aspect of the invention comprises: movable body; plural-phase windings; voltage supplying means for supplying a DC voltage; Q (Q: an integer of 2 or more pieces of first power amplifying means each including a first NMOS-FET power transistor and forming a current path from a negative output terminal side of said voltage supplying means to one of said plural-phase windings; Q pieces of second power amplifying means each including a second PMOS-FET power transistor and forming a current path from a positive output terminal side of said voltage supplying means to one of said plural-phase windings; altering signal producing means for producing plural-phase altering signals; first distribution control means for controlling distribution of current from said Q pieces of first power amplifying means responding with output signals of said altering signal producing means; second distribution control means for controlling distribution of current from said Q pieces of second power amplifying means responding with output signals of said altering signal producing means; power switch means having a PMOS-FET power switch transistor for connecting a power supplying path from a positive terminal side of a DC power source of said voltage supplying means toward the current input terminal sides of said Q pieces of second power amplifying means and for interrupting the power supplying path between the positive terminal side of said DC power source and the current input sides of said Q pieces of second power amplifying means when said DC power source is turned off; and voltage output means for outputting a rectified DC voltage obtained by rectifying plural-phase back electromotive forces of said plural-phase windings when said DC power source is turned off.

According to this configuration, a motor can be realized which can output a rectified DC voltage and can operate without a high-voltage outputting part. The rectified DC voltage of the motor is used for executing an emergency operation in an equipments when the DC power source is turned off. In such an emergency case, because the powerless of a high-voltage outputting part reduces the power supplied by the rectified DC voltage of the motor, it is preferable to make the motor without having a high-voltage outputting part. Further, the motor has an advantage of reducing a number of components (especially, capacitors) by omitting a high-voltage outputting part, thereby reducing the cost of the motor.

These and other configuration and operation will be described in detail in the description of embodiments.

DETAILED DESCRIPTION OF THE INVENTION

<<Embodiment 1>>

FIGS. 1 to 8 show a motor of Embodiment 1 of the invention.

Figure 1:
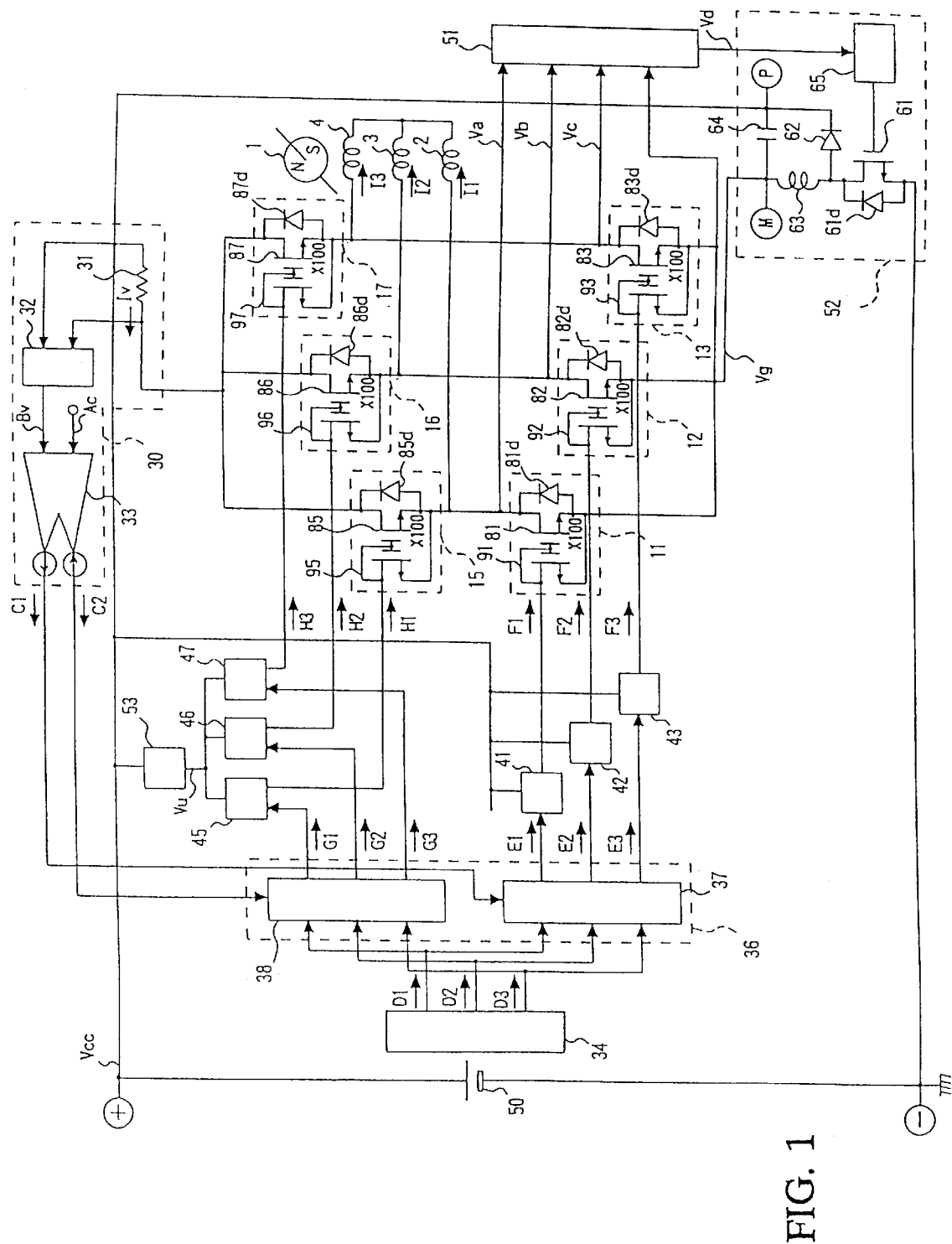
FIG. 1 is a view showing the configuration of Embodiment 1 of the invention.

FIG. 1 shows the configuration. For example, a movable body 1 is a rotor to which a field part generating field fluxes of plural poles by means of a permanent magnet is attached. In other embodiment, plural permanent magnets may be employed. Three-phase windings 2, 3, and 4 are mounted on the stator or a stationary body and arranged so as to be electrically separated from each other by an angle of 120 degree. The three-phase windings 2, 3, and 4 are caused to generate three-phase fluxes by three-phase drive currents I1, I2, and I3, and interact with the field part of the movable body 1 so as to generate a driving force, thereby rotating the movable body 1.

A voltage converting part 52 has an NMOS-FET switching transistor 61 which performs high-frequency switching of about 200 kHz. An NMOS-FET switching transistor is an FET switching transistor with an N-channel MOS structure (FET: field effect transistor, MOS: metal oxide semiconductor). In the NMOS-FET switching transistor 61, the current output terminal side is connected to the negative terminal side (−) of a DC power source part 50, and the current input terminal side to one end of a converting inductor 63. The transistor performs high-frequency switching (on-off operations) on a power supply path through which the magnetic energy of the converting inductor 63 is replenished from the positive terminal side (+) of the DC power source part 50 to the converting inductor 63. A flywheel diode 62 connected to the one end of the converting inductor 63 performs off-on operations complementarily with the high-frequency switching on-off operations of the NMOS-FET switching transistor 61 so as to constitute a current path forming circuit through which the converting inductor 63 is connected to a circuit including a converting capacitor 64.

According to this configuration, when the NMOS-FET switching transistor 61 is off, the flywheel diode 62 forms a current path through which a current is supplied to the circuit including the converting capacitor 64 via the converting inductor 63. When the NMOS-FET switching transistor 61 is on, a power supply path elongating from the positive terminal side of the DC power source part 50 and passing through the converting inductor 63 is formed. Therefore, the magnetic energy of the converting inductor 63 is replenished (the magnetic energy of the converting inductor 63 is increased). When the NMOS-FET switching transistor 61 is turned off, the terminal voltage of the converting inductor 63 is rapidly raised and the flywheel diode 62 is changed to be in the conduction state. Therefore, the current path forming circuit comprising the flywheel diode 62 operates so as to supply a current to the circuit including the converting capacitor 64 (the magnetic energy of the converting inductor 63 is reduced). As a result, a converted DC voltage (Vcc−Vg) is output between one end of the converting capacitor 64 and the positive terminal side of the DC power source part 50.

The converting capacitor 64 is connected between the positive output terminal side (P) and the negative output terminal side (M) of the voltage converting part 52, so as to constitute a filtering circuit which smooths a current and a voltage supplied via the converting inductor 63. Therefore, the potential Vg of the negative output terminal side (M) of the voltage converting part 52 is variably controlled by subjecting the NMOS-FET switching transistor 61 to a high-frequency PWM (Pulse Width Modulation). As a result, with using a DC voltage Vcc supplied from the DC power source part 50 as a power source, the converted DC voltage (Vcc−Vg) is produced between the positive and negative output terminal sides of the voltage converting part 52. The negative terminal of the DC power source part 50 is set as the ground potential (0 V). The DC power source part 50 and the voltage converting part 52 form a voltage supplying block which supplies a necessary DC voltage.

The NMOS-FET switching transistor 61 is configured by, for example, an FET transistor with a double diffused N-channel MOS structure, and has a switching diode 61d which is formed as a parasitic device and reversely connected in an equivalent circuit or in a direction from the current output terminal side of the transistor to the current input terminal side (alternatively, the NMOS-FET switching transistor 61 may be incorporated into an integration circuit so as not to form the parasitic switching diode 61d).

The current output terminal sides of three first power amplifying parts 11, 12, and 13 are commonly connected to the negative output terminal side of the voltage converting part 52. The first power amplifying part 11 has a first NMOS-FET power transistor 81, amplifies an output current F1 of a first current amplifying part 41 input to the conduction control terminal side, and outputs the amplified current. An NMOS-FET power transistor is an FET power transistor with an N-channel MOS structure. The first NMOS-FET power transistor 81 and an NMOS-FET transistor 91 constitute a first NMOS-FET power current-mirror circuit. An NMOS-FET power current-mirror circuit is a current-mirror circuit using FET power transistor with an N-channel MOS structure. Since the cell size of the NMOS-FET power transistor 81 is 100 times that of the NMOS-FET transistor 91, the NMOS-FET power current-minor circuit operating in an active operation region can amplify the input current to 100 times. The first NMOS-FET power transistor 81 is configured by an FET transistor with a double diffused N-channel MOS structure, and has a first power diode 81d which is formed as a parasitic device and reversely connected in an equivalent circuit or in a direction from the current output terminal side of the transistor to the current input terminal side.

Similarly, the first power amplifying part 12 has a first NMOS-FET power transistor 82, amplifies an output current F2 of a first current amplifying part 42 input to the conduction control terminal side, and outputs the amplified current. The first NMOS-FET power transistor 82 and an NMOS- FET transistor 92 constitute a first NMOS-FET power current-mirror circuit. The cell size of the NMOS-FET power transistor 82 is set to be 100 times that of the NMOS-FET transistor 92. The first NMOS-FET power transistor 82 is configured by an FET transistor with a double diffused N-channel MOS structure, and has a first power diode 82*d* which is formed as a parasitic device and reversely connected in an equivalent circuit or in a direction from the current output terminal side of the transistor to the current input terminal side.

Furthermore, the first power amplifying part 13 has a first NMOS-FET power transistor 83, amplifies an output current F3 of a first current amplifying part 43 input to the conduction control terminal side, and outputs the amplified current. The first NMOS-FET power transistor 83 and an NMOS-FET transistor 93 constitute a first NMOS-FET power current-mirror circuit. The cell size of the NMOS-FET power transistor 83 is set to be 100 times that of the NMOS-FET transistor 93. The first NMOS-FET power transistor 83 is configured by an FET transistor with a double diffused N-channel MOS structure, and has a first power diode 83*d* which is formed as a parasitic device and reversely connected in an equivalent circuit or in a direction from the current output terminal side of the transistor to the current input terminal side.

The current output terminal sides of the first NMOS-FET power transistors 81, 82, and 83 are commonly connected to the negative output terminal side of the voltage converting part 52, and the current input terminal sides of the transistors are connected to the power supplying terminals of the windings 2, 3, and 4, respectively. According to this configuration, the first power amplifying parts 11, 12, and 13 supply the currents by amplifying the input currents to the conduction control terminal sides, to the power supplying terminals of the windings 2, 3, and 4 so as to supply the negative current parts of the drive currents I1, I2, and I3 to the windings 2, 3, and 4, respectively.

The current input terminal sides of three second power amplifying parts 15, 16, and 17 are commonly connected to the positive output terminal side of the voltage converting part 52. The second power amplifying part 15 has a second NMOS-FET power transistor 85, amplifies an output current H1 of a second current amplifying part 45 input to the conduction control terminal side, and outputs the amplified current. The second NMOS-FET power transistor 85 and an NMOS-FET transistor 95 constitute a second NMOS-FET power current-mirror circuit. Since the cell size of the NMOS-FET power transistor 85 is set to be 100 times that of the NMOS-FET transistor 95, the NMOS-FET power current-mirror circuit operating in an active operation region can amplify the input current to 101 times. The second NMOS-FET power transistor 85 is configured by an FET transistor with a double diffused N-channel MOS structure, and has a second power diode 85*d* which is formed as a parasitic device and reversely connected in an equivalent circuit or in a direction from the current output terminal side of the transistor to the current input terminal side.

Similarly, the second power amplifying part 16 has a second NMOS-FET power transistor 86, amplifies an output current H2 of a second current amplifying part 46 input to the conduction control terminal side, and outputs the amplified current. The second NMOS-FET power transistor 86 and an NMOS-FET transistor 96 constitute a second NMOS-FET power current-mirror circuit. The cell size of the NMOS-FET power transistor 86 is set to be 100 times that of the NMOS-FET transistor 96. The second NMOS-FET power transistor 86 is configured by an FET transistor with a double diffused N-channel MOS structure, and has a second power diode 86*d* which is formed as a parasitic device and reversely connected in an equivalent circuit or in a direction from the current output terminal side of the transistor to the current input terminal side.

Furthermore, the second power amplifying part 17 has a second NMOS-FET power transistor 87, amplifies an output current H3 of a second current amplifying part 47 input to the conduction control terminal side, and outputs the amplified current. The second NMOS-FET power transistor 87 and an NMOS-FET transistor 97 constitute a second NMOS-FET power current-mirror circuit. The cell size of the NMOS-FET power transistor 87 is set to be 100 times that of the NMOS-FET transistor 97. The second NMOS-FET power transistor 87 is configured by an FET transistor with a double diffused N-channel MOS structure, and has a second power diode 87*d* which is formed as a parasitic device and reversely connected in an equivalent circuit or in a direction from the current output terminal side of the transistor to the current input terminal side.

The current input terminal sides of the second NMOS-FET power transistors 85, 86, and 87 are commonly connected to the positive output terminal side of the voltage converting part 52 via a resistor 31, and the current output terminal sides of the transistors are connected to the power supplying terminals of the windings 2, 3, and 4, respectively. According to this configuration, the second power amplifying parts 15, 16, and 17 supply the currents which are obtained by amplifying the input currents to the conduction control terminal sides, to the power supplying terminals of the windings 2, 3, and 4 so as to supply the positive current parts of the drive currents I1, I2, and I3 to the windings 2, 3, and 4, respectively.

As a current signal forming part, for example, a control signal forming part 30 is configured by a current detecting block consisting of the current detecting resistor 31 and a level shift circuit 32, and a comparing block 33. A composed supply current Iv corresponding to the composed value of the positive current parts of the drive currents I1, I2, and I3 to the windings is detected as the voltage drop across the current detecting resistor 31. The level shift circuit 32 outputs a current detected signal Bv responding with the composed supply current Iv. The comparing block 33 compares a command signal Ac with the current detected signal Bv, and outputs first and second control current signals C1 and C2 responding with the difference between the signals. The command signal Ac is obtained by a speed controller, for example, which compares the speed of the movable body 1 with a desired speed.

Figure 3:
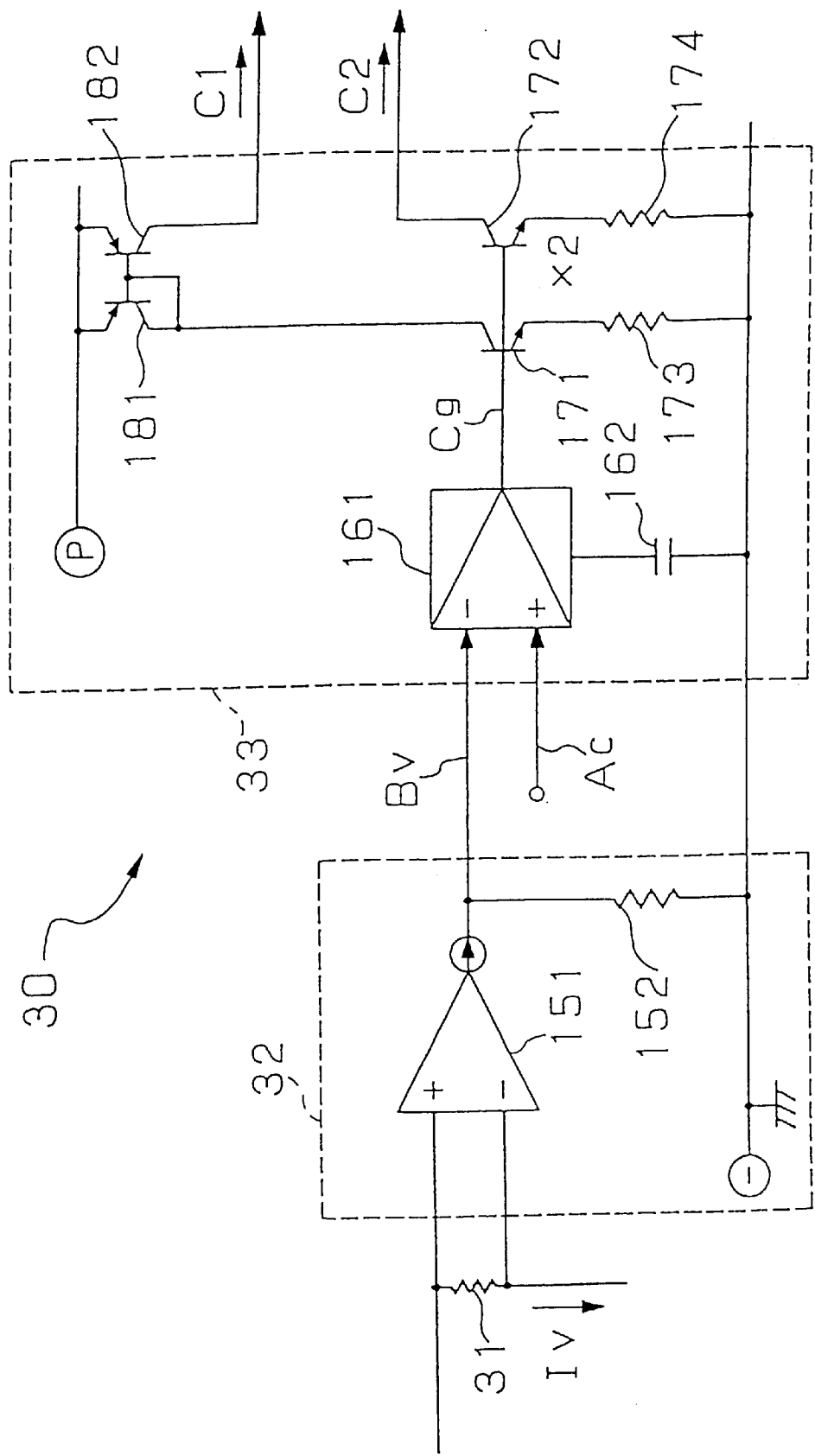
FIG. 3 is a circuit diagram of a control signal forming part 30 of Embodiment 1.

FIG. 3 specifically shows the configuration of the control signal forming part 30. The level shift circuit 32 comprises a voltage-current converting circuit 151 and a resistor 152. The voltage-current converting circuit 151 outputs a current which is proportional to the voltage drop of the current detecting resistor 31 due to the composed supply current Iv. The output current flows through the resistor 152 and the current detected signal Bv with respect to the negative terminal side (−) of the DC power source part 50 is output.

A differential amplifying part 161 of the comparing block 33 produces an output voltage Cg responding with a difference voltage between the command signal Ac and the current detected signal Bv. Transistors 171 and 172, and resistors 173 and 174 produce two current signals which are proportional to the output voltage Cg. The collector current of the transistor 171 is output as the first control current signal C1 via a current-mirror circuit consisting of transistors 181 and 182. The collector current of the transistor 172 is output as the second control current signal C2. The transistors 171 and 172, and the resistors 173 and 174 are set to have predetermined designed values so that the value of the second control current signal C2 is twice that of the first control current signal C1. A capacitor 162 forms a low-pass filter in the differential amplifying part 161.

Figure 2:
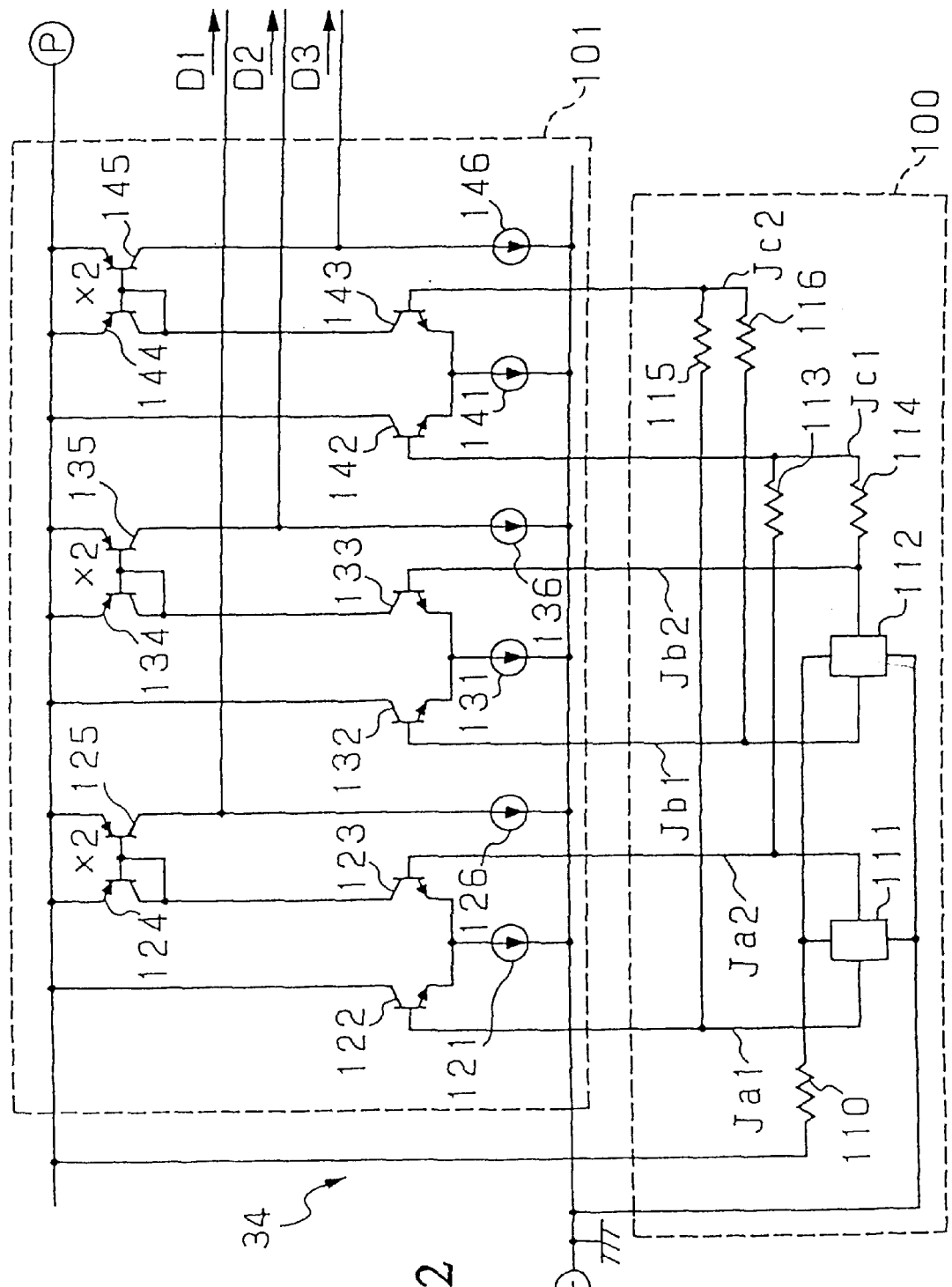
FIG. 2 is a circuit diagram of an altering signal forming part 34 of Embodiment 1.

An altering signal forming part 34 of FIG. 1 outputs three-phase altering current signals D1, D2, and D3 analoguely varying, in order to cause three-phase currents to pass through the three-phase windings. FIG. 2 specifically shows the configuration of the altering signal forming part 34. In this example, the altering signal forming part 34 is configured by a position detecting block 100 and an altering signal block 101.

The position detecting block 100 has position detecting elements 111 and 112 which are magnetoelectrical converting elements (for example, Hall elements) to detect generated fluxes of the movable body 1. The position detecting elements 111 and 112 are electrically separated from each other by an angle of 120 degree and output position signals Ja1 and Jb1, and Ja2 and Jb2 which vary analoguely sinusoidally as the movable body 1 moves. The signals Ja1 and Ja2 are in reversed phase relationships (electrically separated from each other by 180 degree), and the signals Jb1 and Jb2 are in reversed phase relationships. The signals of reversed phase relationships are not counted in the number of phases. The position signals Ja2 and Jb2 are composed together by resistors 113 and 114 to produce a position signal Jc1 of a third phase, and the position signals Ja1 and Jb1 are composed together by resistors 115 and 116 to produce a position signal Jc2 of the third phase. According to this configuration, in the position detecting block 100, the three-phase position signals Ja1, Jb1, and Jc1 (Ja2, Jb2, and Jc2) which are electrically separated from each other by an angle of 120 degree are obtained.

The altering signal block 101 produces sinusoidal altering current signals D1, D2, and D3 which analoguely vary responding with the three-phase position signals. Transistors 122 and 123 divide the current of a constant current source 121 to the respective collector sides, responding with the difference voltage between the position signals Ja1 and Ja2 of the first phase. The collector current of the transistor 123 is amplified by an amplifying ratio of 2 by a current-mirror circuit consisting of transistors 124 and 125, and then output from the collector of the transistor 125. The collector current of the transistor 125 is compared with a current of a constant current source 126, and the difference between the currents is output as the altering current signal D1 of the first phase. Therefore, the altering current signal D1 analoguely varies responding with the position signal Ja1, flows out during the zone of an electrical angle of 180 degree (the current of the positive polarity), and flows in during the subsequent 180-degree zone (the current of the negative polarity).

Similarly, the altering current signal D2 analoguely varies responding with the position signal Jb1, flows out during the zone of an electrical angle of 180 degree (the current of the positive polarity), and flows in during the subsequent 180-degree zone (the current of the negative polarity). Furthermore, the altering current signal D3 analoguely varies responding with the position signal Jc1, flows out during the zone of an electrical angle of 180 degree (the current of the positive polarity), and flows in during the subsequent 180-degree zone (the current of the negative polarity). As a result, the altering current signals D1, D2, and D3 constitute sinusoidal three-phase current signals.

A distributed signal forming part 36 of FIG. 1 comprises first and second distributors 37 and 38. The first distributor 37 distributes the first control current signal C1 of the control signal forming part 30 responding with the three-phase altering current signals D1, D2, and D3 of the altering signal forming part 34, to produce three-phase first distributed current signals E1, E2, and E3 which analoguely vary. The second distributor 38 distributes the second control current signal C2 of the control signal forming part 30 responding with the three-phase altering current signals D1, D2, and D3 of the altering signal forming part 34, to produce three-phase second distributed current signals G1, G2, and G3 which analoguely vary.

Figure 4:
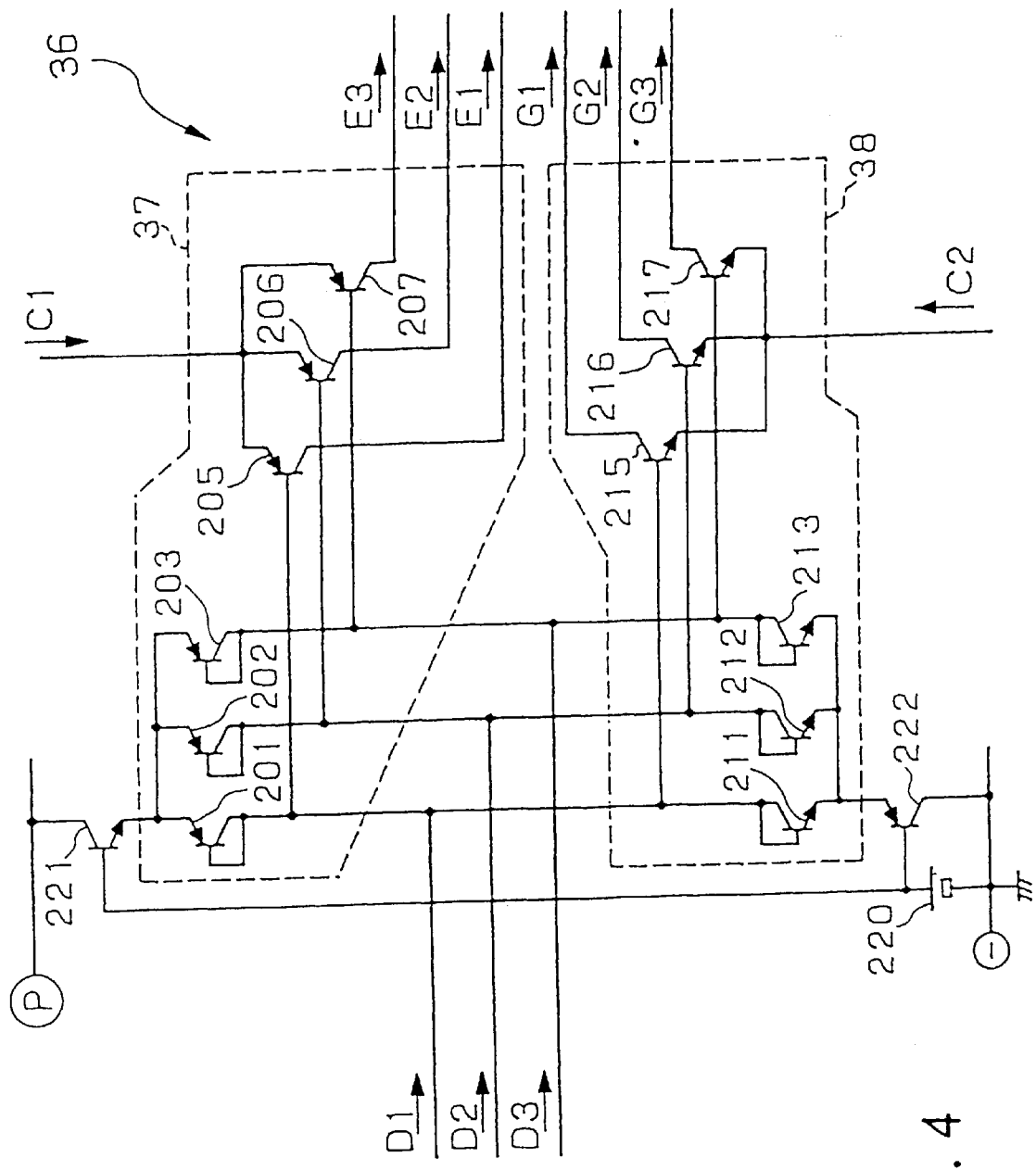
FIG. 4 is a circuit diagram of a distributed signal forming part 36 of Embodiment 1.

FIG. 4 specifically shows the configuration of the distributed signal forming part 36. The first distributor 37 is configured by three first input transistors 201, 202, and 203, and three first distributing transistors 205, 206, and 207. The conduction control terminals and signal input terminals of a pair of terminals of the current path of the first input transistors 201, 202, and 203 are connected to the current input-output terminal sides to which the three-phase altering current signals D1, D2, and D3 are respectively supplied from the altering signal forming part 34. Signal output terminals of a pair of terminals of the current path of the first input transistors 201, 202, and 203 are commonly connected. The current signal input terminal sides of the first distributing transistors 205, 206, and 207 are commonly connected, and the first control current signal C1 of the control signal forming part 30 is input to the common connected terminals. The conduction control terminal sides of the first distributing transistors 205, 206, and 207 are connected to the current input-output terminal sides to which the three-phase altering current signals D1, D2, and D3 are respectively supplied. According to this configuration, the three first distributing transistors 205, 206, and 207 output the three-phase first distributed current signals E1, E2, and E3 from the current signal output terminal sides, respectively.

Transistors of the same type are used as the first input transistors 201, 202, and 203, and the first distributing transistors 205, 206, and 207. In the embodiment, bipolar transistors of the PNP type are used as the first input transistors 201, 202, and 203, and the first distributing transistors 205, 206, and 207. In the first input transistors 201, 202, and 203, the conduction control terminals are the base terminals, the signal input terminals of the pair of terminals of the current path are the collector terminals, and the signal output terminals of the pair of terminals of the current path are the emitter terminals. In the first distributing transistors 205, 206, and 207, the conduction control terminals are the base terminals, the current signal input terminals are the emitter terminals, and the current signal output terminals are the collector terminals.

The second distributor 38 is configured by three second input transistors 211, 212, and 213, and three second distributing transistors 215, 216, and 217. The conduction control terminals and signal input terminals of a pair of terminals of the current path of the second input transistors 211, 212, and 213 are connected to the current input-output terminal sides to which the three-phase altering current signals D1, D2, and D3 are respectively supplied from the altering signal forming part 34. Signal output terminals of a pair of terminals of the current path of the second input transistors 211, 212, and 213 are commonly connected. The current signal input terminal sides of the second distributing transistors 215, 216, and 217 are commonly connected, and the second control current signal C2 of the control signal forming part 30 is input to the common connected terminals. The conduction control terminal sides of the second distributing transistors 215, 216, and 217 are connected to the current input-output terminal sides to which the three-phase altering current signals D1, D2, and D3 are respectively supplied. According to this configuration, the three second distributing transistors 215, 216, and 217 output the three-phase second distributed current signals G1, G2, and G3 from the current signal output terminal sides, respectively.

Transistors of the same type are used as the second input transistors 211, 212, and 213, and the second distributing transistors 215, 216, and 217. The type of the first input transistors 201, 202, and 203 is different in polarity from that of the second input transistors 211, 212, and 213. In the embodiment, bipolar transistors of the NPN type are used as the second input transistors 211, 212, and 213, and the second distributing transistors 215, 216, and 217. In the second input transistors 211, 212, and 213, the conduction control terminals are the base terminals, the signal input terminals of the pair of terminals of the current path are the collector terminals, and the signal output terminals of the pair of terminals of the current path are the emitter terminals. In the second distributing transistors 215, 216, and 217, the conduction control terminals are the base terminals, the current signal input terminals are the emitter terminals, and the current signal output terminals are the collector terminals.

A reference voltage source 220 and transistors 221 and 222 constitute a predetermined-voltage supply part. A first predetermined DC voltage is supplied to the common connected end of the first input transistors 201, 202, and 203, and a second predetermined DC voltage to the common connected end of the second input transistors 211, 212, and 213.

According to this configuration, when the altering current signal D1 is a negative current, a current flows through the first input transistor 201 and no current flows through the second input transistor 211. When the altering current signal D1 is a positive current, a current flows through the second input transistor 211 and no current flows through the first input transistor 201. In other words, the first and second input transistors 201 and 211 are complementarily supplied with a smooth current, in accordance with the polarity of the altering current signal D1, with the result that the first and second input transistors 201 and 211 are not concurrently supplied with a current.

Similarly, when the altering current signal D2 is a negative current, a current flows through the first input transistor 202, and, when the altering current signal is a positive current, a current flows through the second input transistor 212. Furthermore, when the altering current signal D3 is a negative current, a current flows through the first input transistor 203, and, when the altering current signal is a positive current, a current flows through the second input transistor 213.

The first distributing transistors 205, 206, and 207 of the first distributor 37 distribute the first control current signal C1 to the respective current signal output terminal sides, responding with the three-phase currents flowing through the first input transistors 201, 202, and 203, thereby producing the three-phase first distributed current signals E1, E2, and E3. Therefore, the three-phase first distributed current signals E1, E2, and E3 analoguely vary responding with the negative current parts of the three-phase altering current signals D1, D2, and D3, and the composed value of the distributed current signals E1, E2, and E3 is equal to the first control current signal C1.

Similarly, the second distributing transistors 215, 216, and 217 of the second distributor 38 distribute the second control current signal C2 to the respective current signal output terminal sides, responding with the three-phase currents flowing through the second input transistors 211, 212, and 213, thereby producing the three-phase second distributed current signals G1, G2, and G3. Therefore, the three-phase second distributed current signals G1, G2, and G3 analoguely vary responding with the positive current parts of the three-phase altering current signals D1, D2, and D3, and the composed value of the distributed current signals G1, G2, and G3 is equal to the second control current signal C2.

The first distributed current signals E1, E2, and E3 are separated in phase from each other by 120degree and the second distributed current signals G1, G2, and G3 are separated in phase by 120 degree. The first and second current signals E1 and G1 complementarily analoguely vary while being separated in phase from each other by 180 degree, and one of the signals E1 and G1 is always zero. Similarly, the first and second current signals E2 and G2 complementarily analoguely vary while being separated in phase from each other by 180 degree, and one of the signals E2 and G2 is always zero. Furthermore, the first and second current signals E3 and G3 complementarily analoguely vary while being separated in phase from each other by 180 degree, and one of the signals E3 and G3 is always zero.

The first distributed current signals E1, E2, and E3 of the first distributor 37 of FIG. 1 are input to the first current amplifying parts 41, 42, and 43, respectively. The first current amplifying parts 41, 42, and 43 amplify the first distributed current signals E1, E2, and E3 by a predetermined ratio to produce the first amplified current signals F1, F2, and F3, respectively. The first current amplifying parts 41, 42, and 43 supply the first amplified current signals F1, F2, and F3 to the conduction control terminal sides of the first power amplifying parts 11, 12, and 13. The first power amplifying parts 11, 12, and 13 amplify the three-phase first amplified current signals F1, F2, and F3 and supply the negative current parts of the drive currents I1, I2, and I3 to the windings 2, 3, and 4, respectively.

Figure 5:
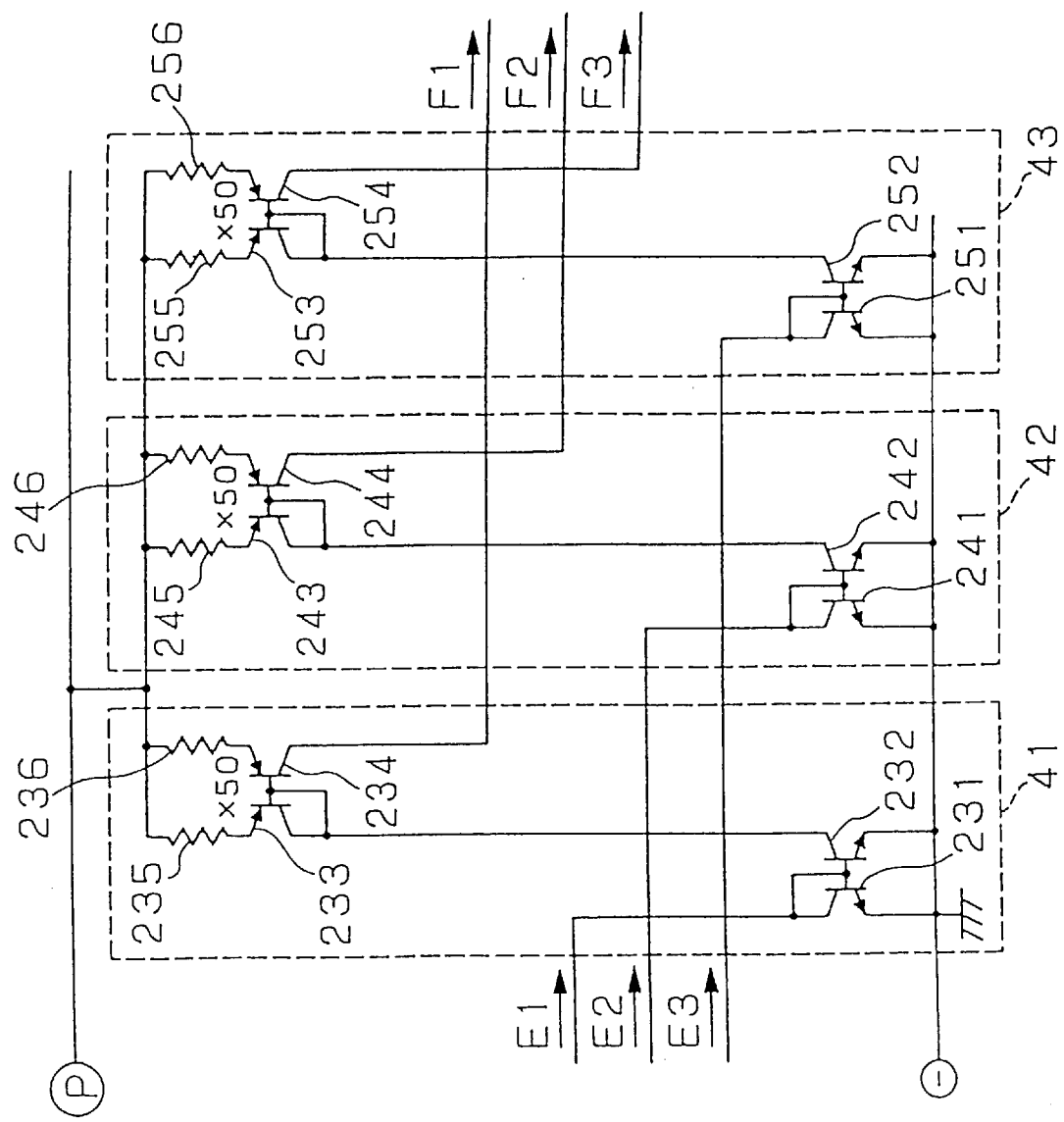
FIG. 5 is a circuit diagram of first current amplifying parts 41, 42, and 43 of Embodiment 1.

FIG. 5 specifically shows the configuration of the first current amplifying parts 41, 42, and 43. The first current amplifying part 41 is configured by a first amplifying part current-mirror circuit which has a current-mirror circuit at the preceding stage and consisting of transistors 231 and 232, and a current-mirror circuit at the subsequent stage and consisting of transistors 233 and 234 and resistors 235 and 236, and in which the preceding and subsequent current-mirror circuits are cascaded together. The emitter area ratio of the transistors 231 and 232 is set to be 1 so that the preceding current-mirror circuit has a current amplifying ratio of 1. The emitter area ratio of the transistors 233 and 234 is set to be 50 and the resistance ratio of the resistors 236 and 235 to be 50 so that the subsequent current-mirror circuit has a current amplifying ratio of 50. As a result, the first amplifying part current-mirror circuit of the first current amplifying part 41 performs amplification at a current amplifying ratio of 50. Similarly, the first current amplifying part 42 is configured by a first amplifying part current-mirror circuit consisting of transistors 241, 242, 243, and 244 and resistors 245 and 246, and performs amplification at a current amplifying ratio of 50.

Furthermore, the first current amplifying part 43 is configured by a first amplifying part current-mirror circuit consisting of transistors 251, 252, 253, and 254 and resistors 255 and 256, and performs amplification at a current amplifying ratio of 50. According to this configuration, the first current amplifying parts 41, 42, and 43 produce the three-phase first amplified current signals F1, F2, and F3 which are obtained by amplifying the three-phase first distributed current signals E1, E2, and E3 by a ratio of 50, and supply the produced signals to the conduction control terminal sides of the first power current-mirror circuits of the first power amplifying parts 11, 12, and 13.

The second distributed current signals G1, G2, and G3 of the second distributor 38 of FIG. 1 are input to second current amplifying parts 45, 46, and 47, respectively. The second current amplifying parts 45, 46, and 47 produce second amplified current signals H1, H2, and H3 which are obtained by current-amplifying the second distributed current signals G1, G2, and G3 by a predetermined ratio, respectively. In a high-voltage outputting part 53, an upconverting capacitance is subjected to charging and storing operations responding with a high-frequency pulse signal so that a high-potential point potential Vu which is higher than the positive terminal side potential Vcc of the DC power source part 50 is produced. The second current amplifying parts 45, 46, and 47 supply the second amplified current signals H1, H2, and H3 from the high-potential point Vu of the high-voltage outputting part 53 to the conduction control terminal sides of the second power amplifying parts 15, 16, and 17. The second power amplifying parts 15, 16, and 17 current-amplify the three-phase second amplified current signals H1, H2, and H3 and supply the positive current parts of the drive currents I1, I2, and I3 from the current output terminal sides to the windings 2, 3, and 4, respectively.

Figure 6:
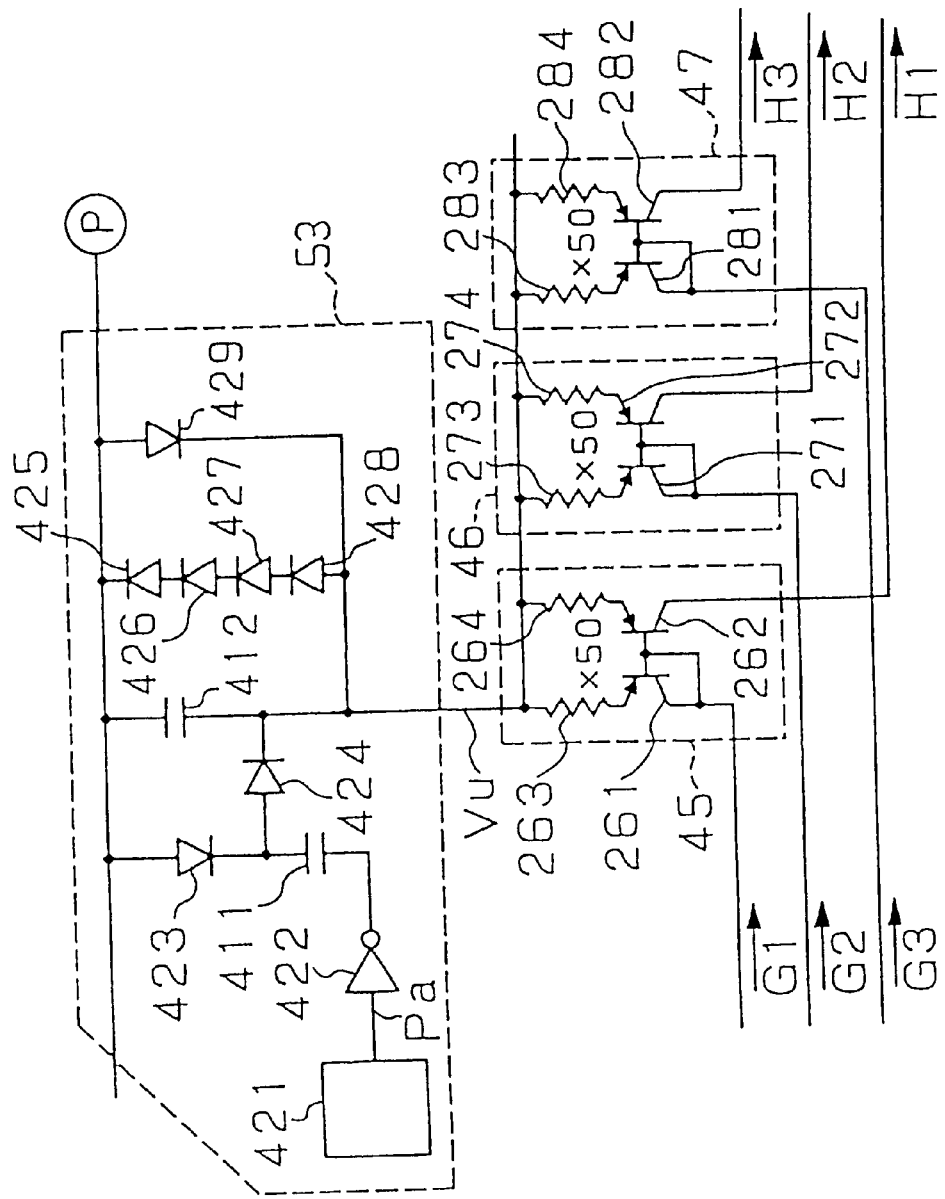
FIG. 6 is a circuit diagram of second current amplifying parts 45, 46, and 47 and a high-voltage outputting part 53 of Embodiment 1.

FIG. 6 specifically shows the configuration of the second current amplifying parts 45, 46, and 47 and the high-voltage outputting part 53. The high-voltage outputting part 53 comprises: a pulse generating circuit 421 which outputs a high-frequency pulse signal Pa of about 100 kHz; a first upconverting capacitance 411; a second upconverting capacitance 412; a first voltage limit circuit consisting of diodes 425 to 428; and a second voltage limit circuit consisting of a diode 429. The state of an inverter 422 is digitally changed responding with the pulse signal Pa of the pulse generating circuit 421.

When the inverter 422 is "L" (Low, or at, for example, the negative terminal side potential of the DC power source part 50), the first upconverting capacitance 411 is charged via a diode 423.

When the inverter 422 is changed to "H" (High, or to, for example, the positive terminal side potential of the DC power source part 50), electric charges stored in the first upconverting capacitance 411 are transferred to the second upconverting capacitance 412 via a diode 424 to charge the second upconverting capacitance 412 to be stored therein. As a result, the high-potential point potential Vu which is higher than the positive terminal side potential of the voltage converting part 52 is output from the terminal of the second upconverting capacitance 412. The point of the high potential Vu is connected to the second current amplifying parts 45, 46, and 47.

When the second upconverting capacitance 412 is continued to be charged, the voltage Vu of the high potential point is raised to a very high level and a voltage breakdown of integrated transistors or diodes may occur. In order to prevent the high-potential point voltage Vu from being raised to a level which is equal to or higher than a predetermined level, therefore, the voltage is limited by the first voltage limit circuit consisting of the diodes 425 to 428. In the case where there is no fear of a voltage breakdown, the first voltage limit circuit may be omitted.

The second amplified current signals H1, H2, and H3 operate so as to discharge the second upconverting capacitance 412. When a large-current operation continues for a long time period such as the case where the motor is started, the amount of stored charges of the second upconverting capacitance 412 may become insufficient and the potential Vu of the output voltage point of the high-voltage outputting part 53 may be lowered to a very low level. Therefore, the circuit operation may be temporarily unstable and the starting operation may be impeded. To comply with this, the second voltage limit circuit consisting of the diode 429 is disposed to limit the high-potential point potential Vu of the high-voltage outputting part 53 so that the potential is not largely lowered.

In a usual control state wherein the current level is low, the second voltage limit circuit does not operate. In the case where the potential Vu vary in a small degree, the second voltage limit circuit may be omitted.

The second current amplifying part 45 is configured by a second amplifying part current-mirror circuit consisting of transistors 261 and 262 and resistors 263 and 264. The emitter area ratio of the transistors 261 and 262 is set to be 50 and the resistance ratio of the resistors 264 and 263 to be 50 so as to attain a current amplifying ratio of 50. As a result, the second amplifying part current-mirror circuit of the second current amplifying part 45 performs amplification at a current amplifying ratio of 50. Similarly, the second current amplifying part 46 is configured by a second amplifying part current-mirror circuit consisting of transistors 271 and 272 and resistors 273 and 274, and performs amplification at a current amplifying ratio of 50.

Furthermore, the second current amplifying part 47 is configured by a second amplifying part current-mirror circuit consisting of transistors 281 and 282 and resistors 283 and 284, and performs amplification at a current amplifying ratio of 50. According to this configuration, the second current amplifying parts 45, 46, and 47 produce the three-phase second amplified current signals H1, H2, and H3 which are obtained by amplifying the three-phase second distributed current signals G1, G2, and G3 by a ratio of 50, and supply the produced signals from the high-potential point Vu of the high-voltage outputting part 53 to the conduction control terminal sides of the second power current-mirror circuits of the second power amplifying parts 15, 16, and 17.

A switching control part 51 of FIG. 1 detects three-phase voltage drops across the current input terminal sides and the current output terminal sides of the first power amplifying parts 11, 12, and 13, and outputs a switching control signal Vd responding with the minimum voltage drop. In the voltage converting part 52, a PWM part 65 produces a predetermined high-frequency PWM signal Sw (Pulse Width Modulation signal) having a pulse width responding with the switching control signal Vd of the switching control part 51, thereby causing the NMOS-FET switching transistor 61 to perform high-frequency switching (including the case where the NMOS-FET switching transistor 61 is always in the on state).

Specifically, the PWM switching operation of the NMOS-FET switching transistor 61 of the voltage converting part 52 is controlled responding with the switching control signal Vd of the switching control part 51. The voltage converting part 52 uses the DC voltage Vcc of the DC power source part 50 as a power source, and produces the converted DC voltage (Vcc−Vg) responding with the PWM switching operation of the NMOS-FET switching transistor 61.

Figure 7:
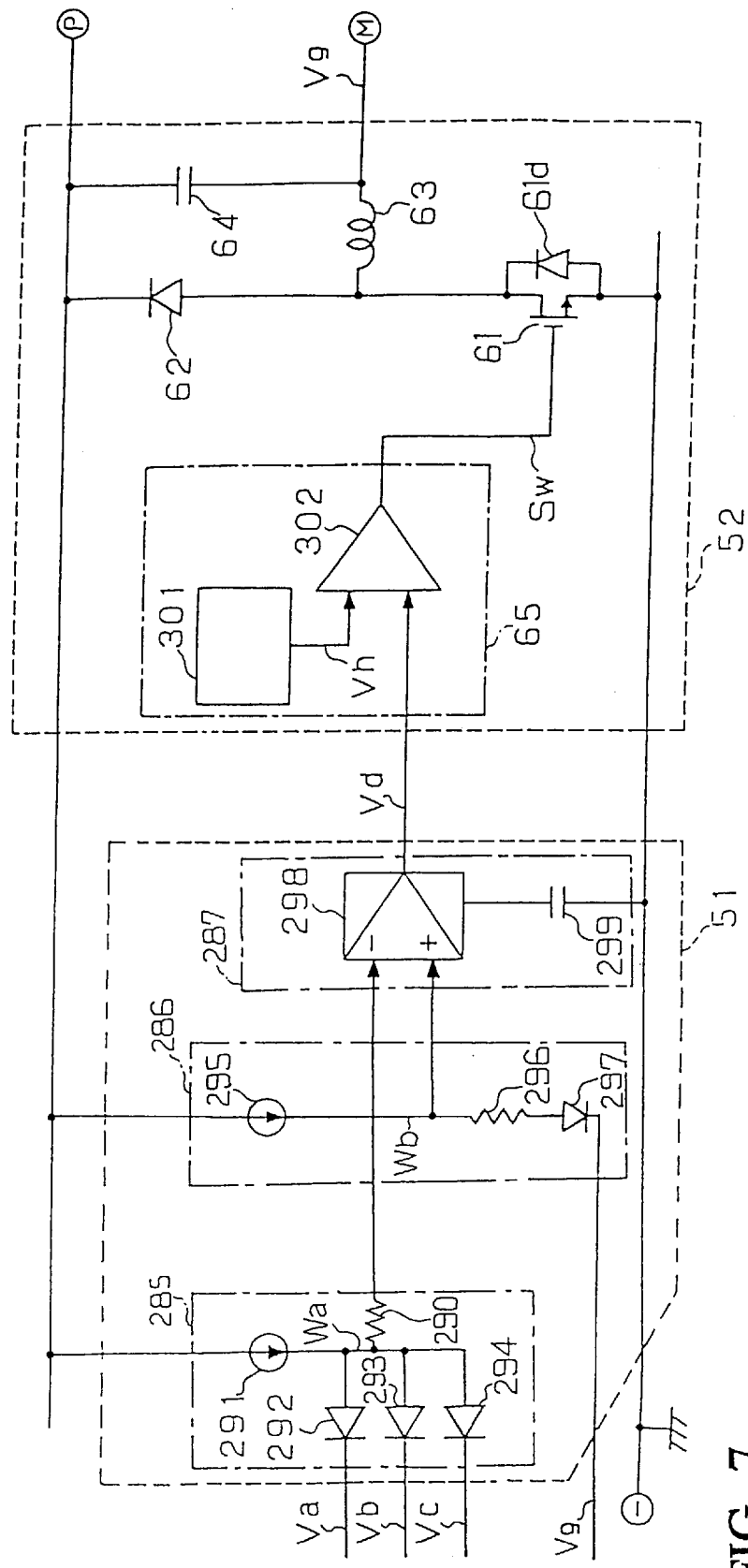
FIG. 7 is a circuit diagram of a switching control part 51 and a voltage converting part 52 of Embodiment 1.

FIG. 7 specifically shows the configuration of the switching control part 51 and the voltage converting part 52. The switching control part 51 is configured by a voltage potential detecting block 285, a reference potential block 286, and a potential comparing block 287. The voltage potential detecting block 285 detects the minimum potential value among the three-phase potentials Va, Vb, and Vc produced in the current input terminal sides of the first NMOS-FET power transistors 81, 82, and 83, by using diodes 292, 293, and 294 and a constant current source 291, and produces a voltage detected signal Wa.

The reference potential block 286 detects the potential Vg of the common connect terminal side or the current output terminal sides of the first power amplifying parts 11, 12, and 13, by using a diode 297, a constant current source 295, and a resistor 296, and produces a reference voltage signal Wb which is higher than the potential Vg of the common connect terminal sides, at a terminal of the resistor 296.

In the potential comparing block 287, a differential amplifying part 298 compares the voltage detected signal Wa with the reference voltage signal Wb. The differential amplifying part 298 amplifies the difference voltage to output the switching control signal Vd. As a result, it is possible to obtain the switching control signal Vd responding the voltage drop in the activated period across the current input terminal sides and the current output terminal sides of the three first power amplifying parts. A capacitor 299 forms a low-pass filter in the differential amplifying part 298.

The PWM part 65 of the voltage converting part 52 comprises a triangular signal generating circuit 301 and a comparator 302. The triangular signal generating circuit 301 generates a triangular signal Vh of 200 KHz. The comparator 302 compares the triangular signal Vh of the triangular signal generating circuit 301 with the switching control signal Vd of the switching control part 51, and produces a PWM voltage signal Sw responding with the switching control signal Vd. The PWM voltage signal Sw is supplied to the conduction control terminal side of the NMOS-FET switching transistor 61. The NMOS-FET switching transistor 61 performs on-off operations responding with the PWM voltage signal Sw.

The NMOS-FET switching transistor 61 subjects the power supply path through which the magnetic energy of the converting inductor 63 is replenished from the positive terminal side of the DC power source part 50, to high-frequency switching. The flywheel diode 62 constituting the current path forming circuit performs off-on operations complementarily with the high-frequency switching on-off operations of the NMOS-FET switching transistor 61, and forms a current path from the converting inductor 63 to the circuit including the converting capacitor 64.

The increase or decrease of the magnetic energy of the converting inductor 63 due to the high-frequency switching of the NMOS-FET switching transistor 61 causes the converted DC voltage (Vcc−Vg) to be output between one end of the converting capacitor 64 and that of the DC power source part 50.

In this way, the NMOS-FET switching transistor 61 performs the high-frequency PWM (Pulse Width Modulation) responding with the switching control signal Vd of the switching control part 51. The potential Vg of the negative output terminal side of the voltage converting part 52 is controlled by the PWM, and the converted DC voltage (Vcc−Vg) between the positive and negative output terminal sides of the voltage converting part 52 is output between one end of the converting capacitor 64 and the positive terminal side of the DC power source part 50.

The converted DC voltage (Vcc−Vg) is supplied to the first power amplifying parts 11, 12, and 13 which are connected in parallel, and the second power amplifying parts 15, 16, and 17 which are connected in parallel. According to this configuration, the minimum voltage drop among the voltage drops of the first power amplifying parts 11, 12, and 13 can be controlled to a predetermined small value.

The first power transistors 81, 82, and 83 of the first power amplifying parts 11, 12, and 13, the second power transistors 85, 86, and 87 of the second power amplifying parts 15, 16, and 17, and the switching transistor 61 of the voltage converting part 52 which are shown in FIG. 1 are integrated on a single silicon substrate with being junction-isolated, together with necessary transistors, resistors, and the like of the control signal forming part 30, the altering signal forming part 34, the distributed signal forming part 36, the first current amplifying parts 41, 42, and 43, the second current amplifying parts 45, 46, and 47, the switching control part 51, the voltage converting part 52, and the high-voltage outputting part 53.

Figure 8:
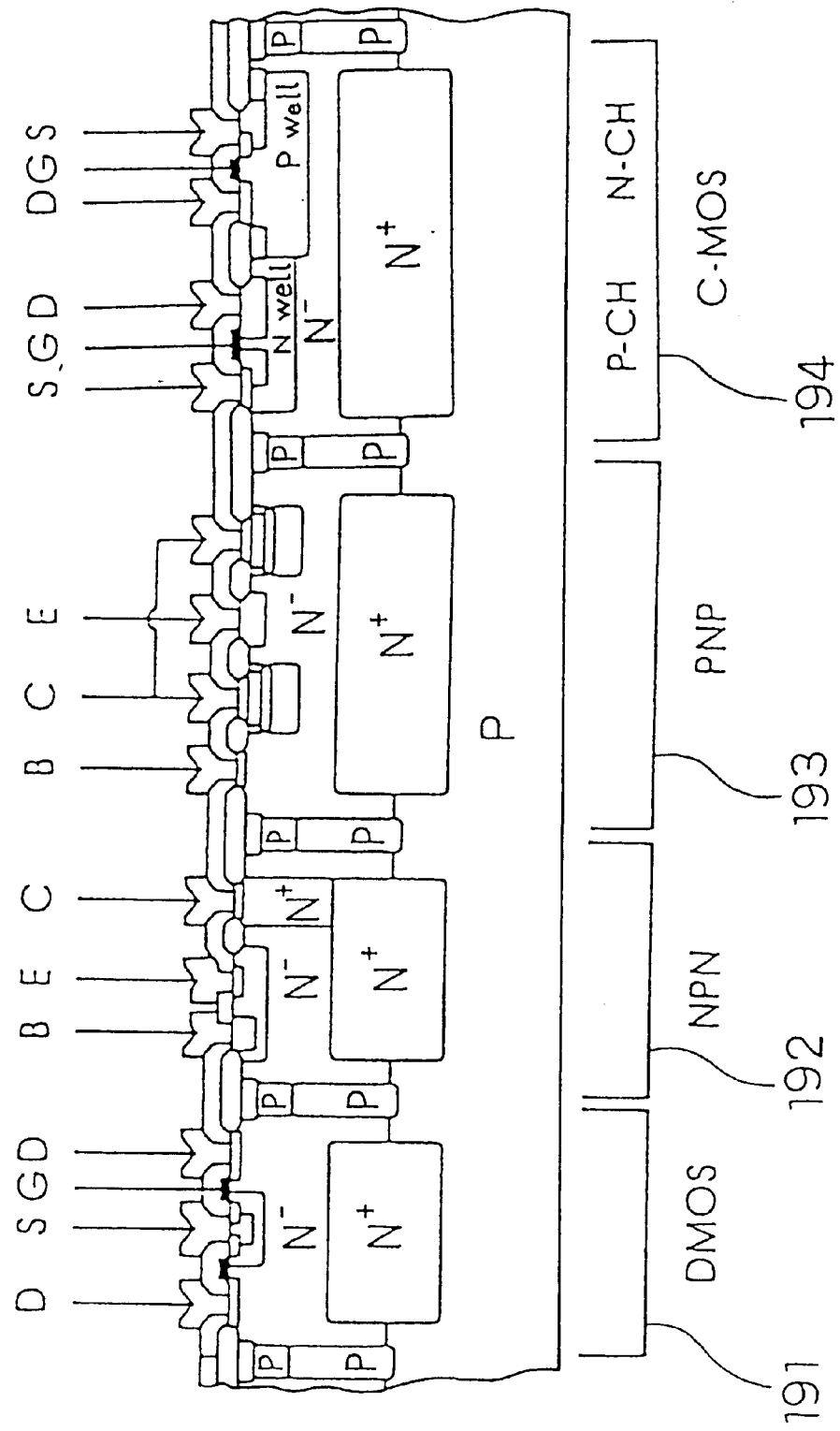
FIG. 8 is a section view of a part of an integrated circuit of Embodiment 1.

FIG. 8 shows an example of an integration process. Transistors of various kinds are formed by diffusing required N+, N+, P+, and P− layers on a P-type silicon substrate. The reference numeral 191 designates an example of a FET transistor with a double diffused N-channel MOS structure which may be used as the first NMOS-FET power transistors, the second NMOS-FET power transistors, and the NMOS-FET switching transistor.

The reference numeral 192 designates an example of an NPN-type bipolar transistor which may be used as a signal amplifying transistor. The reference numeral 193 designates an example of a PNP-type bipolar transistor which may be used as a signal amplifying transistor.

The reference numeral 194 designates an example of a P-channel and N-channel CMOS FET transistor which may be used for processing a logic signal. The transistors are junction-isolated from each other by P layers which have the same potential as the silicon substrate connected to the ground potential (0 V).

As compared with a dielectrically isolated integrated circuit, in a junction-isolated integrated circuit, many power transistors and signal transistors can be integrated with a high density on a small single-chip substrate. In other words, a junction-isolated integrated circuit can be economically produced. A specific mask layout is a design matter and hence a detailed description of the layout is omitted.

Next, the operation of the motor of FIG. 1 will be described briefly. The altering signal forming part 34 produces the three-phase altering current signals D1, D2, and D3 analoguely varying and supplies the signals to the distributed signal forming part 36. The first distributor 37 distributes the first control current signal C1 of the control signal forming part 30, responding with the three-phase altering current signals D1, D2, and D3, and outputs the three-phase first distributed current signals E1, E2, and E3.

The first current amplifying parts 41, 42, and 43 output the first amplified current signals F1, F2, and F3 which are obtained by current-amplifying the first distributed current signals E1, E2, and E3 by a predetermined ratio, and supply the signals to the conduction control terminal sides of the first power amplifying parts 11, 12, and 13, respectively. The first NMOS-FET power transistors 81, 82, and 83 of the first power amplifying parts 11, 12, and 13 current-amplify the first amplified current signals F1, F2, and F3 and supply the negative current parts of the drive currents I1, I2, and I3 to the three-phase windings 2, 3, and 4, respectively.

The control signal forming part 30, the first distributor 37, and the first current amplifying parts 41, 42, and 43 form a first distribution control block to control distribution of current from the first power amplifying parts 11, 12, and 13 responding with the output signals D1, D2, and D3 of the altering signal forming part 34.

On the other hand, the second distributor 38 distributes the second control current signal C2 of the control signal forming part 30, responding with the three-phase altering current signals D1, D2, and D3, and outputs the three-phase second distributed current signals G1, G2, and G3. The second current amplifying parts 45, 46, and 47 output the second amplified current signals H1, H2, and H3 which are obtained by current-amplifying the second distributed current signals G1, G2, and G3 by a predetermined ratio, and supply the signals to the conduction control terminal sides of the second power amplifying parts 15, 16, and 17, respectively.

The second NMOS-FET power transistors 85, 86, and 87 of the second power amplifying parts 15, 16, and 17 current-amplify the second amplified current signals H1, H2, and H3, and supply the positive current parts of the drive currents I1, I2, and I3 to the windings 2, 3, and 4, respectively. The control signal forming part 30, the second distributor 38, and the second current amplifying parts 45, 46, and 47 form a second distribution control block to control distribution of current from the second power amplifying parts 15, 16, and 17 responding with the output signals D1, D2, and D3 of the altering signal forming part 34.

The current detecting resistor 31 of the control signal forming part 30 detects the composed supply current Iv which is a composed value of the positive current parts of the drive currents I1, I2, and I3, and produces the current detected signal Bv responding with the composed supply current Iv, via the level shift circuit 32. The comparing block 33 compares the command signal Ac with the current detected signal Bv, and outputs the first and second control current signals C1 and C2 responding with the comparison result.

The first and second control current signals C1 and C2 are proportionally changed and the absolute value of C2 is twice that of C1. As a result, the first distribution control block (the control signal forming part 30, the first distributor 37, and the first current amplifying parts 41, 42, and 43), and the first power amplifying parts 11, 12, and 13 constitute a feedback loop for setting the composed supply current Iv for a value corresponding to the command signal Ac, thereby controlling the currents supplied to the windings 2, 3, and 4.

The second distribution control block (the control signal forming part 30, the second distributor 38, and the second current amplifying parts 45, 46, and 47), and the second power amplifying parts 15, 16, and 17 supply the positive current parts of the analoguely varying drive currents I1, I2, and I3 to the windings 2, 3, and 4, while partially saturating the second NMOS-FET power transistors 85, 86, and 87 of the second power amplifying parts 15, 16, and 17.

As compared with a composed forward gain of the first distribution control block and the first power amplifying parts (the forward gains of the control signal forming part 30, the first distributor 37, the first current amplifying parts 41, 42, and 43, and the first power amplifying parts 11, 12, and 13), a composed forward gain of the second distribution control block and the second power amplifying parts (the forward gains of the control signal forming part 30, the second distributor 38, the second current amplifying parts 45, 46, and 47, and the second power amplifying parts 15, 16, and 17) is made larger in order to stabilize the motor operation.

In other words, each of the second NMOS-FET power transistors of the second power amplifying parts in most of the activated period is surely saturated with a resistive voltage drop, so that the currents supplied to the windings can be controlled by the first NMOS-FET power transistors of the first power amplifying parts. The saturation with a low voltage drop in a transistor means a resistive operation in a non-active operation region or a resistive operation region in which the voltage drop between the current input terminal side and the current output terminal side of the transistor is a resistive voltage drop. In other words, the voltage drop of the transistor in the resistive operation region changes in proportion to or nearly in proportion to the current through the transistor.

In each of the second NMOS-FET power transistors, the current amplification is performed in the active operation region during some of the altering period of the current path, so as to analoguely change the current value. In the period after altering, however, the resistive operation in the non-active operation region or the resistive operation region is performed.

The first NMOS-FET power transistors 81, 82, and 83 operate in the active operation region to control the composed supply current, and, also in the altering period, analoguely change the current values while performing the current control.

The first and second current signals E1 and G1 of the same phase complementarily flow with a phase difference of 180 degree. Therefore, the first and second power amplifying parts 11 and 15 complementarily operate and the bidirectional drive current I1 analoguely continuously varying is supplied to the winding 2.

Similarly, the first and second current signals E2 and G2 complementarily flow with a phase difference of 180 degree. The first and second power amplifying parts 12 and 16 complementarily operate and the bidirectional drive current I2 analoguely continuously varying is supplied to the winding 3.

Furthermore, the first and second current signals E3 and G3 complementarily flow with a phase difference of 180 degree. The first and second power amplifying parts 13 and 17 complementarily operate and the bidirectional drive current I3 analoguely continuously varying is supplied to the winding 4.

In this way, the first and second power amplifying parts of the same phase are not concurrently in the conduction state. Therefore, a short-circuit current does not flow between the positive and negative output terminal sides of the voltage converting part 52. As a result, an over-current breakdown and an abnormal phenomenon do not occur in the integrated circuit.

Since the continuous drive currents I1, I2, and I3 analoguely varying are supplied to the windings 2, 3, and 4, a spike voltage is not produced in the windings 2, 3, and 4, and an abnormal current does not flow through the first power diodes 81*d*, 82*d*, and 83*d* and the second power diodes 85*d*, 86*d*, and 87*d* which are parasitic devices. Therefore, pulsation of the generated force of the motor is reduced to a very low level.

The switching control part 51 detects the minimum voltage drop among the three-phase voltage drops of the first power amplifying parts 11, 12, and 13 in the conduction state, and outputs the switching control signal Vd. The voltage converting part 52 causes the NMOS-FET switching transistor 61 to perform high-frequency switching responding with the switching control signal Vd, thereby variably controlling the converted DC voltage (Vcc–Vg) between the positive and negative output terminal sides.

According to this configuration, the switching control part 51 and the voltage converting part 52 form a control loop which controls the minimum voltage drop among the first power amplifying parts 11, 12, and 13 to a small value. As a result, the power loss and heat generation in the first power amplifying parts 11, 12, and 13 are reduced to a low level.

In the voltage converting part 52, the power supply path to the converting inductor 63 is switched by the NMOS-FET switching transistor 61 so as to perform the voltage conversion. Consequently, the power loss in the voltage converting part 52 is small. Particularly, since the NMOS-FET switching transistor 61 completely performs on-off operations responding with the PWM voltage signal Sw, the heat generation of the NMOS-FET switching transistor 61 is very small.

As described above, the embodiment has a motor configuration suitable for integration. Since the configuration is realized by using MOS-FET switching transistor and MOS-FET power transistors as power devices, these devices can be integrated on a small chip. Particularly, as a result of recent studies, it is prospected that MOS-FET power devices can be realized at a low cost by integration on the same chip.

The required semiconductor devices such as transistors and diodes of the control signal forming part 30, the altering signal forming part 34, the distributed signal forming part 36, the first current amplifying parts 41, 42, and 43, the second current amplifying parts 45, 46, and 47, the switching control part 51, the voltage converting part 52, and the high-voltage outputting part 53 are integrated on a single chip with being junction-isolated, together with the above-mentioned MOS-FET power transistors and MOS-FET switching transistor.

As compared with a dielectrically isolated integrated circuit, in a junction-isolated integrated circuit, integration can be performed with a high density on a small chip substrate, with the result that such an integrated circuit can be economically realized. FET transistors with a double diffused MOS structure are used as the first and second NMOS-FET power transistors, and integrated into a small chip size.

When FET transistors with a double diffused MOS structure are used, parasitic power diodes are formed in the direction from the current output terminal side to the current input terminal side. Since the operation of altering the current paths is analoguely performed, however, the parasitic power diodes are prevented from operating and pulsation of the drive currents is reduced.

The embodiment has a configuration in which parasitic transistor devices formed in junction-isolated portions are prevented from operating and which is suitable for integration. As shown in FIG. 8, an integrated circuit using the junction isolating technique can realize an IC which is adequate for high-density integration and which can be produced at a low cost. However, such an integrated circuit has a disadvantage that many parasitic transistor devices are formed in which junction-isolated portions connected to the negative terminal side (ground potential) of the DC power source are used as the base terminals.

Usually, these parasitic transistors are reversely biased so as not to operate. When a terminal potential of an integrated transistor becomes lower than the ground potential by the forward voltage drop of a diode, however, a phenomenon in which the parasitic transistors operate to take currents from the other integrated transistors occurs. In a motor wherein large currents are supplied to the windings and the converting inductor having inductances, when parasitic transistors operate, the operation of integrated transistors is largely impeded and the motor cannot be normally operated.

In the NMOS-FET switching transistor 61 of the embodiment, the current output terminal side is connected to the negative terminal side of the DC power source part 50. Therefore, the current input terminal side of the transistor is connected to one end of the converting inductor 63, and the power supply path through which the magnetic energy of the converting inductor 63 is replenished from the positive terminal side of the DC power source part 50 is subjected to high-frequency switching. The flywheel diode 62 constituting the current path forming circuit is connected between the one end of the converting inductor 63 and the positive terminal side of the DC power source part 50. The flywheel diode 62 performs off-on operations complementarily with the high-frequency switching on-off operations of the NMOS-FET switching transistor 61, and forms the current path from the converting inductor 63 to the circuit including the converting capacitor 64.

The converted DC potential (Vcc–Vg) is obtained between one end of the converting capacitor 64 and that of the DC power source part 50. The converted DC voltage is supplied to the second power amplifying parts 15, 16, and 17 connected in each-other parallel manner and the first power amplifying parts 11, 12, and 13 connected in each-other parallel manner. According to this configuration, the potentials of the terminals of the NMOS-FET switching transistor 61 and the flywheel diode 62 are not lower than the potential of the negative terminal side of the DC power source part 50. Even when the NMOS-FET switching transistor 61 performs the high-frequency switching, therefore, the parasitic transistors do not operate.

Since the first and second NMOS-FET power transistors analoguely alter the current paths, also the potentials of the terminals of the transistors are not lower than the potential of the negative terminal side of the DC power source part 50. Even when the first and second power transistors performs alteration of the current path, therefore, the parasitic transistors do not operate. As a result, even when the switching transistor, the flywheel diode, and the first and second power transistors are integrated into one chip together with other transistors, parasitic transistors in the integrated circuit can be completely prevented from operating.

In the embodiment, the power devices generate a very small amount of heat and a configuration suitable for integration is realized. Since each of the second NMOS-FET power transistors 85, 86, and 87 of the second power amplifying parts 15, 16, and 17 is saturated with a low resistive voltage drop in most of the activated period, the power losses of the second power amplifying parts are very small. Since the voltage drop of each of the first NMOS-FET power transistors 81, 82, and 83 of the first power amplifying parts 11, 12, and 13 in most of the activated period is controlled to a small voltage value by the switching control part 51 and the voltage converting part 52, the power losses of the transistors are very small.

Since the voltage converting part 52 performs the voltage conversion with causing the NMOS-FET switching transistor 61 to perform high-frequency PWM of about 200 kHz, the power loss owing to the voltage conversion is very small.

Therefore, the power losses and heat generation in the first and second power amplifying parts and the voltage converting part are very small, and the power transistors and the switching transistor can be integrated into one chip.

Moreover, a countermeasure to heat generation, such as a heat radiating plate is not required.

In the embodiment, the second power amplifying parts saturate at a low operation voltage, and the NMOS-FET switching transistor 61 of the voltage converting part 52 performs the PWM responding with the voltage drops of the first power amplifying parts. The invention is not restricted to this configuration.

For example, the first power amplifying parts may saturate at a low operation voltage, the voltage drops of the second power amplifying parts may be detected by the switching control part, and the NMOS-FET switching transistor of the voltage converting part may perform the PWM responding with the voltage drops of the second NMOS-FET power transistors. In this case, as compared with a composed forward gain of the second distribution control block and the second power amplifying parts, a composed forward gain of the first distribution control block and the first power amplifying parts is made larger and the first NMOS-FET power transistors of the first power amplifying parts are saturated each with a very low resistive voltage drop in most of the activated period.

The switching control part, the second distributor, the second current amplifying parts, and the second power amplifying parts form the feedback loop for setting the composed supply current Iv for a value corresponding to the command signal Ac, thereby controlling the currents supplied to the windings.

The switching control part detects the minimum voltage drop among the three-phase voltage drops of the second power amplifying parts and the PWM of the NMOS-FET switching transistor of the voltage converting part is controlled responding with the switching control signal Vd of the switching control part, whereby the voltage drops of the second power amplifying parts during activation are controlled to small values. As a result, the first power amplifying parts, the second power amplifying parts, and the NMOS-FET switching transistor of the voltage converting part generate a small amount of heat.

In the embodiment, the control signal forming part 30 comprises: the current detecting block (the resistor 31 and the level shift circuit 32) which obtains the current detected signal Bv responding with the composed supply current Iv; and the comparing block 33 which compares the current detected signal Bv with the command signal Ac and outputs the first and second control current signals C1 and C2 responding with the comparison result.

The conduction of the first power amplifying parts 11, 12, and 13 is controlled by using the first distributed current signals E1, E2, and E3 responding with the first control current signal C1, and that of the second power amplifying parts 15, 16, and 17 is controlled by using the second distributed current signals G1, G2, and G3 responding with the second control current signal C2.

According to this configuration, it is possible to supply drive currents responding with the command signal Ac, to the windings 2, 3, and 4. The operation of altering the current paths is analoguely smoothly performed, and hence the drive currents I1, I2, and I3 analoguely vary, so that pulsation of the drive currents and that of the driving force due to alteration of the current paths are reduced to a very small level.

In the embodiment, the first power amplifying parts are configured by the first FET current-mirror circuits using FET transistors, and the second power amplifying parts are configured by the second FET current-mirror circuits using FET transistors. Generally, FET transistors have nonlinear voltage amplification characteristics and are not suitable for analog power amplification. However, variation of the current amplifying ratios between the first power amplifying parts and the second power amplifying parts are reduced by forming FET power current-mirror circuits. When the FET power transistors are integrated, variation of the current amplifying ratio of the FET power current-mirror circuits can be remarkably reduced.

Furthermore, variation of the composed forward gain of the first power amplifying parts and the first distribution control block is reduced, and that of the second power amplifying parts and the second distribution control block is reduced. When the first and second control current signals C1 and C2 of the control signal forming part 30 are proportionally changed, therefore, a configuration is realized in which one of the first and second MOS power transistors is surely caused to saturate with a low resistive operation voltage in most of the activated period, and the composed supply current Iv to the windings can be accurately controlled by the other one of the first and second MOS power transistors, responding with the command signal Ac. In other words, the operation of controlling the composed supply current is highly stabilized.

The switching operation of the NMOS-FET switching transistor of the voltage converting part is controlled responding with the voltage drop of either of the first and second MOS-FET power transistors performing the current control, thereby enabling the voltage drop of the MOS-FET power transistor performing the current control to be accurately controlled to a predetermined value in the active operation region. Particularly, variation of the current amplifying ratio of the FET power current-mirror circuits are very small, and hence the current control operation and the voltage drop control operation are stabilized at the same time.

In the embodiment, the distributed signal forming part 36 is configured so that the first and second distributed current signals of the same phase have a phase difference of 180 degree and are changed so as to be altered complementarily and analoguely, and at least one of the first and second distributed current signals is surely set to be zero. According to this configuration, the first and second power amplifying parts of the same phase are not concurrently in the conduction state. As a result, a short-circuit current does not flow, and hence a current breakdown and thermal breakdown of the power transistors do not occur.

The first distribution control block supplies current signals responding with the first distributed current signals E1, E2, and E3 analoguely varying to the conduction control terminal sides of the first power amplifying parts, and the second distribution control block supplies current signals responding with the second distributed current signals G1, G2, and G3 analoguely varying to the conduction control terminal sides of the second power amplifying parts. Therefore, the driving currents to the windings due to the first and second power amplifying parts are analoguely continuously changed. As a result, the analoguely varying three-phase driving currents can be supplied to the three-phase windings, and hence pulsation of the generated force is reduced to a very low level.

In the embodiment, the first power amplifying parts 11, 12, and 13, the second power amplifying parts 15, 16, and 17, the control signal forming part 30, the altering signal forming part 34, the distributed signal forming part 36 (the first and second distributors 37 and 38), the first current amplifying parts 41, 42, and 43, the second current amplifying parts 45, 46, and 47, the switching control part 51, the voltage converting part 52, and the high-voltage outputting part 53 form a driving circuit for supplying the drive currents to the three-phase loads (the windings 2, 3, and 4).

The DC power source part 50 and the voltage converting part 52 form a voltage supplying circuit for supplying the converted DC voltage (Vcc−Vg) between the positive and negative output terminal sides of the voltage converting part 52.

These configurations may be adequately modified. The altering signal forming part 34 of the embodiment comprises the position detecting block 100 using magnetoelectrical converting elements. Alternatively, the three-phase altering signals may be produced by detecting the back electromotive forces generated in the windings 2, 3, and 4, without using such elements.

The first distributed current signals E1, E2, and E3 may be altered with forming a temporal inclination, and the second distributed current signals G1, G2, and G3 may be altered with forming a temporal inclination. According to this configuration, also the drive currents I1, I2, and I3 analoguely alter the current path with forming a temporal inclination.

Preferably, the current value is continuously changed when the polarity of the drive current is changed. Alternatively, there may exist a period in which the first and second distributed current signals of the same phase are concurrently zero, and a period in which the drive current of the phase is made zero.

Figure 19:
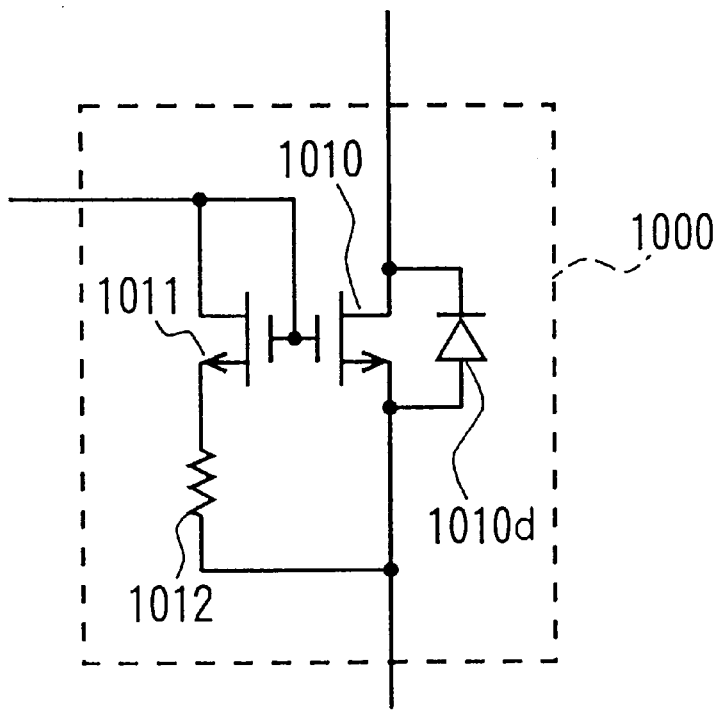
FIG. 19 is a circuit diagram of another configuration of a power amplifying part usable in Embodiments of the invention.

A power amplifying part 1000 shown in FIG. 19 can be used by replacing each of the first power amplifying parts 11, 12, and 13 or each of the second power amplifying parts 15, 16, and 17. The power amplifying part 1000 comprises an NMOS-FET power current-mirror circuit having an NMOS-FET power transistor 1010, an NMOS-FET transistor 1011, and a resistor 1012. The current amplifying ratio of the power amplifying part 1000 is almost a constant value when the input current to the conduction control terminal side is relatively small, and becomes larger when the input current becomes larger. The NMOS-FET power transistor 1010 can be a FET transistor with a double diffused N-channel MOS structure in order to be integrated in an IC, and a parasitic power diode 1010d is reversely connected from the current output terminal side of the transistor to the current input terminal side.

Figure 20:
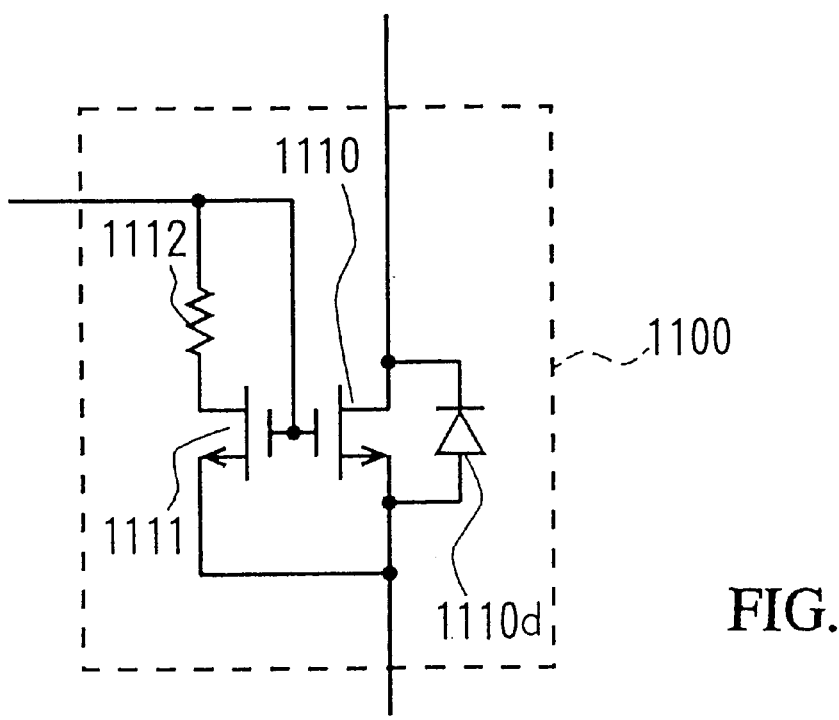
FIG. 20 is a circuit diagram of another configuration of a power amplifying part usable in Embodiments of the invention.

Another power amplifying part 1100 shown in FIG. 20 can be used by replacing each of the first power amplifying parts 11, 12, 13 or each of the second power amplifying parts 15, 16, and 17. The power amplifying part 1100 comprises an NMOS-FET power current-mirror circuit having an NMOS-FET power transistor 1110, an NMOS-FET transistor 1111, and a resistor 1112. The current amplifying ratio of the power amplifying part 1100 is almost a constant value when the input current to the conduction control terminal side is relatively small, and becomes larger when the input current becomes larger. The NMOS-FET power transistor 1110 can be a FET transistor with a double diffused N-channel MOS structure in order to be integrated in an IC, and a parasitic power diode 1110d is reversely connected from the current output terminal side of the transistor to the current input terminal side.

Therefore, the input current to the power amplifying part 1000 or 1100 can be remarkably reduced in the starting period of the motor when the drive currents to the windings become large.

Figure 23:
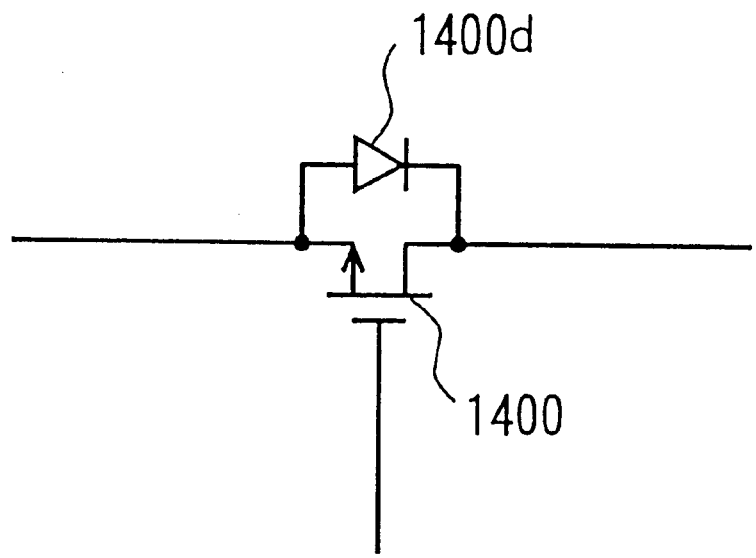
FIG. 23 is a circuit diagram of another configuration of a current path forming circuit in a voltage converting part usable in Embodiments of the invention.

A current path forming circuit with an NMOS-FET synchronous rectifying transistor 1400 shown in FIG. 23 can be used by replacing flywheel diode 62. The NMNOS-FET synchronous rectifying transistor 1400 may be controlled by a signal of the PWM block 65 so as to perform the synchronous switching off-on operations complimentarily with the high-frequency switching on-off operations of the switching transistor 61. The NMOS-FET transistor 1400 can be a FET transistor with a double diffused N-channel MOS structure in order to be integrated in an IC. The parasitic diode 1400d formed between the current input and output terminal sides of the synchronous rectifying transistor 1400 can perform a roll of the flywheel diode.

Figure 24:
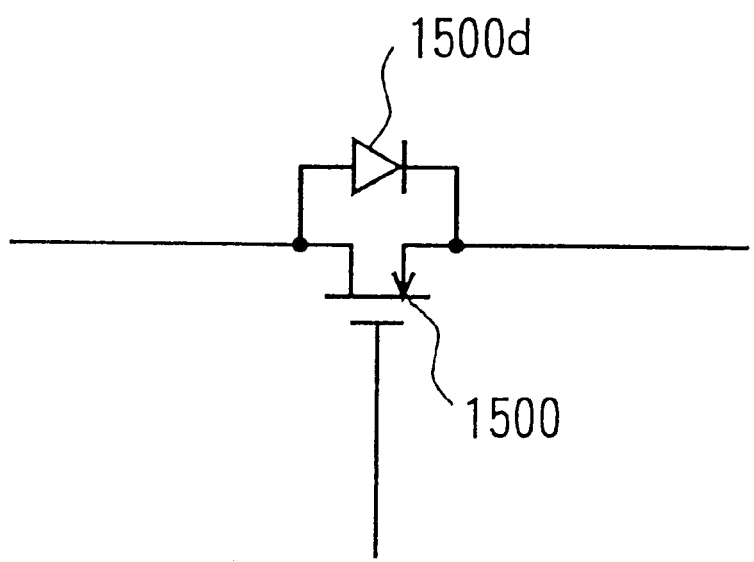
FIG. 24 is a circuit diagram of another configuration of a current path forming circuit in a voltage converting part usable in Embodiments of the invention.
Figure 25:
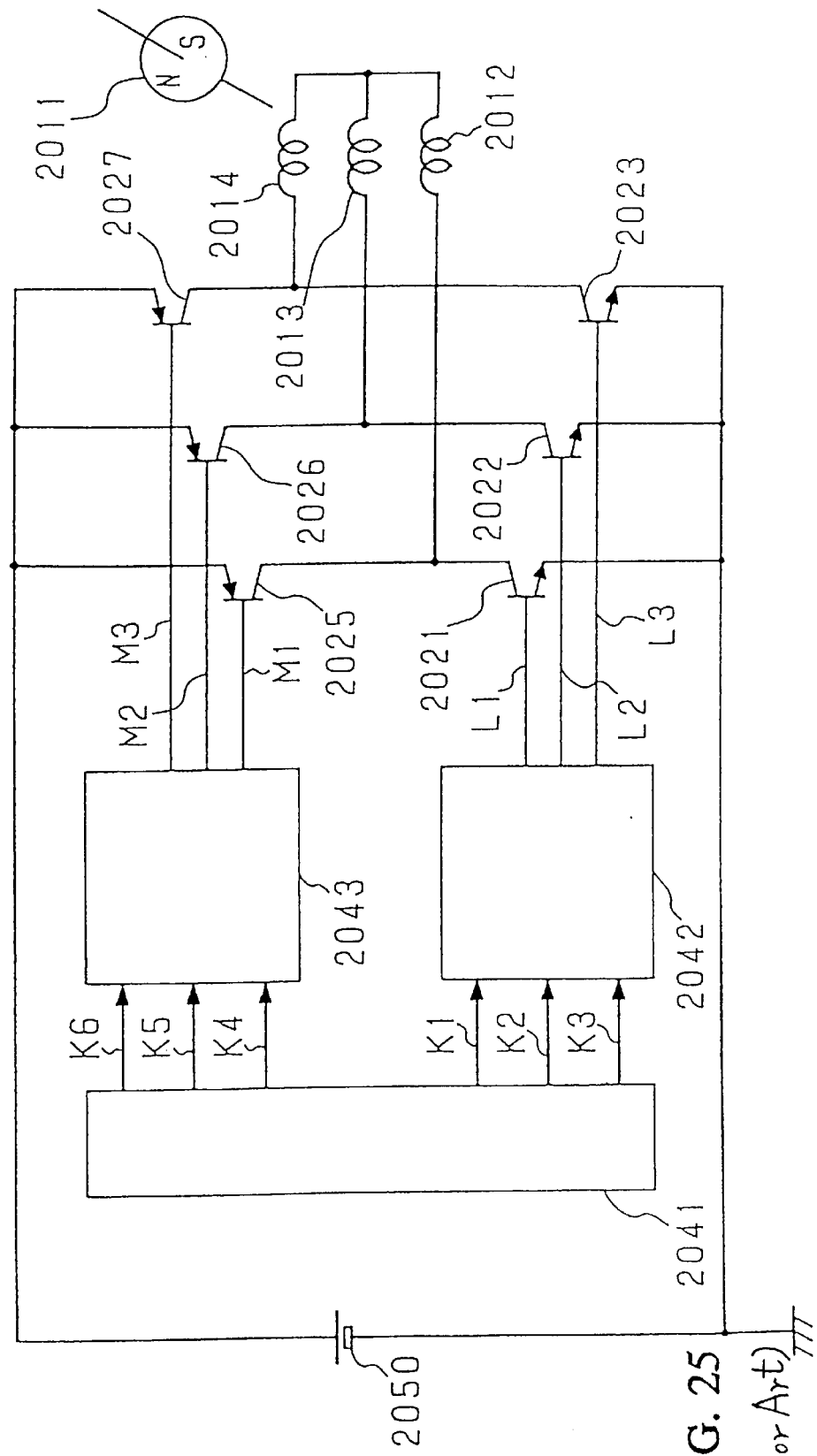
FIG. 25 is a view showing the configuration of a motor of the prior art.

Another current path forming circuit with a PMOS-FET synchronous rectifying transistor 1500 shown in FIG. 24 can be used by replacing the flywheel diode 62. The PMOS-FET synchronous rectifying transistor 1500 may be controlled by a signal of the PWM block 65 so as to perform the synchronous switching off-on operations complimentarily with the high-frequency switching on-off operations of the switching transistor 61. The PMOS-FET synchronous rectifying transistor 1500 can be a FET transistor with a double diffused P-channel MOS structure in order to be integrated in as IC. The parasitic diode 1500d formed between the current input and output terminal sides of the synchronous rectifying transistor 1500 can perform a roll of the flywheel diode.

<<Embodiment 2>>

Figure 9:
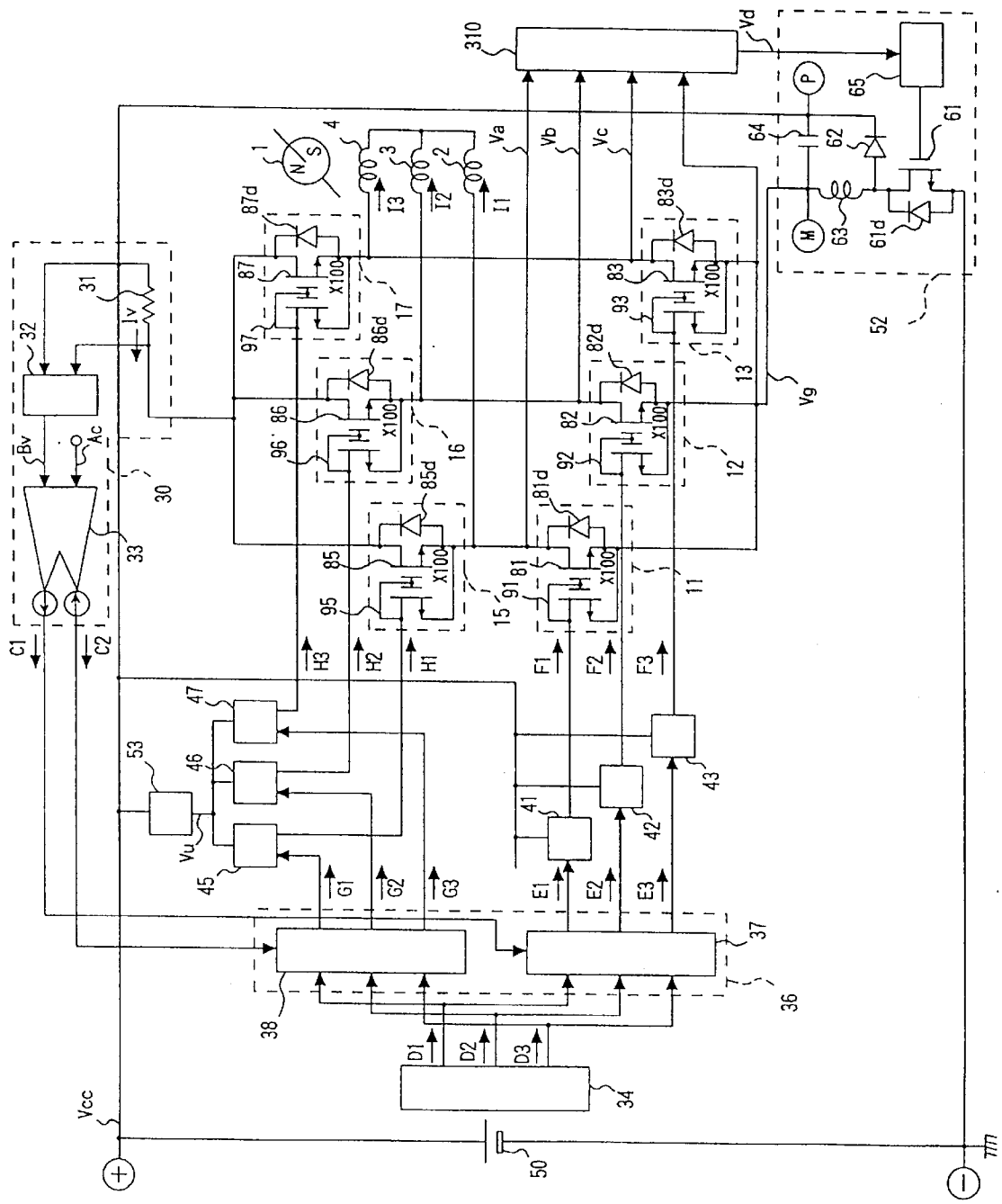
FIG. 9 is a view showing the configuration of Embodiment 2 of the invention.
Figure 10:
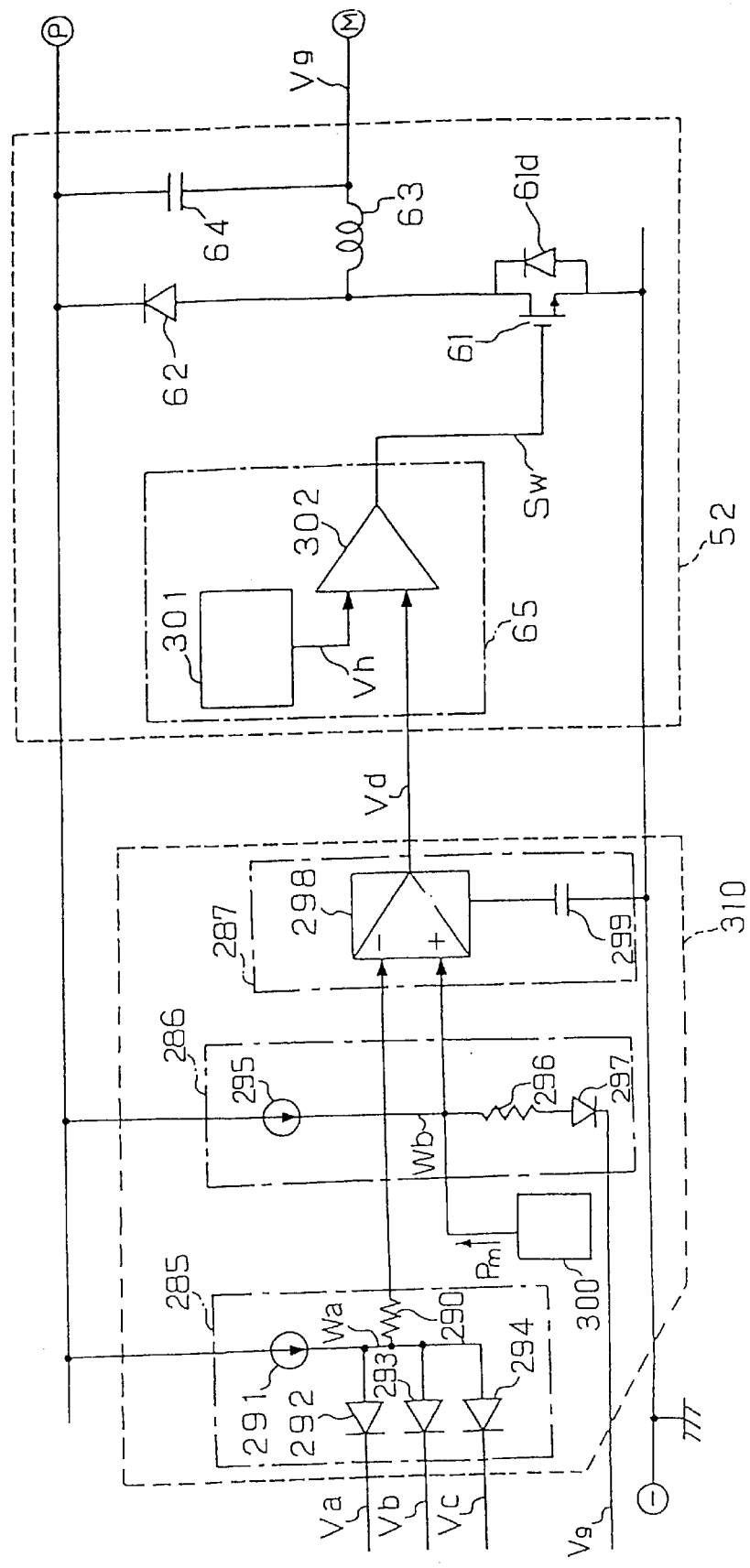
FIG. 10 is a circuit diagram of a switching control part 310 and a voltage converting part 52 of Embodiment 2.
Figure 11:
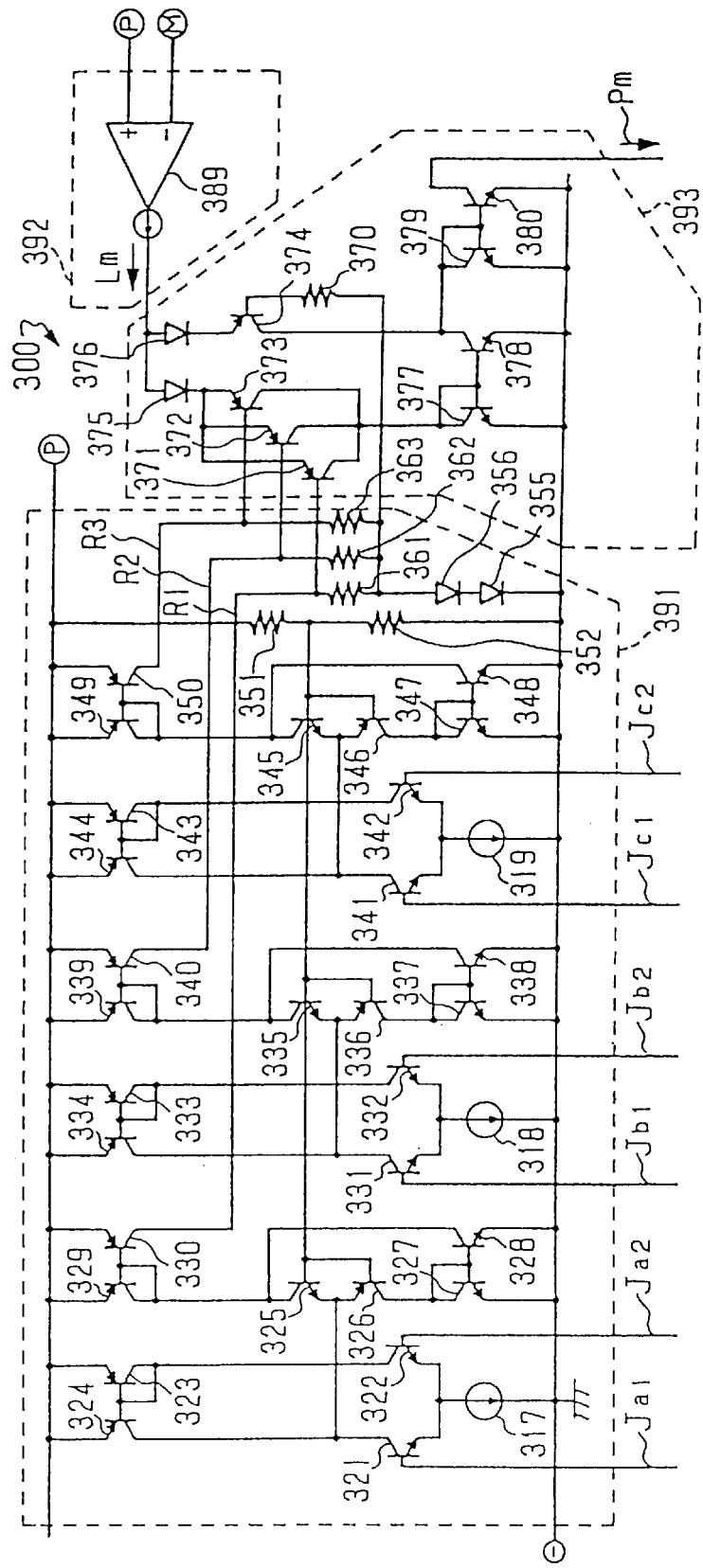
FIG. 11 is a circuit diagram of a modulating part 300 of Embodiment 2.

FIGS. 9 to 11 show a motor of Embodiment 2 of the invention.

FIG. 9 shows the configuration. In Embodiment 2, a modulating block 300 is disposed in a switching control part 310, and the converted DC voltage of the voltage converting part 52 is controlled responding with a voltage detected signal and a modulated signal. In the other configuration, components similar to those of above-mentioned Embodiment 1 are designated by the same numerals and their detailed description is omitted.

The switching control part 310 of FIG. 9 outputs a switching control signal Vd responding with a voltage detected signal of the first power amplifying parts and a modulated current signal Pm which will be described later. The voltage converting part 52 causes the NMOS-FET switching transistor 61 to perform high-frequency switching responding with the switching control signal Vd. The voltage converting part 52 produces the converted DC voltage (Vcc−Vg) responding with the PWM switching operation of the NMOS-FET switching transistor 61, with using the DC voltage Vcc of the DC power source part 50 as a power source.

FIG. 10 specifically shows the configuration of the switching control part 310 and the voltage converting part 52. The switching control part 310 is configured by the voltage potential detecting block 285, the reference potential block 286, the potential comparing block 287, and the modulating block 300. The voltage potential detecting block 285 detects the minimum potential value among the three-phase potentials Va, Vb, and Vc produced in the current input terminal sides of the first NMOS-FET power transistors 81, 82, and 83 of the first power amplifying parts 11, 12, and 13, by using the diodes 292, 293, and 294 and the constant current source 291, and produces the voltage detected signal Wa.

The reference potential block 286 detects the potential Vg of the common connect terminal side or the current output terminal sides of the first power amplifying parts 11, 12, and 13, by using the diode 297, the constant current source 295, and the resistor 296, and produces the reference voltage signal Wb which is higher than the potential Vg of the common connect terminal side, at a terminal of the resistor 296. The modulated current signal Pm of the modulating block 300 is supplied to the resistor 296 of the reference potential block 286, and the reference voltage signal Wb is also changed responding with the modulated current signal Pm of the modulating block 300.

In the potential comparing block 287, the differential amplifying part 298 compares the voltage detected signal Wa with the reference voltage signal Wb. The differential amplifying part 298 amplifies the difference voltage so as to output the switching control signal Vd. As a result, it is possible to obtain the switching control signal Vd responding with the voltage detected signals of the first power amplifying parts and the modulated current signal Pm. The capacitor 299 forms a low-pass filter in the differential amplifying part 298.

The PWM part 65 of the voltage converting part 52 comprises the triangular signal generating circuit 301 and the comparator 302. The comparator 302 compares the triangular signal Vh of the triangular signal generating circuit 301 with the switching control signal Vd of the switching control part 51, and produces the PWM voltage signal Sw responding with the switching control signal Vd.

The PWM voltage signal Sw is supplied to the conduction control terminal side of the NMOS-FET switching transistor 61. The NMOS-FET switching transistor 61 performs on-off operations responding with the PWM voltage signal Sw. The current output terminal side of the NMOS-FET switching transistor 61 is connected to the negative terminal side of the DC power source part 50, and the current input terminal side is connected to one end of the converting inductor 63. The NMOS-FET switching transistor 61 subjects the power supply path through which the magnetic energy of the converting inductor 63 is replenished from the positive terminal side of the DC power source part 50, to high-frequency switching.

The flywheel diode 62 is connected between the one end of the converting inductor 63 and the positive terminal side of the DC power source part 50, performs off-on operations complementarily with the high-frequency switching on-off operations of the NMOS-FET switching transistor 61, and forms a current path from the converting inductor 63 to the circuit including the converting capacitor 64.

The increase or decrease of the magnetic energy of the converting inductor 63 due to the high-frequency switching of the NMOS-FET switching transistor 61 causes the converted DC voltage (Vcc−Vg) to be output between one end of the converting capacitor 64 and that of the DC power source part 50.

FIG. 11 specifically shows the configuration of the modulating block 300. The modulating block 300 comprises: a modulation signal forming circuit 391 which obtains modulation signals R1, R2, and R3 changing in synchronization with the rotary movement of the movable body 1; a converted signal forming circuit 392 which obtains a converted current signal Lm proportional to the converted DC voltage of the voltage converting part 52; and a current modulating circuit 393 which produces the modulated current signal Pm by modulating the converted current signal Lm responding with the modulation signals R1, R2, and R3.

Transistors 321 and 322 of the modulation signal forming circuit 391 distribute the current of a constant current source 317 to the collector sides, responding with the position signals Ja1 and Ja2 of the altering signal forming part 34. The collector currents of the transistors 321 and 322 are compared with each other by a current-mirror circuit consisting of transistors 324 and 325. The absolute value of the difference of the collector currents is output via an absolute value circuit consisting of transistors 325, 326, 327, 328, 329, and 330, and a voltage signal R1 is produced at a resistor 361. In other words, the voltage signal R1 corresponds to the absolute value of the position signal Ja1.

Similarly, transistors 331 to 340, a constant current source 318, and a resistor 362 produce a voltage signal R2 corresponding to the absolute value of the position signal Jb1, at a terminal of the resistor 362. Furthermore, transistors 341 to 350, a constant current source 319, and a resistor 363 produce a voltage signal R3 corresponding to the absolute value of the position signal Jc1, at a terminal of the resistor 363. In other words, the voltage signals R1, R2, and R3 are three-phase absolute signals responding with the three-phase position signals Ja1, Jb1, and Jc1.

A voltage-to-current converting circuit 389 of the converted signal forming circuit 392 outputs the converted current signal Lm which is proportional or approximately proportional to the converted DC voltage between the positive output terminal side (P) and the negative output terminal side (M) of the voltage converting part 52. Transistors 371, 372, 373, and 374, and diodes 375 and 376 of the current modulating circuit 393 compare the three-phase absolute voltage signals R1, R2, and R3 with a predetermined voltage (in the embodiment, the voltage of the common connected terminal of the resistors 361, 362, and 363), and divide the converted current signal Lm to the collector sides of the transistors 371, 372, 373, and 374, responding with the comparison result.

The collectors of the transistors 371, 372, and 373 are common connected together. The composed collector current is compared with the collector current of the transistor 374 by a current-mirror circuit consisting of transistors 377 and 378. The difference current is output as the modulated current signal Pm via a current-mirror circuit consisting of transistors 379 and 380.

According to this configuration, the amplitude of the modulated current signal Pm is analoguely changed in synchronization with the rotary movement of the movable body 1. Because of the configuration of the transistors 371, 372, 373, and 374, and the diodes 375 and 376, particularly, the modulated current signal Pm is changed responding with a result of multiplication of the minimum value of the three-phase absolute voltage signals R1, R2, and R3 and the converted current signal Lm of the voltage-to-current converting circuit 389.

The minimum value of the three-phase absolute voltage signals R1, R2, and R3 is a higher harmonic signal which varies 6 times every one period of the position signals. Therefore, the modulated current signal Pm is a higher harmonic signal which has a peak amplitude proportional to the converted current signal Lm and which analoguely varies 6 times every one period (an electric angle of 360 degree) of the position signals. The number of changes correspond to that of alterations of the current paths to the windings 2, 3, and 4 by the first and second power transistors.

The voltage converting part 52 of FIG. 9 causes the NMOS-FET switching transistor 61 to perform high-frequency PWM, thereby variably controlling the converted DC voltage (Vcc−Vg) between the positive and negative output terminal sides. The switching control part 310 detects the minimum voltage drop among the three-phase voltage drops of the first NMOS-FET power transistors 81, 82, and 83 in the activated period, and the potential Vg of the negative output terminal side of the voltage converting part 52 is variably controlled responding with the output signal Vd of the switching control part 310.

According to this configuration, the switching control part 310 and the voltage converting part 52 form a control loop which controls the minimum voltage drop among the first power amplifying parts to a small value. As a result, the power loss and heat generation in the first power amplifying parts 11, 12, and 13 are reduced to a low level.

Moreover, the switching control part 310 comprises the modulating block 300 so as to further reduce the power loss. The modulated current signal Pm synchronized with the movable body 1 is produced by the modulating block 300. The switching control signal Vd of the switching control part 310 changes responding with not only the minimum voltage drop of the first power transistors 81, 82, and 83 but also the modulated current signal Pm. The minimum voltage drop of the first power transistors 81, 82, and 83 contains ripple voltage components which are changed by alterations of the current paths to the windings 2, 3, and 4.

It was found that, in a motor of a configuration in which the second power transistors 85, 86, and 87 in the activated period are saturated in the resistive operation region and the composed supply current to the windings are controlled by the first power transistors 81, 82, and 83, the minimum voltage drop of the first power transistors 81, 82, and 83 contains ripple voltage components which are changed in synchronization with the rotary movement of the movable body 1 and the number of changes of the ripple voltage components coincides with that of alterations of the current paths.

Therefore, the modulated current signal Pm having an amplitude which is changed in synchronization with the rotary movement of the movable body 1 is produced by the modulating block 300, and can compensates influence of the ripple voltage components. Therefore, the control accuracy of the voltage drops of the first power transistors is improved and the average of the voltage drops can be much lowered. As a result, the power losses and heat generation of the first power transistors are further reduced.

The other configuration and operation are similar to those of the above-mentioned Embodiment 1, and their detailed description is omitted.

In the embodiment, the power losses and heat generation of the power devices are further reduced.

Particularly, the switching control part 310 comprises the modulating block 300, and the switching operation of the switching transistor 61 of the voltage converting part 52 is controlled by the switching control signal Vd responding with both of the modulated current signal Pm and the voltage detected signals. According to this configuration, the average of the voltage drops of the first NMOS-FET power transistors 81, 82, and 83 can be controlled to a small value in the active operation region, and the power losses of the transistors are very small.

The magnitude of the modulated current signal Pm of the modulating block 300 is changed in proportion to the converted DC voltage of the voltage converting part 52. Even when the speed of the rotary movement is changed or the composed supply current is changed, therefore, the ripple voltage components contained in the voltage detected signals can be surely compensated and the voltage drops of the second power transistors are maintained to a required small value.

In some cases, the voltage-to-current converting circuit 389 of the modulating block 300 may be replaced with a constant current source and the current signal Lm may be a current of a predetermined value.

The effect of reduction of the power loss by the modulating block 300 of the switching control part 310 may be attained also by using bipolar transistors as the power transistors and the switching transistors.

As described above, the power devices generate a small amount of heat. Therefore, a motor configuration which is suitable for integration is obtained.

As a result, the required transistors, diodes, and resistors of the control signal forming part 30, the altering signal forming part 34, the distributed signal forming part 36, the first current amplifying parts 41, 42, and 43, the second current amplifying parts 45, 46, and 47, the switching control part 310, the voltage converting part 52, and the high-voltage outputting part 53 are easily integrated on a single chip together with the power transistors and the switching transistors.

The above-mentioned altering signal forming part 34 of the above-mentioned embodiment comprises the position detecting block 100 using magnetoelectrical converting elements. Alternatively, the three-phase altering signals may be produced by using, for example, the back electromotive force generated in the windings 2, 3, and 4, without using such elements. In the alternative, a zero-cross timing of the back electromotive force may be used as a timing signal, and the modulated current signal Pm of the modulating block which is changed in synchronization with the movement of the movable body 1 may be obtained.

<<Embodiment 3>>

Figure 12:
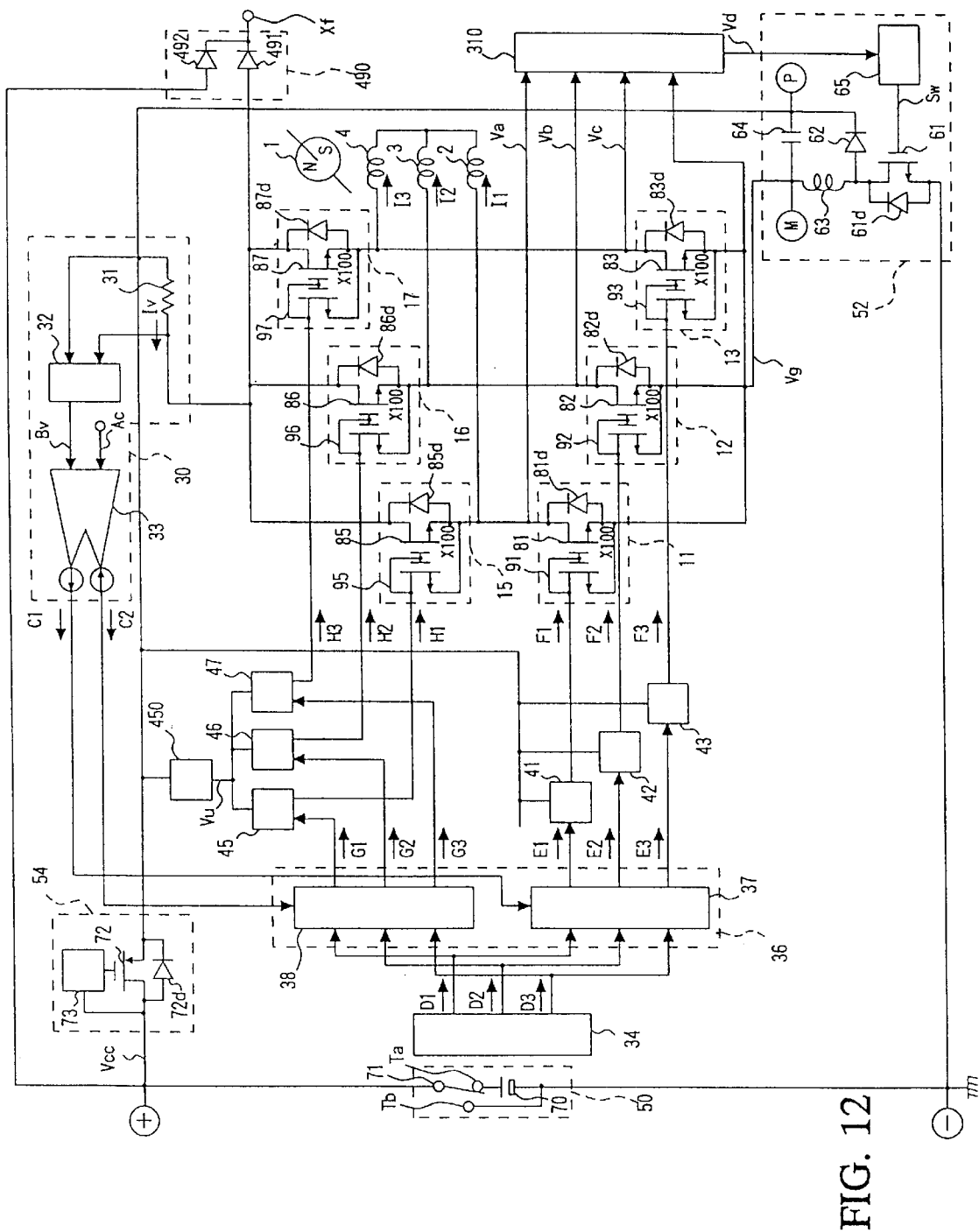
FIG. 12 is a view showing the configuration of Embodiment 3 of the invention.
Figure 13:
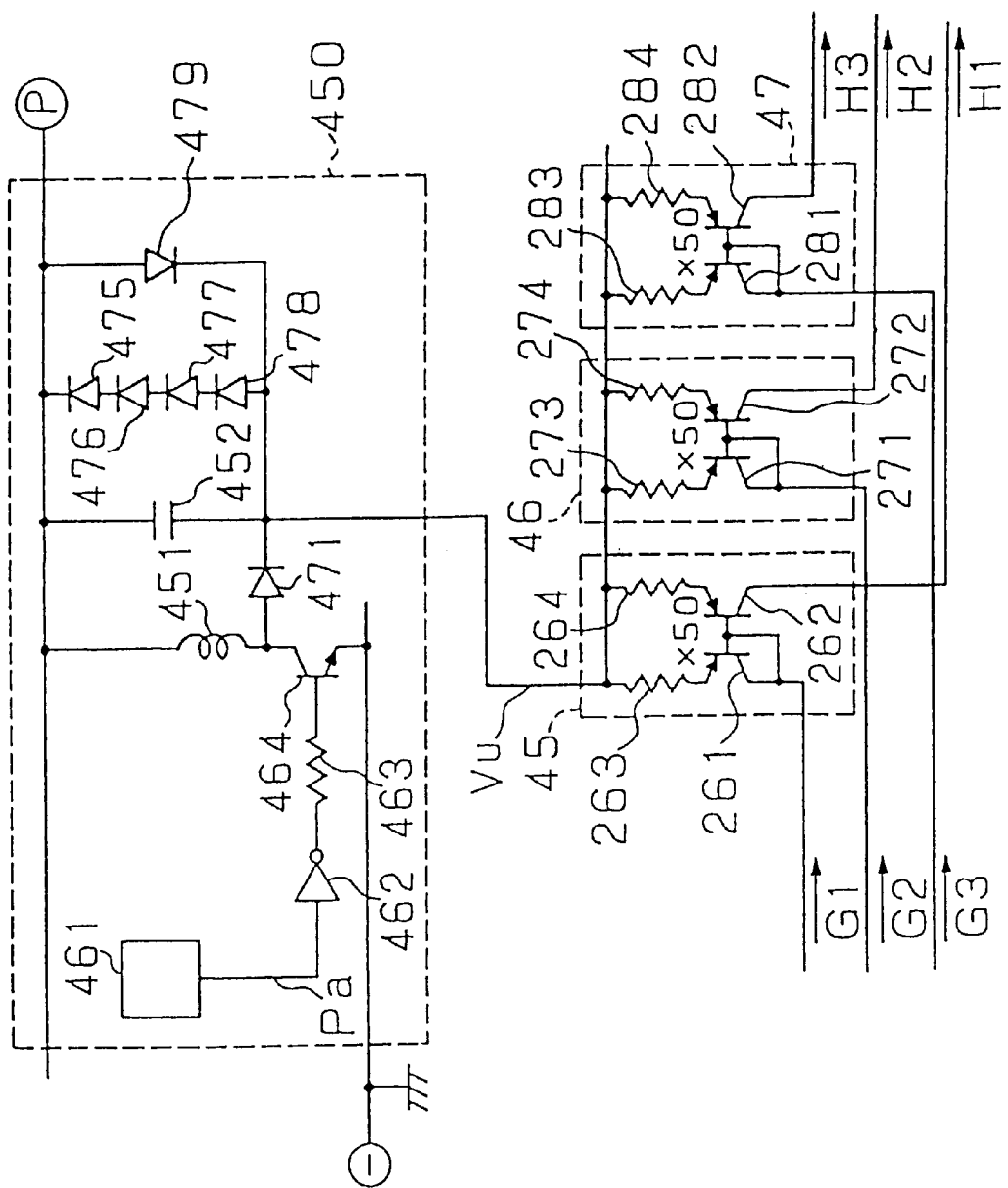
FIG. 13 is a circuit diagram of a high-voltage outputting part 450 of Embodiment 3.
Figure 14:
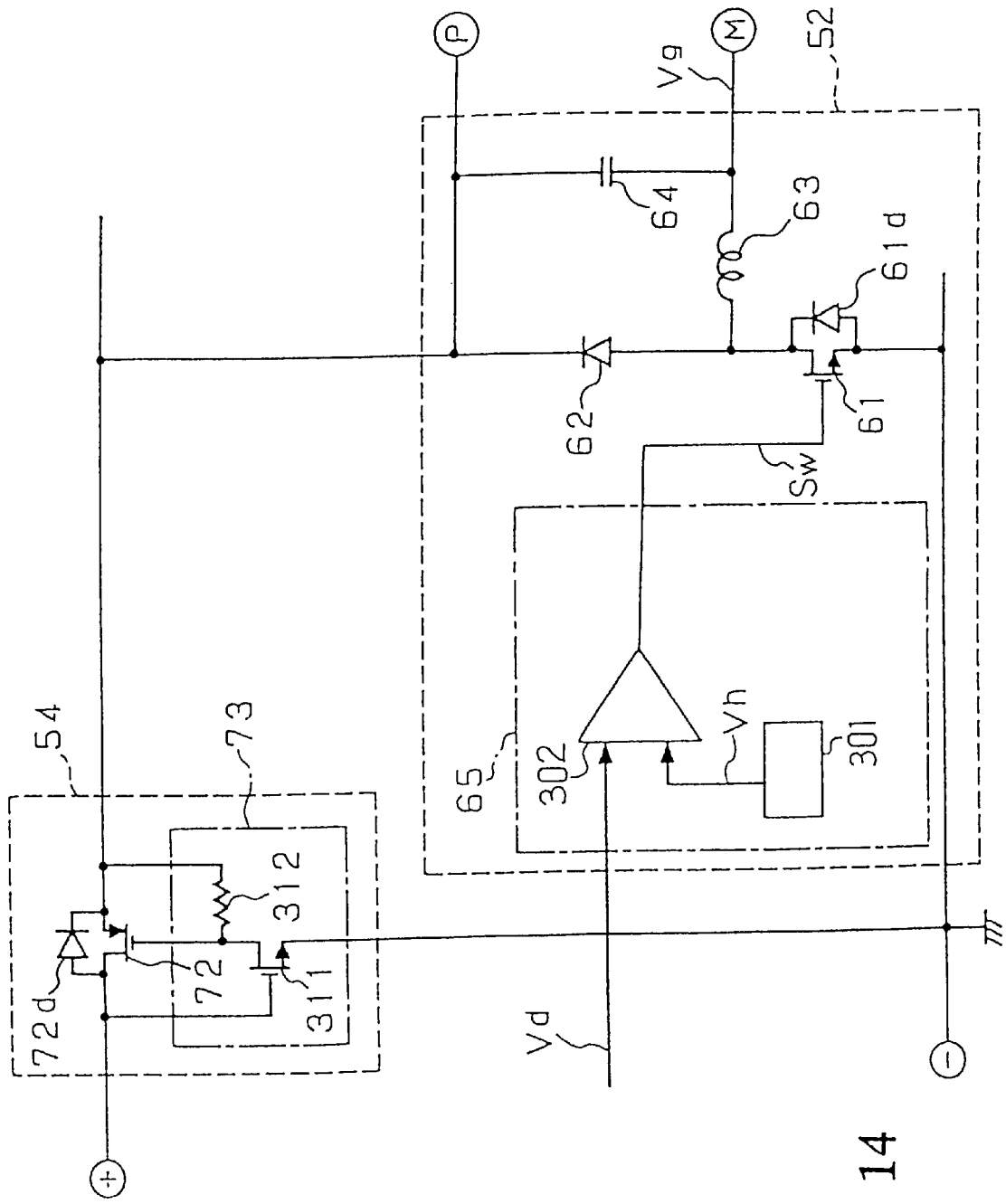
FIG. 14 is a circuit diagram of a power switch part 54 and a voltage converting part 52 of Embodiment 3.

FIGS. 12 to 14 show a motor of Embodiment 3 of the invention.

FIG. 12 shows the configuration. In Embodiment 3, when the DC power source part 50 is off, a power switch part 54 is turned off and a rectified DC voltage of the back electromotive forces of the windings 2, 3, and 4 is output at a terminal Xf of a voltage output part 490. A high-voltage outputting part 450 having a different configuration is used.

In the other configuration, components similar to those of above-mentioned Embodiment 2 or 1 are designated by the same numerals and their detailed description is omitted.

The high-voltage outputting part 450 of FIG. 12 comprises an upconverting inductor and an upconverting capacitor, produces a high-potential point potential Vu which is higher than the positive terminal potential Vcc of the DC power source part 50, and supplies the potential to the second current amplifying parts 45, 46, and 47.

FIG. 13 specifically shows the configuration of the high-voltage outputting part 450. The high-voltage outputting part 450 comprises: a pulse generating circuit 461 which outputs a high-frequency pulse signal Pa of about 100 kHz; the upconverting inductor 451; the upconverting capacitance 452; a first voltage limit circuit consisting of diodes 475 to 478; and a second voltage limit circuit consisting of a diode 479.

The state of an inverter 462 is digitally changed responding with the pulse signal Pa of the pulse generating circuit 461. When the pulse signal Pa is "L," a transistor 464 is turned on, a current flows into the upconverting inductor 451 via the transistor 464, and the upconverting inductor 451 is charged with a magnetic energy.

When the pulse signal Pa is changed to "H," the transistor 464 is turned off, a charging path through which a current flows into the upconverting capacitance 452 via the diode 471 is formed by the magnetic energy stored in the upconverting inductor 451, and the upconverting capacitance 452 are charged so that charges are stored therein. As a result, the high-potential point potential Vu which is higher than the positive terminal side potential Vcc of the DC power source part 50 is output from the terminal of the upconverting capacitance 452.

When the upconverting capacitance 452 is continued to be charged, the voltage Vu of the high potential point is raised to a very high level and a voltage breakdown of integrated transistors or diodes may occur. The first voltage limit circuit consisting of the diodes 475 to 478 limits the high-potential point voltage Vu so as not to be raised to a predetermined value or higher, thereby preventing a voltage breakdown from occurring. The second voltage limit circuit consisting of the diode 479 limits the high-potential point voltage Vu of the high-voltage outputting part 450 so as not to be lowered to a level which is very lower than the positive terminal side potential Vcc of the DC power source part 50. According to this configuration, even in a period when a large current is supplied, such as the case where the motor is started, the high-potential point voltage Vu is not excessively lowered, and hence the operation of the integrated circuit is stabilized.

In the case where the first and second voltage limit circuits are not necessary, the circuits may be omitted.

The DC power source part 50 of FIG. 12 is configured by, for example, a DC voltage source 70 and a switch circuit 71. When the DC power source part 50 is on, the switch circuit 71 is connected to the side of a terminal Ta and the DC voltage of the DC voltage source 70 is output between the positive terminal side (+) and the negative terminal side (−). When the DC power source part 50 is off, the switch circuit 71 is connected to the side of a terminal Tb and the positive and negative terminal sides of the DC power source part 50 is equivalently short-circuited. The DC power source part 50 is normally in the on state. In a power off, emergency, or irregular case, however, the DC power source part is off.

The power switch part 54 of FIG. 12 comprises a PMOS-FET power switch transistor 72 which is turned on and off responding with the output voltage of the DC power source part 50. When the DC power source part 50 supplies a predetermined output voltage, the PMOS-FET power switch transistor 72 is turned on for connecting the power supplying path from the positive terminal side of the DC power source part 50 toward the current input sides of the second power amplifying parts 15, 16 and 17.

When the DC power source part 50 is turned off (zero or a voltage much lower than the predetermined output voltage), the PMOS-FET power switch transistor 72 is turned off for interrupting the power supplying path between the positive terminal side of the DC power source part 50 and the current input terminal sides of the second power amplifying parts 15, 16, and 17.

The current input terminal side of the PMOS-FET power switch transistor 72 is connected to the positive terminal side of the DC power source part 50, and the current output terminal side is connected to the positive terminal side of the voltage converting part 52. The operation of the PMOS-FET power switch transistor 72 is switched over by a switch controller 73, and the on-off states is switched over responding with the output voltage of the DC power source part 50.

FIG. 14 specifically shows the configuration of the power switch part 54. The switch controller 73 is configured by an NMOS-FET transistor 311 and a resistor 312. When the switch circuit 71 of the DC power source part 50 is connected to the side of the terminal Ta and the DC power source part 50 outputs a predetermined voltage, the NMOS-FET transistor 311 is turned on and the PMOS-FET power switch transistor 72 is turned on.

When the connection of the switch circuit 71 of the DC power source part 50 is changed to the side of the terminal Tb and the DC power source part 50 is turned off, the NMOS-FET transistor 311 is turned off and also the PMOS-FET power switch transistor 72 is turned off. In the embodiment, the PMOS-FET power switch transistor 72 is configured by an FET transistor with a double diffused P-channel MOS structure which is reversely connected. Specifically, the drain terminal is used as the current input terminal side, the source terminal is used as the current output terminal side, and a switch diode 72d which is formed as a parasitic device is connected in an equivalent circuit or in a direction from the current input terminal side of the transistor to the current output terminal side.

When the PMOS-FET power switch transistor 72 is turned on, the ends of the switch diode 72d are short-circuited. When the PMOS-FET power switch transistor 72 is turned off, the switch diode 72d serves as a protect diode for preventing a reverse current from the current output terminal side of the transistor to the current input terminal side. Even when the switch diode 72d is omitted, however, there arises no problem in operation.

The voltage output part 490 of FIG. 12 comprises first and second output diodes 491 and 492 which are commonly connected to each other at their output sides. The input side of the first output diode 491 is connected to the common connected terminal side of the second NMOS-FET power transistors 85, 86, and 87 of the second power amplifying parts 15, 16, and 17. The input side of the second output diode 492 is connected to the positive terminal side of the DC power source part 50.

The output terminal Xf of the positive side of the voltage output part 490 is the common connected terminal side of the first and second output diodes 491 and 492. According to this configuration, the DC voltage produced at the common connected terminal side of the second NMOS-FET power transistors is compared with the output DC voltage Vcc of the DC power source part 50. A DC voltage responding with the larger one of the two voltage values is output at the output terminal Xf of the voltage output part 490.

Usually, the DC power source part 50 is on and a DC voltage responding with the DC voltage Vcc of the DC power source part 50 is output at the output terminal Xf of the voltage output part 490. When the DC power source part 50 is turned off in an emergency case, the output voltage Vcc becomes zero and the PMOS-FET power switch transistor 72 of the power switch part 54 is turned off.

When the DC power source part 50 is turned off, the command signal Ac is set to be zero so that the first and second control current signals C1 and C2 of the control signal forming part 30 are turned to be zero. So, the first distributed current signals of the first distributor 37 and the second distributed current signals of the second distributor 38 become zero. As a result, the conduction of the first NMOS-FET power transistors 81, 82, and 83 of the first power amplifying parts 11, 12, and 13 is stopped and that of the second NMOS-FET power transistors 85, 86, and 87 of the second power amplifying parts 15, 16, and 17 is stopped.

At this time, the three-phase back electromotive forces are being produced in the windings 2, 3, and 4 by the rotary movement of the movable body 1. The first power diodes 81d, 82d, and 83d, the second power diodes 85d, 86d, and 87d, and the switching diode 61d rectify the back electromotive forces produced in the windings 2, 3, and 4 and output a rectified DC voltage to the common connected terminal side of the second power amplifying parts.

Since the power switch transistor 72 of the power switch part 54 is turned off, the rectified DC voltage is output to the output terminal Xf via the first output diode 491 of the voltage output part 490. In other words, when the DC power source part 50 is off, the voltage output part 490 outputs the rectified DC voltage which is obtained by rectifying the back electromotive forces produced in the windings by the power diodes, to the output terminal Xf. It is possible to perform various retracting processes in an emergency case, by using the output voltage of the voltage output part 490.

The other configuration and operation are similar to those of the above-mentioned Embodiment 1 or 2, and their detailed description is omitted.

In the embodiment, when the DC power source part 50 is turned off, the rectified DC voltage which is obtained by rectifying the three-phase back electromotive forces produced in the windings 2, 3, and 4 by the first or second power diodes is output to the output terminal Xf of the voltage output part 490. It is possible to perform various retracting processes in an emergency case, by using the output voltage of the voltage output part 490.

For example, a case where the motor of the embodiment is used as a spindle motor of a hard disk device will be considered. When the DC power source part 50 is turned off, the contents of a RAM can be electrically stored or the playback head can be mechanically retracted by using the output voltage of the voltage output part 490.

When the DC power source part 50 is turned off, the first control current signal C1 of the control signal forming part 30 may be set to be a predetermined value. In this case, the first NMOS-FET power transistors 81, 82, and 83 of the first power amplifying parts 11, 12, and 13 can be sequentially turned on in accordance with the rotary movement of the movable body 1.

When the second control current signal C2 is made zero, all the second NMOS-FET power transistors 85, 86, and 87 of the second power amplifying parts 15, 16, and 17 can be turned off. When the PWM voltage signal Sw of the voltage converting part 52 is set to have a high voltage level, the NMOS-FET switching transistor 61 can be turned on.

According to this configuration, the negative voltage parts of the three-phase back electromotive forces of the windings can be rectified by activating the power transistors and the switching transistor, and the positive voltage parts can be rectified by the second power diodes 85d, 86d, and 87d. Besides, the voltage output part 490 may be configured by using MOS-FET transistors performing a switch operation, in place of the diodes 491 and 492.

Besides, in the case that the second control current signal C2 is made a predetermined larger value than zero, the positive voltage parts of the three-phase back electromotive forces can also be rectified by activating the second power transistors.

The embodiment also can attain the various advantages same as those of the above-mentioned embodiments.

<<Embodiment 4>>

Figure 15:
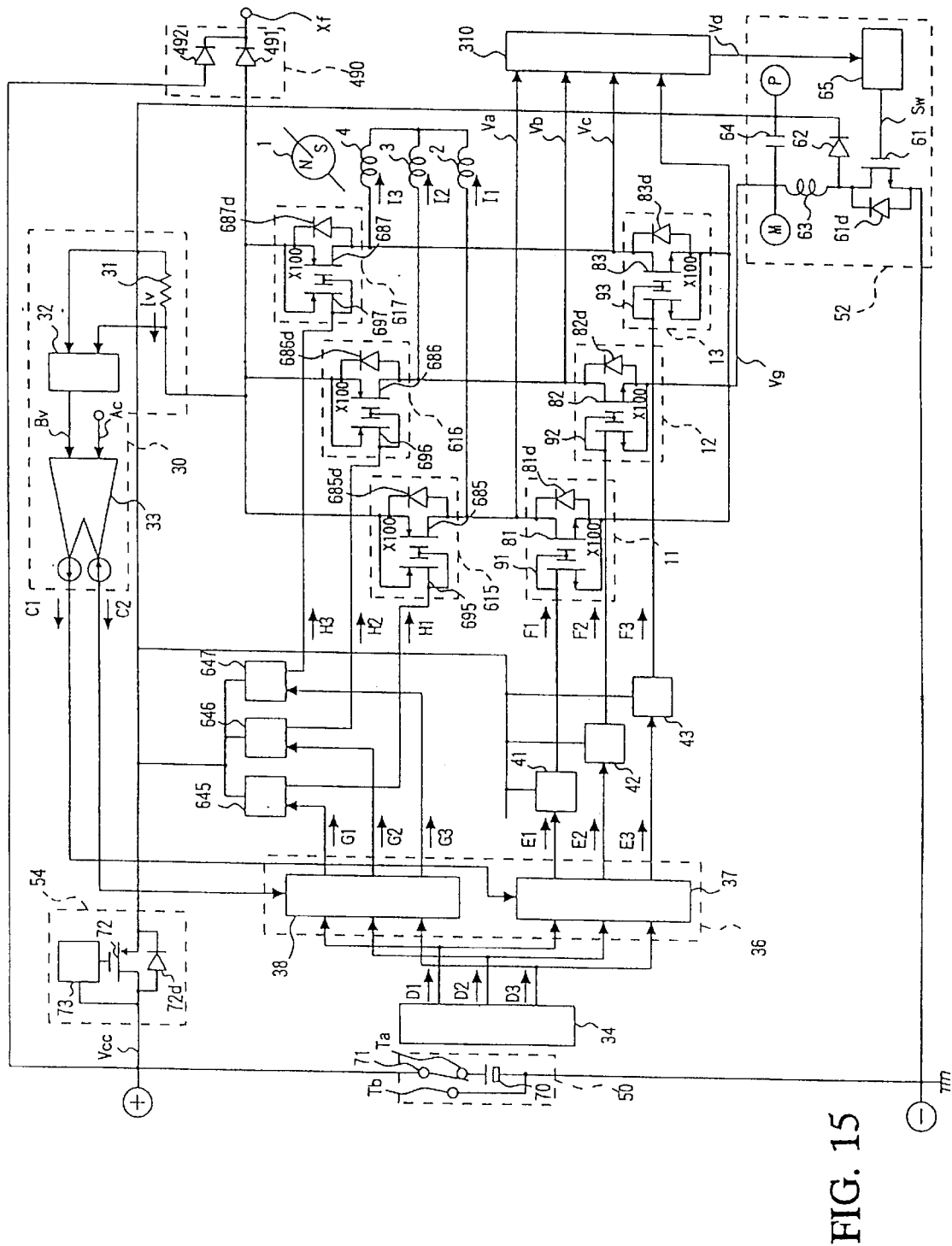
FIG. 15 is a view showing the configuration of Embodiment 4 of the invention.
Figure 16:
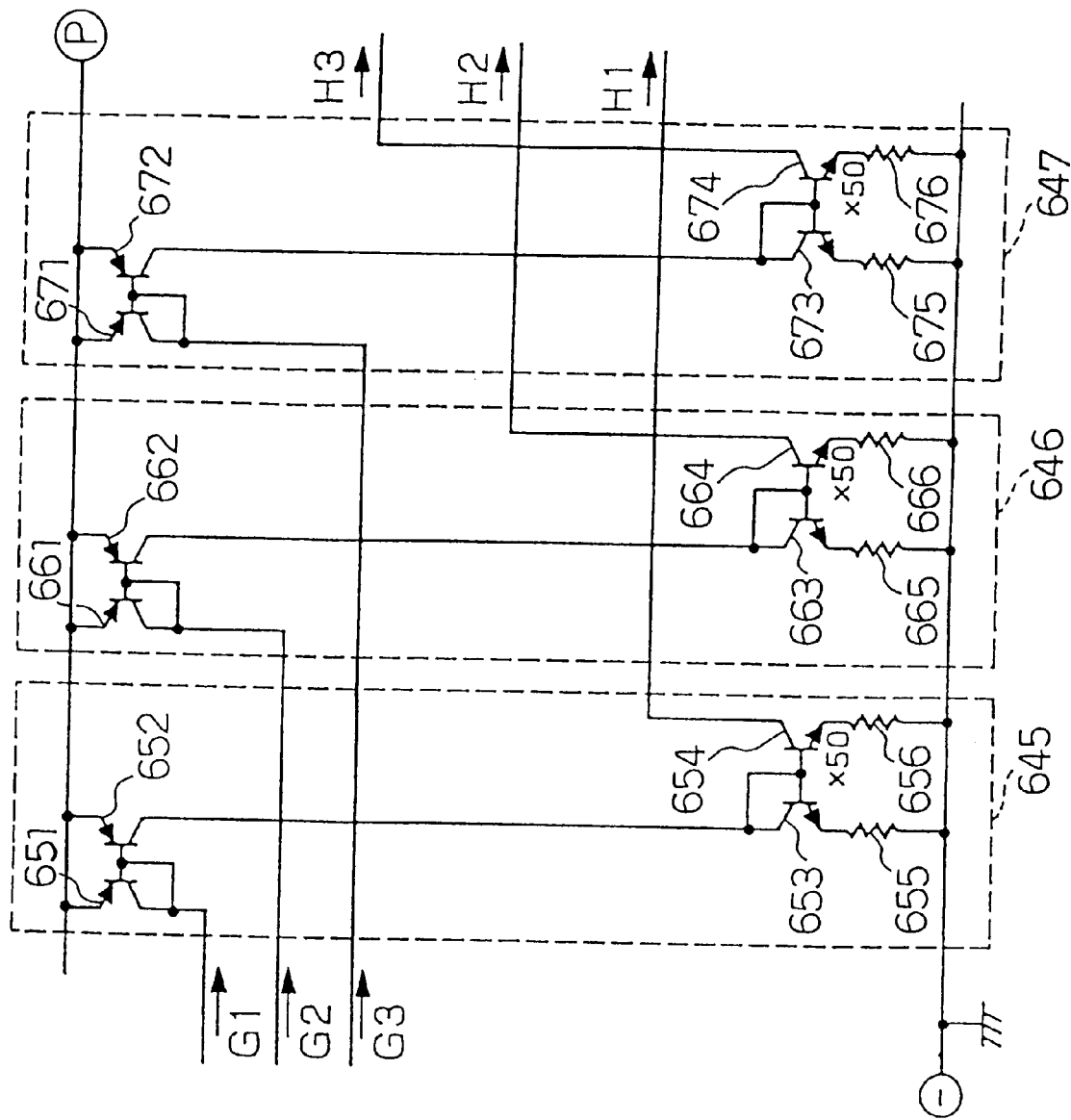
FIG. 16 is a circuit diagram of second current amplifying parts 645, 646, and 647 of Embodiment 4.

FIGS. 15 and 16 show a motor of Embodiment 4 of the invention.

FIG. 15 shows the configuration. In Embodiment 4, second PMOS-FET power transistors 685, 686, and 687 are used in second power amplifying parts 615, 616, and 617, and the high-voltage outputting part is omitted. To comply with this, second current amplifying parts 645, 646, and 647 are modified. In the other configuration, components similar to those of above-mentioned Embodiment 3, 2, or 1 are designated by the same numerals and their detailed description is omitted.

The current input terminal sides of the three second power amplifying parts 615, 616, and 617 are commonly connected to the positive output terminal side of the voltage converting part 52 of FIG. 15, via the current detecting resistor 31. The second power amplifying part 615 is configured by a second FET power current-mirror circuit consisting of the second PMOS-FET power transistor 685 and a PMOS-FET transistor 695, amplifies the output current signal H1 of the second current amplifying part 645 input to the conduction control terminal side by a predetermined ratio, and outputs the amplified signal.

A PMOS-FET transistor means an FET transistor with a P-channel MOS structure. An amplifying ratio of 100 is obtained in an active operation region by setting the cell size of the second PMOS-FET power transistor 685 to be 100 times that of the PMOS-FET transistor 695. The second PMOS-FET power transistor 685 is configured by an FET transistor with a double diffused P-channel MOS structure. A second power diode 685d which is formed as a parasitic device is reversely connected in an equivalent circuit or in a direction from the current output terminal side of the transistor to the current input terminal side.

Similarly, the second power amplifying part 616 is configured by a second FET power current-mirror circuit consisting of the second PMOS-FET power transistor 686 and a PMOS-FET transistor 696, amplifies the output current signal H2 of the second current amplifying part 646 input to the conduction control terminal side by a predetermined ratio, and outputs the amplified signal (the cell size is 100 times). The second PMOS-FET power transistor 686 is configured by an FET transistor with a double diffused P-channel MOS structure. A second power diode 686d which is formed as a parasitic device is reversely connected in an equivalent circuit or in a direction from the current output terminal side of the transistor to the current input terminal side.

Furthermore, the second power amplifying part 617 is configured by a second FET power current-mirror circuit consisting of the second PMOS-FET power transistor 687 and a PMOS-FET transistor 697, amplifies the output current signal H3 of the second current amplifying part 647 input to the conduction control terminal side by a predetermined ratio, and outputs the amplified signal (the cell size is 100 times). The second PMOS-FET power transistor 687 is configured by an FET transistor with a double diffused P-channel MOS structure. A second power diode 687d which is formed as a parasitic device is reversely connected in an equivalent circuit or in a direction from the current output terminal side of the transistor to the current input terminal side.

The current input terminal sides of the second PMOS-FET power transistors 685, 686, and 687 are commonly connected to the positive output terminal side of the voltage converting part 52 via the resistor 31, and the current output terminal sides are connected to the power supplying terminals of the windings 2, 3, and 4. According to this configuration, the second power amplifying parts 615, 616, and 617 supply the currents which are obtained by amplifying the input currents to the conduction control terminal sides, to the power supplying terminals of the windings 2, 3, and 4 so as to supply the positive current parts of the drive currents I1, I2, and I3 to the windings 2, 3, and 4, respectively.

The second distributed current signals G1, G2, and G3 of the second distributor 38 of FIG. 15 are input to second current amplifying parts 645, 646, and 647, respectively. The second current amplifying parts 645, 646, and 647 produce second amplified current signals H1, H2, and H3 which are obtained by current-amplifying the second distributed current signals G1, G2, and G3 by a predetermined ratio, and supply the amplified current signals to the conduction control terminal sides of the second power amplifying parts 615, 616, and 617, respectively. The second power amplifying parts 615, 616, and 617 current-amplify the three-phase second amplified current signals H1, H2, and H3 and supply the positive current parts of the drive currents I1, I2, and I3 from the current output terminal sides to the windings 2, 3, and 4, respectively.

FIG. 16 specifically shows the configuration of the second current amplifying parts 645, 646, and 647. The second current amplifying part 645 is configured by a second amplifying part current-mirror circuit which has a current-mirror circuit at the preceding stage and consisting of transistors 651 and 652, and a current-mirror circuit at the subsequent stage and consisting of transistors 653 and 654 and resistors 655 and 656, and in which the preceding and subsequent current-mirror circuits are cascaded together. The emitter area ratio of the transistors 651 and 652 is set to be 1 so that the preceding current-mirror circuit has a current amplifying ratio of 1.

The emitter area ratio of the transistors 653 and 654 is set to be 50 and the resistance ratio of the resistors 656 and 655 to be 50 so that the subsequent current-mirror circuit has a current amplifying ratio of 50. As a result, the second amplifying part current-mirror circuit of the second current amplifying part 645 performs amplification at a current amplifying ratio of 50. Similarly, the second current amplifying part 646 is configured by a second amplifying part current-mirror circuit consisting of transistors 661, 662, 663, and 664 and resistors 665 and 666, and performs amplification at a current amplifying ratio of 50.

Furthermore, the second current amplifying part 647 is configured by a second amplifying part current-mirror circuit consisting of transistors 671, 672, 673, and 674 and resistors 675 and 676, and performs amplification at a current amplifying ratio of 50. According to this configuration, the second current amplifying parts 645, 646, and 647 produce the three-phase second amplified current signals H1, H2, and H3 which are obtained by amplifying the three-phase second distributed current signals G1, G2, and G3 by a ratio of 50, and supply the produced signals to the conduction control terminal sides of the second power current-mirror circuits of the second power amplifying parts 615, 616, and 617.

In each of the second current amplifying parts 645, 646, and 647, each of the current output terminal sides of the output NPN transistors 654, 664, and 674 is connected to the negative terminal side of the DC power source part 50, and a current is supplied to each of the second power amplifying parts 615, 616, and 617 via each of the output transistors 645, 664, and 674. According to this configuration, the conduction of the second PMOS-FET power transistors 685, 686, and 687 of the second power amplifying parts 615, 616, and 617 is sufficiently controlled.

Next, the operation of the motor of FIG. 15 will be described. The altering signal forming part 34 supplies the three-phase altering current signals D1, D2, and D3 analoguely varying to the distributed signal forming part 36. The first distributor 37 distributes the first control current signal C1 of the control signal forming part 30, responding with the three-phase altering current signals D1, D2, and D3, and outputs the three-phase first distributed current signals E1, E2, and E3 analoguely varying.

The first current amplifying parts 41, 42, and 43 output the first amplified current signals F1, F2, and F3 which are obtained by current-amplifying the first distributed current signals E1, E2, and E3 by a predetermined ratio, and supply the signals to the conduction control terminal sides of the first power amplifying parts 11, 12, and 13, respectively. The first FET power current-mirror circuits of the first power amplifying parts 11, 12, and 13 current-amplify the first amplified current signals F1, F2, and F3 and supply the negative current parts of the drive currents I1, I2, and I3 to the three-phase windings 2, 3, and 4, respectively.

The second distributor 38 distributes the second control current signal C2 of the control signal forming part 30, responding with the three-phase altering current signals D1, D2, and D3, and outputs the three-phase second distributed current signals G1, G2, and G3 analoguely varying. The second current amplifying parts 645, 646, and 647 output the second amplified current signals H1, H2, and H3 which are obtained by current-amplifying the second distributed current signals G1, G2, and G3 by a predetermined ratio, and supply the signals to the conduction control terminal sides of the second power amplifying parts 615, 616, and 617, respectively.

The second FET power current-mirror circuits of the second power amplifying parts 615, 616, and 617 current-amplify the second amplified current signals H1, H2, and H3, and supply the positive current parts of the drive currents I1, I2, and I3 to the three-phase windings 2, 3, and 4, respectively.

The current detecting resistor 31 of the control signal forming part 30 detects the composed supply current Iv which is a composed value of the positive current parts of the drive currents I1, I2, and I3, and produces the current detected signal Bv responding with the composed supply current Iv, via the level shift circuit 32. The comparing block 33 compares the command signal Ac with the current detected signal Bv, and outputs the first and second control current signals C1 and C2 responding with the comparison result.

The first and second control current signals C1 and C2 are proportionally changed. The first distribution control block (the control signal forming part 30, the first distributor 37, and the first current amplifying parts 41, 42, and 43), and the first power amplifying parts 11, 12, and 13 constitute a feedback loop for setting the composed supply current Iv to be a predetermined value responding with the command signal Ac, thereby controlling the currents supplied to the windings 2, 3, and 4.

The second distribution control block (the control signal forming part 30, the second distributor 38, and the second current amplifying parts 645, 646, and 647), and the second power amplifying parts 615, 616, and 617 supply the negative current parts of the analoguely varying drive currents I1, I2, and I3 to the windings 2, 3, and 4, by performing saturated operations of the second PMOS-FET power transistors 685, 686, and 687, each with very low resistive voltage drop in the resistive operation region in most of the activated period. As compared with a composed forward gain of the first distribution control block and the first power amplifying parts, a composed forward gain of the second distribution control block and the second power amplifying parts is made larger in order to stabilize the motor operation.

In other words, each of the second PMOS-FET power transistors of the second power amplifying parts in most of the activated period is surely saturated with a low resistive voltage drop in the resistive operation region, so that the currents supplied to the windings can be controlled by the first NMOS-FET power transistors of the first power amplifying parts. The saturation with a low voltage drop in a PMOS-FET transistor means a resistive operation in a non-active operation region or a resistive operation region in which the voltage drop between the current input and output terminal sides of the transistor is a resistive voltage drop.

In each of the second PMOS-FET power transistors, the current amplification is performed in the active operation region in some of the altering period of the current path, so as to analoguely change the current value. In the period after altering, however, the resistive operation in the resistive operation region is performed. The first NMOS-FET power transistors operate in the active operation region to control the composed supply current, and, also in the altering period of the current paths, analoguely change the current values while performing the current control.

The first and second current signals E1 and G1 of the same phase complementarily flow with a phase difference of 180 degree. Therefore, the first and second power amplifying parts 11 and 615 complementarily operate and the bidirectional drive current I1 analoguely continuously varying is supplied to the winding 2.

Similarly, the first and second current signals E2 and G2 complementarily flow with a phase difference of 180 degree. The first and second power amplifying parts 12 and 616 complementarily operate and the bidirectional drive current I2 analoguely continuously varying is supplied to the winding 3.

Furthermore, the first and second current signals E3 and G3 complementarily flow with a phase difference of 180 degree. The first and second power amplifying parts 13 and 617 complementarily operate and the bidirectional drive current I3 analoguely continuously varying is supplied to the winding 4.

In this way, the first and second power amplifying parts of the same phase are not concurrently in the conduction state. Therefore, a short-circuit current does not flow between the first NMOS-FET power transistor and the second PMOS-FET power transistor. Since the continuous drive currents I1, I2, and I3 analoguely varying are supplied to the windings 2, 3, and 4, a spike voltage is not produced in the windings 2, 3, and 4, and an abnormal current does not flow through the first power diodes 81*d*, 82*d*, and 83*d* and the second power diodes 685*d*, 686*d*, and 687*d* which are parasitic devices. Therefore, pulsation of the generated force of the motor is reduced to a very low level.

The voltage converting part 52 causes the NMOS-FET switching transistor 61 to perform high-frequency PWM, thereby variably controlling the converted DC voltage (Vcc–Vg) between the positive and negative output terminal sides. The switching control part 310 detects the minimum voltage drop of the three-phase voltage drops of the first power amplifying parts, and outputs a switching control signal Vd responding with the voltage detected signals and the modulated current signal Pm of the modulating block 300.

The switching operation of the NMOS-FET switching transistor 61 is controlled responding with the output signal Vd of the switching control part 310, thereby variably controlling the converted DC voltage (Vcc–Vg) of the voltage converting part 52. According to this configuration, the voltage drops of the first NMOS-FET power transistors of the first power amplifying parts in the activated period are controlled to a small value.

The switching control part 310 comprises the modulating block 300. The modulated current signal Pm synchronized with the movable body 1 is produced by the modulating block 300. The switching control part 310 detects the voltage drops of the first power transistors 81, 82, and 83, calculatingly composes the voltage detected signals and the modulated current signal Pm, and outputs the switching control signal Vd responding with both the signals. As a result, an adverse effect due to the ripple voltage components of the voltage detected signals can be prevented from appearing in the switching control signal Vd. Therefore, the control accuracy of the voltage drops of the first power transistors is improved and the average of the voltage drops can be lowered. As a result, the power losses and heat generation of the first power transistors are further reduced.

When the DC power source part 50 is turned off in an emergency case, the rectified DC voltage which is obtained by rectifying the three-phase back electromotive forces produced in the windings 2, 3, and 4 by the first power diodes 81*d*, 82*d*, and 83*d*, or the second power diodes 685*d*, 686*d*, and 687*d* is output to the terminal Xf of the voltage output part 490. Various retracting processes in an emergency case are performed by using the output voltage of the voltage output part 490.

In the embodiment, a motor configuration which is suitable for an integrated circuit is obtained. First, the heat generation of the power devices is reduced, so that a thermal breakdown which may occur when the power transistors and the switching transistor are integrated is prevented from occurring. FET transistors with a double diffused MOS structure are used as the first and second power transistors, whereby the chip size is reduced. Moreover, parasitic diodes which are formed in a direction from the current output terminal side of the power transistor to the current input terminal side are used as the power diodes, and the chip area for the power diodes is made substantially zero.

Since the second PMOS-FET power transistors and PMOS-FET power switch transistor are used in the second power amplifying parts and the power switch part, no additional power source for operating these power devices is required (the high-voltage outputting part is omitted). According to this configuration, a power source other than the DC power source part 50 and the voltage converting part 52 is not required, and the configuration of the motor is extremely simplified.

According to this configuration, the potentials of the current input and output terminal sides of the NMOS-FET switching transistor are not lowered to a level lower than the potential of the negative terminal side (the ground potential) of the DC power source part 50. As a result, parasitic transistor devices in which junction-isolated portions are used as the base terminals can be prevented from operating, and the integrated circuit operation is stabilized.

In the embodiment, the second power amplifying parts saturate with a low resistive voltage drop and the switching transistor of the voltage converting part is caused to conduct the PWM operation responding with the voltage drops of the first power amplifying parts. The relationships may be inverted so that the first power amplifying parts saturate with a low resistive voltage drop, the voltage drops of the second power amplifying parts are detected by the switching control part, and the switching transistor of the voltage converting part is caused to conduct the PWM operation responding with the voltage drops of the second power transistors.

In the embodiment, the control signal forming part compares the command signal Ac with the current detected signal Bv, and outputs the first and second control current signals C1 and C2 responding with the comparison result. The conduction of the first power current-mirror circuits of the first power amplifying parts 11, 12, and 13 is controlled by using the first distributed current signals E1, E2, and E3 responding with the first control current signal C1, and that of the second power current-mirror circuits of the second power amplifying parts 15, 16, and 17 is controlled by using the second distributed current signals G1, G2, and G3 responding with the second control current signal C2.

According to this configuration, it is possible to supply accurate drive currents responding with the command signal Ac, to the windings 2, 3, and 4. At this time, the operation of altering the current path is analoguely smoothly performed, and hence the drive currents I1, I2, and I3 analoguely vary, so that pulsation of the drive currents and that of the driving force due to alteration of the current paths are reduced to a very small level.

In the embodiment, the first power amplifying parts 11, 12, and 13 are configured by the first FET power current-mirror circuits using the first NMOS-FET power transistors, thereby reducing variation of the current amplifying ratio. The second power amplifying parts 615, 616, and 617 are configured by the second FET power current-mirror circuits using the second PMOS-FET power transistors, thereby reducing variation of the current amplifying ratio.

Usually, an NMOS-FET power transistor and a PMOS-FET power transistor have largely different nonlinear voltage amplification characteristics. In the embodiment, however, variation of the current amplifying ratios between the NMOS-FET power current-mirror circuits and the PMOS-FET power current-mirror circuits can be extremely reduced. Therefore, the supply of the analoguely varying first distributed current signals to the first power amplifying parts allows the alteration of the current paths by the first power amplifying parts to be analoguely performed.

Moreover, the supply of the analoguely varying second distributed current signals to the second power amplifying parts allows the alteration of the current paths by the second power amplifying parts to be analoguely performed. Although either of the second PMOS-FET power transistor and the first NMOS-FET power transistor is surely caused to be saturated with a low operation voltage in activated period, the composed supply current Iv to the windings can be accurately controlled by the other of the first NMOS-FET power transistor and the second PMOS-FET power transistor.

The switching operation of the switching transistor is controlled responding with the voltage drop of the first NMOS-FET power transistor or the second PMOS-FET power transistor which performs the current control, and the voltage drop of the power transistor which performs the current control can be accurately controlled to a small value without disturbing the current control.

In the embodiment, when the DC power source part 50 is turned off, the rectified DC voltage which is obtained by rectifying the three-phase back electromotive forces produced in the windings by the first or second power diodes is output to the terminal Xf of the voltage output part 490. When the DC power source is turned off in an emergency case, the contents of a RAM can be electrically stored or a playback head can be mechanically retracted by using the output voltage of the voltage output part 490.

The embodiment also can attain the various advantages same as those of the above-mentioned embodiments.

The power amplifying part 1000 of FIG. 19 or the power amplifying part 1100 of FIG. 20 can be used by replacing each of the first power amplifying parts 11, 12, and 13.

Figure 21:
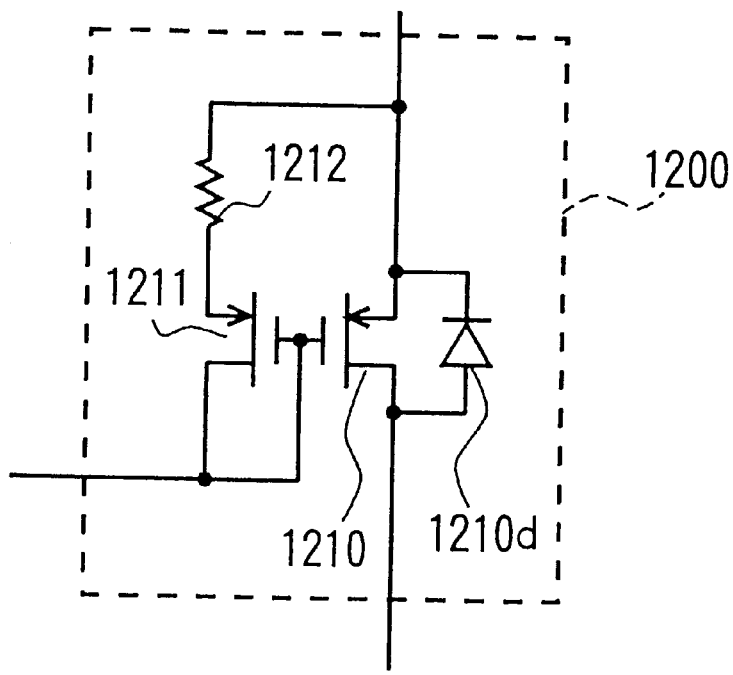
FIG. 21 is a circuit diagram of another configuration of a power amplifying part usable in Embodiments of the invention.

A power amplifying part 1200 shown in FIG. 21 can be used by replacing each of the second power amplifying parts 615, 616, and 617. The power amplifying part 1200 comprises a PMOS-FET power current-mirror circuit having a PMOS-FET power transistor 1210, a PMOS-FET transistor 1211, and a resistor 1212. The current amplifying ratio of the power amplifying part 1200 is almost a constant value when the input current to the conduction control terminal side is relatively small, and becomes larger when the input current becomes larger. The PMOS-FET power transistor 1210 can be a FET transistor with a double diffused P-channel MOS structure in order to be integrated in an IC, and a parasitic power diode 1210d is reversely connected from the current output terminal side of the power transistor to be current input terminal side.

Figure 22:
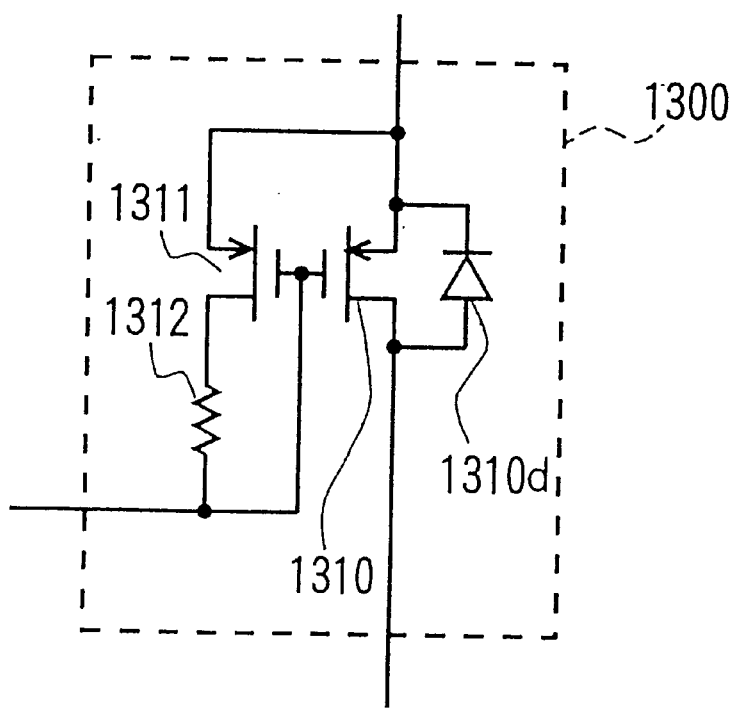
FIG. 22 is a circuit diagram of another configuration of a power amplifying part usable in Embodiments of the invention.

A power amplifying part 1300 shown in FIG. 22 can be used by replacing each of the second power amplifying parts 615, 616, and 617. The power amplifying part 1300 comprises a PMOS-FET power current-mirror circuit having a PMOS-FET power transistor 1310, a PMOS-FET transistor 1311, and a resistor 1312. The current amplifying ratio of the power amplifying part 1300 is almost a constant value when the input current to the conduction control terminal side is relatively small, and becomes larger when the input current becomes larger. The PMOS-FET power transistor 1310 can be a FET transistor with a double diffused P-channel MOS structure in order to be integrated in an IC, and a parasitic power diode 1310d is reversely connected from the current output terminal side of the power transistor to the current input terminal side.

<<Embodiment 5>>

Figure 17:
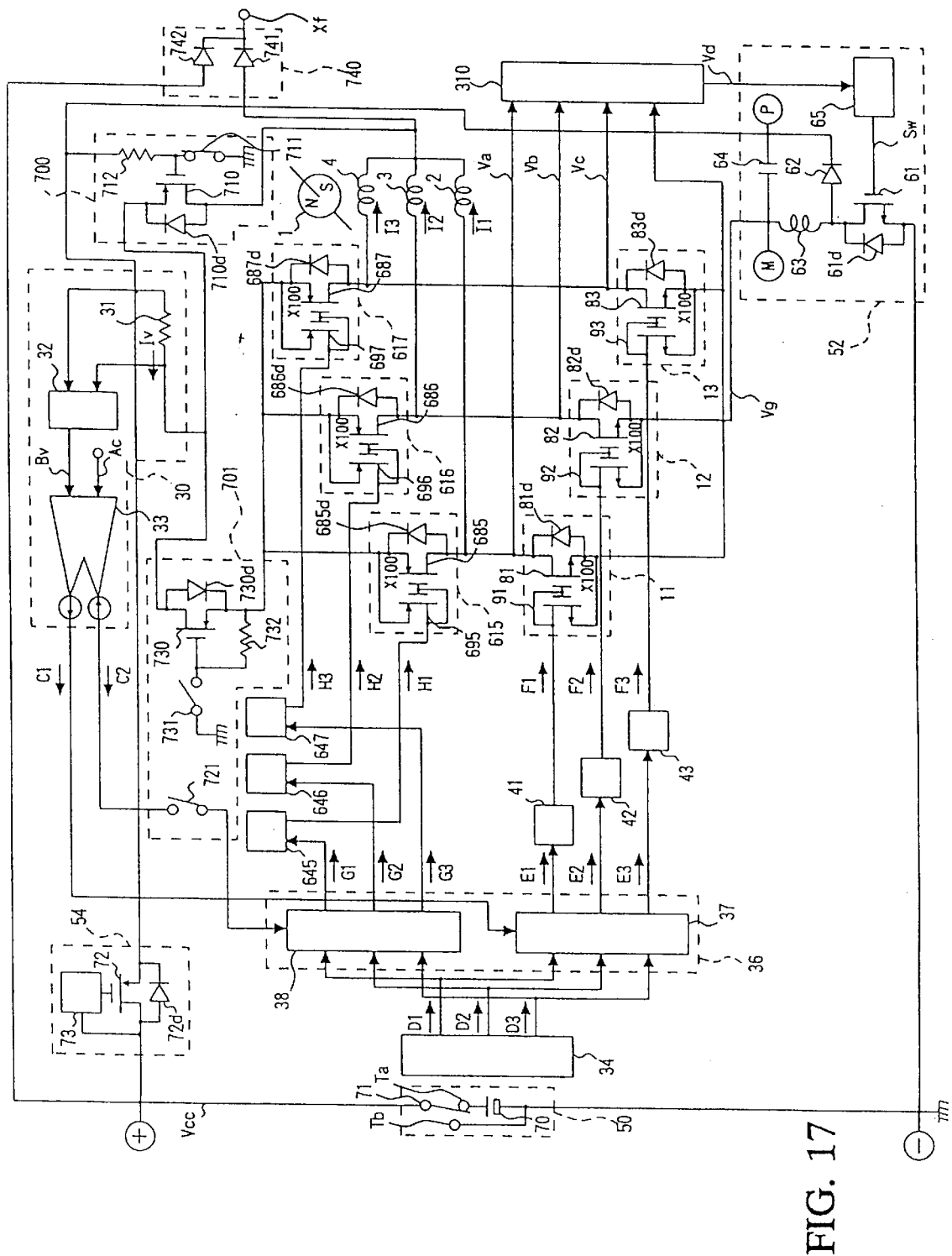
FIG. 17 is a view showing the configuration of Embodiment 5 of the invention.

FIG. 17 shows a motor of Embodiment 5 of the invention.

FIG. 17 shows the configuration. In Embodiment 5, a bypass switch part 701 and a shut-off part 702 are disposed, and the current supply can be performed while adequately altering a first activating mode wherein bidirectional drive currents are supplied to the windings 2, 3, and 4, and a second activating mode wherein unidirectional drive currents are supplied to the windings 2, 3, and 4. To comply with this, a voltage output part 740 is modified. In the other configuration, components similar to those of above-mentioned Embodiment 4, 3, 2, or 1 are designated by the same numerals and their detailed description is omitted.

First, the case (a first activating mode) where the bypass switch part 700 is off and the shut-off part 701 does not perform the shut-off operation will be described. In the first activating mode, a first switch element 711 of the bypass switch part 700 is off and second and third switch elements 721 and 731 of the shut-off part 701 are on. Since the first switch element 711 is off, a PMOS-FET bypass transistor 710 of the bypass switch part 700 is turned off.

The PMOS-FET bypass transistor 710 is configured by an FET transistor with a double diffused P-channel MOS structure. A diode 710d which is formed as a parasitic device is reversely connected in an equivalent circuit or in a direction from the current output terminal side of the transistor to the current input terminal side. Since the second switch element 721 of the shut-off part 701 is on, a second control current signal C2 of the control signal forming part 30 is supplied to the second distributor 38.

Since the third switch element 731 of the shut-off part 701 is on, a PMOS-FET shut-off transistor 730 is turned on. The PMOS-FET shut-off transistor 730 is reversely connected. The current input terminal side of the transistor is connected to the positive terminal side of the DC power source part 50 via the resistor 31 and the power switch part 54, and the current output terminal side is connected to the common connected terminal side or the current input terminal sides of the second power amplifying parts 615, 616, and 617.

The PMOS-FET shut-off transistor 730 is configured by an FET transistor with a double diffused P-channel MOS structure. A shut-off diode 730d which is formed as a parasitic device is connected in an equivalent circuit or in a direction from the current input terminal side of the transistor to the current output terminal side.

In the case where the first switch element 711 of the bypass switch part 700 is off and the second and third switch elements 721 and 731 of the shut-off part 701 are on, therefore, the configuration of the embodiment is substantially identical with that of the above-mentioned Embodiment 4. Consequently, the positive and negative or bidirectional drive currents I1, I2, and I3 are supplied to the windings 2, 3, and 4 by the first power amplifying parts 11, 12, and 13 and the second power amplifying parts 615, 616, and 617, which is the first activating mode. The specific configuration and operation of the embodiment are identical with those of the above-mentioned Embodiment 4, and hence their detailed description is omitted.

Next, the case (a second activating mode) where the bypass switch part 700 is on and the shut-off part 701 performs the shut-off operation will be described. In the second activating mode, the first switch element 711 of the bypass switch part 700 is on and the second and third switch elements 721 and 731 of the shut-off part 701 are off. Since the first switch element 711 is on, the PMOS-FET bypass transistor 710 of the bypass switch part 700 is turned on. Therefore, the PMOS-FET bypass transistor 710 forms a current path elongating from the positive output terminal side of the voltage converting part 52 to the common terminal side of the windings 2, 3, and 4 via the current detecting resistor 31.

Since the second switch element 721 of the shut-off part 701 is off, the second control current signal C2 of the control signal forming part 30 is not supplied to the second distributor 38. Consequently, the second distributed current signals G1, G2, and G3, and the second amplified current signals H1, H2, and H3 are zero. As a result, all the second PMOS-FET power transistors 685, 686, and 687 of the second power amplifying parts 615, 616, and 617 are turned off. Since the third switch element 731 is off, the shut-off transistor 730 is turned off.

At this time, the shut-off transistor 730 and the parasitic diode 730d of the transistor shut off the current path for the back electromotive forces generated in the windings 2, 3, and 4, thereby preventing an unnecessary current path from being formed. Consequently, the current paths to the windings 2, 3, and 4 are formed by the first NMOS-FET power transistors 81, 82, and 83 of the first power amplifying parts 11, 12, and 13 which are connected in a parallel manner between the positive and negative output terminal sides of the voltage converting part 52. In other words, the negative or unidirectional drive currents I1, I2, and I3 are supplied to the windings 2, 3, and 4, which is the second activating mode. A resistor 712 of the bypass switch part 700, and a resistor 732 of the shut-off part 701 are pull-up resistors, and may be omitted if unnecessary.

The operation of the second activating mode will be described. The control signal forming part 30 outputs the first and second control current signals C1 and C2 responding with a result of a comparison between the current detected signal Bv and the command signal Ac. The second control current signal C2 is blocked by the second switch element 721 of the shut-off part 701, so as not to be supplied to the second distributor 38. Therefore, all the second power amplifying parts 615, 616, and 617 stop the activation and do not supply a current to the windings 2, 3, and 4. By contrast, the first control current signal C1 is supplied to the first distributor 37.

The first distributor 37 distributes the first control current signal C1 responding with the three-phase altering current signals D1, D2, and D3 of the altering signal forming part 34, and outputs the three-phase first distributed current signals E1, E2, and E3 analoguely varying. The first current amplifying parts 41, 42, and 43 output the first amplified current signals F1, F2, and F3 which are obtained by current-amplifying the first distributed current signals E1, E2, and E3, and supply the amplified current signals to the conduction control terminal sides of the first power amplifying parts 11, 12, and 13, respectively.

The first power current-mirror circuits of the first power amplifying parts 11, 12, and 13 current-amplify the first amplified current signals F1, F2, and F3, and supply the unidirectional drive currents I1, I2, and I3 to the windings 2, 3, and 4, respectively. In this way, a feedback loop is formed by the first distribution control block (the control signal forming part 30, the first distributor 37, and the first current amplifying parts 41, 42, and 43), and the first power amplifying parts 11, 12, and 13, and the composed supply current responding with the command signal is supplied.

The switching control part 310 detects the voltage drops of the first NMOS-FET power transistors 81, 82, and 83 of the first power amplifying parts 11, 12, and 13, and outputs the switching control signal Vd responding with the minimum voltage drop.

The voltage converting part 52 causes the NMOS-FET switching transistor 61 to perform a high-frequency switching on-off operations responding with the switching control signal Vd. As a result, the converted DC voltage (Vcc–Vg) of the voltage converting part 52 is variably controlled, and the minimum voltage drop among the first power amplifying parts is controlled to a small value. The converted DC voltage of the voltage converting part 52 is supplied to the three first power amplifying parts 11, 12, and 13 which are connected in a parallel manner, the windings 2, 3, and 4, and the bypass switch part 700. The current path for supplying the unidirectional drive current to the winding is formed by the first power transistor of the selected first power amplifying part.

The voltage output part 740 compares the potential of the positive terminal side of the DC power source part 50 with that of the common terminal side of the windings, and outputs the voltage of the higher one. According to this configuration, when the DC power source part 50 is turned off, the rectified voltage signal of the back electromotive forces generated in the windings is output to the terminal Xf.

The other configuration and operation are similar to those of the above-mentioned Embodiment 4, and their detailed description is omitted.

In the embodiment, the current supply is performed while adequately altering the first activating mode wherein bidirectional drive currents are supplied to the windings, and the second activating mode wherein unidirectional drive currents are supplied to the windings, thereby allowing the motor performance to be changed. In the first and second activating modes, the power loss and heat generation in the power devices such as the first and second power amplifying parts, the switching transistor, the bypass transistor, and the shut-off transistor are small in level. Therefore, these power devices can be integrated as an IC on a single silicon substrate with being junction-isolated.

In the first activating mode wherein bidirectional drive currents are supplied to the windings, it is an advantage that the generated force can be larger. In the second activating mode wherein unidirectional drive currents are supplied to the windings, the back electromotive forces in the windings can be large in magnitude, and hence it is an advantage that the motor can rotate at a higher speed. Consequently, it is possible to realize a motor which can generate a large force and can rotate at a high speed.

The second power diodes 685d, 686d, and 687d which are parasitic devices are reversely connected to the second power transistors 685, 686, and 687. When the bypass transistor 710 is turned on and unidirectional drive currents are supplied to the windings 2, 3, and 4, the potential of the power supply terminal sides of the winding 2, 3, and 4 are alternatingly raised by the back electromotive forces generated in the windings, and the back electromotive forces cause a reverse current to flow via the second power diodes 685d, 686d, and 687d. In the embodiment, however, the shut-off transistor 730 is reversely connected and hence the reverse current path can be surely shut off by turning off the shut-off transistor 730.

The shut-off transistor 730 is not restricted to a reversely connected PMOS-FET transistor and may be configured also by a reversely connected NMOS-FET transistor. In such a reversely connected FET transistor, a parasitic diode is formed in a direction from the current input terminal side to the current output terminal side. When the shut-off transistor is turned off, also the parasitic diode functions to block the reverse current flow.

The embodiment also can attain the various advantages same as those of the above-mentioned embodiments.

In the embodiment, the first power amplifying parts 11, 12, and 13, the second power amplifying parts 615, 616, and 617, the control signal forming part 30, the altering signal forming part 34, the distributed signal forming part 36 (the first and second distributors 37 and 38), the first current amplifying parts 41, 42, and 43, the second current amplifying parts 645, 646, and 647, the switching control part 310, the voltage converting part 52, the bypass switch part 700, the shut-off part 701, and the voltage output part 740 form a driving circuit for supplying the drive currents to the three-phase loads (the windings 2, 3, and 4).

Alternatively, a motor in which only unidirectional drive currents are supplied to the windings may be realized. For example, a configuration may be formed in which the second power amplifying parts 615, 616, and 617, the shut-off part 701, and the bypass switch part 700 are omitted, and the common terminal side of the windings 2, 3, and 4 is connected to the positive output terminal side of the voltage converting part 52 via the resistor 31.

A high-voltage outputting part may be disposed, and NMOS-FET transistors may be used as the second power transistors 685, 686, and 687, the bypass transistor 710, and the shut-off transistor 730. The conduction of these devices may be controlled from the high-potential point of the high-voltage outputting part.

<<Embodiment 6>>

Figure 18:
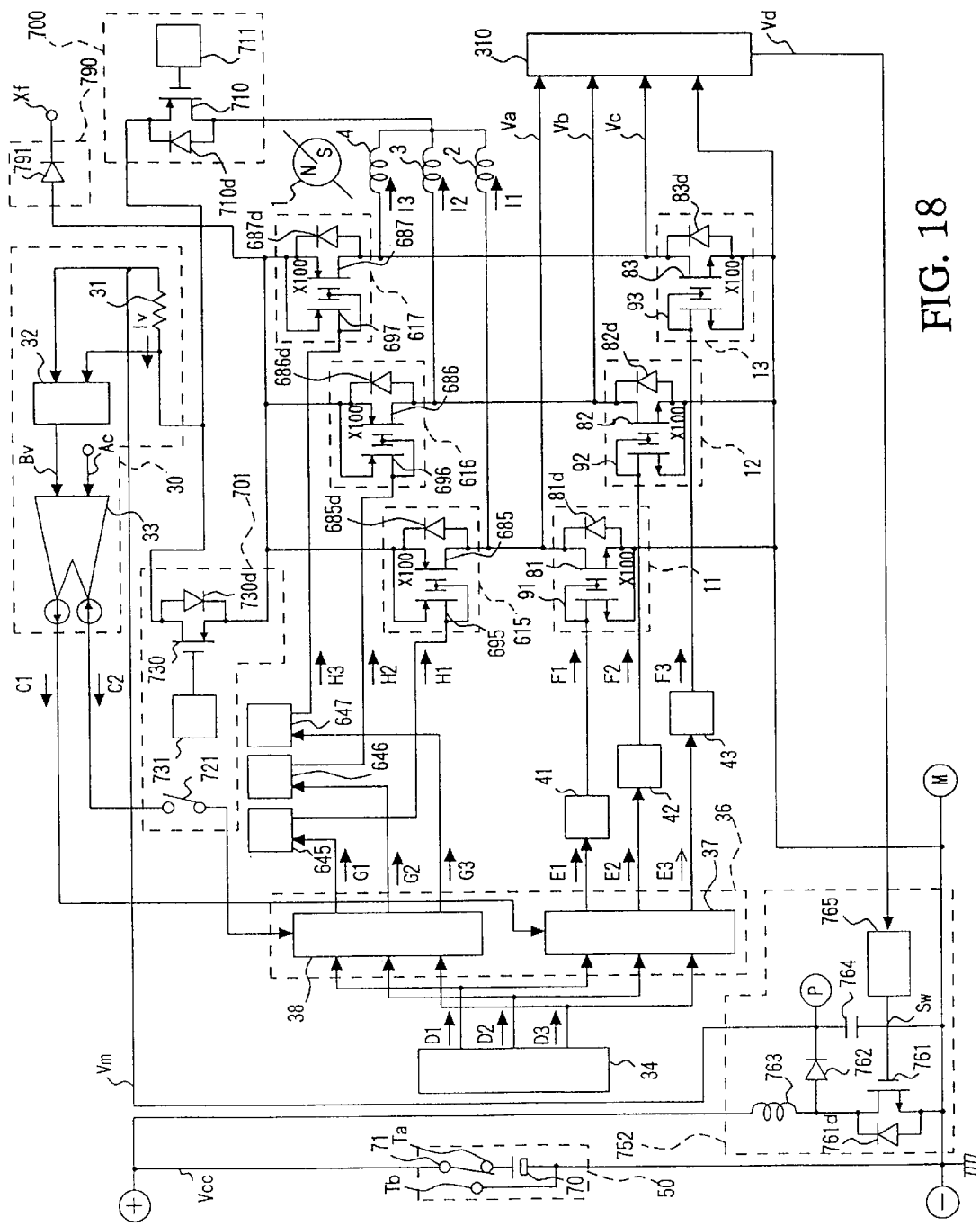
FIG. 18 is a view showing the configuration of Embodiment 6 of the invention.

FIG. 18 shows a motor of Embodiment 6 of the invention.

FIG. 18 shows the configuration. In Embodiment 6, a voltage converting part 752 performs voltage conversion which is configured as, for example, the high-voltage outputting part 450. In the other configuration, components similar to those of above-mentioned Embodiment 5, 4, 3, 2, or 1 are designated by the same numerals and their detailed description is omitted.

The voltage converting part 752 of FIG. 18 has an NMOS-FET switching transistor 761 which performs a high-frequency switching operation of about 200 kHz. In the NMOS-FET switching transistor 761, the current output terminal side is connected to the negative terminal side (−) of the DC power source part 50, and the current input terminal side to a terminal of a converting inductor 763. The transistor performs high-frequency switching (on-off operations) on a power supply path through which the magnetic energy of the converting inductor 763 is replenished from the positive terminal side (+) of the DC power source part 50 to the converting inductor 763.

A flywheel diode 762 connected to one terminal of the converting inductor 763 performs off-on operations complementarily with the high-frequency switching on-off operations of the NMOS-FET switching transistor 761 so as to constitute a current path through which the converting inductor 763 is connected to a circuit including a converting capacitor 764. When the NMOS-FET switching transistor 761 is on, a power supply path elongating from the positive terminal side of the DC power source part 50 and passing through the converting inductor 763 is formed, and the magnetic energy of the converting inductor 763 is replenished.

When the NMOS-FET switching transistor 761 is turned off, the terminal voltage of the converting inductor 763 is rapidly raised and the flywheel diode 762 is changed to be the conduction state, and the current path from the converting inductor 763 to the circuit including the converting capacitor 764 is formed. As a result, a converted DC voltage Vm is output between one end of the converting capacitor 764 and the negative terminal side of the DC power source part 50.

The converting capacitor 764 is connected between the positive output terminal side (P) and the negative output terminal side (M) of the voltage converting part 752, so as to constitute a filtering circuit which smooths a current and a voltage supplied via the converting inductor 763. Therefore, the potential Vm of the positive output terminal side of the voltage converting part 752 is variably controlled by subjecting the NMOS-FET switching transistor 761 to high-frequency PWM. As a result, with using the DC voltage Vcc supplied from the DC power source part 50 as a power source, the converted DC voltage Vm is produced between the positive and negative output terminal sides of the voltage converting part 752. The negative terminal of the DC power source part 50 is set as the ground potential (0 V).

The NMOS-FET switching transistor 761 is configured by, for example, an FET transistor with a double diffused N-channel MOS structure. A switching diode 761d which is formed as a parasitic device is reversely connected in an equivalent circuit or in a direction from the current output terminal side of the transistor to the current input terminal side.

The switching control part 310 detects the three-phase voltage drops between the current input and output terminal sides of the first power amplifying parts 11, 12, and 13, and outputs the switching control signal Vd responding with the minimum voltage drop. In the voltage converting part 752, a PWM part 765 produces a high-frequency PWM signal Sw having a pulse width responding with the switching control signal Vd, thereby causing the NMOS-FET switching transistor 761 to perform a high-frequency switching operation. In other words, the PWM switching operation of the NMOS-FET switching transistor 761 of the voltage converting part 752 is controlled responding with the switching control signal Vd of the switching control part 310.

The voltage converting part 752 produces the converted DC voltage Vm responding with the PWM switching operation of the NMOS-FET switching transistor 761, with using the DC voltage Vcc of the DC power source part 50 as a power source. The specific configuration of the PWM part 765 of the voltage converting part 752 is similar to that of the above-mentioned part shown FIG. 7, and hence its detailed description is omitted.

A voltage output part 790 of FIG. 18 comprises an output diode 791. The input side of the output diode 791 is connected to the common connected terminal side or the current input terminal sides of the second PMOS-FET power transistors 685, 686, and 687.

The output terminal Xf of the positive side of the voltage output part 790 is the output side of the output diode 791.

According to this configuration, the rectified DC voltage is output to the output terminal Xf via the output diode 791 of the voltage output part 790. In other words, when the DC power source 50 is turned off, the voltage output part 790 outputs the rectified DC voltage which is obtained by rectifying the back electromotive forces produced in the windings 2, 3, and 4 by the power diodes, to the output terminal Xf.

Since the flywheel diode 762 prevents a reverse current to flow from the three-phase windings 2, 3, and 4 toward the positive terminal side of the DC power source 50, the flywheel diode 762 performs a roll of a power switch part such as the power switch part 54 shown in FIG. 12 or FIG. 17.

It is possible to perform various retracting processes in an emergency case when the DC power source 50 is turned off, by using the rectified DC voltage of the voltage output part 790.

The other configuration and operation are similar to those of the above-mentioned Embodiment 5, and their detailed description is omitted.

In the embodiment, a motor configuration which is suitable for integration is obtained. First, the heat generation of the power devices is reduced, so that a thermal breakdown which may occur when the power transistors and the switching transistors are integrated is prevented from occurring. FET transistors with a double diffused MOS structure are used as the first and second power transistors and the switching transistor, whereby the chip size is reduced.

The NMOS-FET switching transistor in which the current output terminal side is connected to the negative terminal side of the DC power source conduct the PWM, and the converted DC voltage is obtained by the NMOS-FET switching transistor and the converting inductor. According to this configuration, the potentials of the current input and output terminal sides of the NMOS-FET switching transistor is not lowered to a level lower than the potential of the negative terminal side (the ground potential) of the DC power source part 50. As a result, parasitic transistor devices in which junction-isolated portions are used as the base terminals can be prevented from operating, and the motor operation is stabilized.

Since the second PMOS-FET power transistors, the PMOS-FET bypass transistor, the PMOS-FET shut-off transistor are used in the second power amplifying parts, the bypass switch part, and the shut-off part, no additional power source for operating these power devices is required.

In the embodiment, the current supply is performed while adequately altering the first activating mode wherein bidirectional drive currents are supplied to the windings, and the second activating mode wherein unidirectional drive currents are supplied to the windings, thereby allowing the motor performance to be changed. Even such alteration is conducted, the power loss and heat generation in the power devices such as the first and second power amplifying parts, the switching transistor, the bypass transistor, and the shut-off transistor are small in level. Therefore, these power devices can be integrated in an IC on a single silicon substrate with being junction-isolated.

In the embodiment, the converted DC voltage Vm of the voltage converting part 752 is able to be made larger than the output voltage Vcc of the DC power source part 50, and the voltage level supplied to the windings 2, 3, and 4 can be much raised. According to this configuration, a high-speed rotation of the motor can be easily realized. The flywheel diode 762 of the voltage converting part 752 is requested to form the current path from the converting inductor 763 to the circuit including the converting capacitor 764 when the switching transistor 761 is off. For example, the flywheel diode 762 may be replaced with an FET transistor with a double diffused structure, and the transistor may perform the switching off-on operations complementarily with the on-off operations of the switching transistor 761.

The current path forming circuit with the NMOS-FET synchronous rectifying transistor 1400 of FIG. 23 can be used by replacing the flywheel diode 762. The NMOS-FET synchronous rectifying transistor 1400 may be controlled by a signal of the PWM block 765 so as to perform the synchronous switching off-on operations complimentarily with the high-frequency switching on-off operations of the switching transistor 761. The parasitic diode 1400d of the synchronous rectifying transistor 1400 can perform a roll of the flywheel diode 762.

The current path forming circuit with the PMOS-FET synchronous rectifying transistor 1500 of FIG. 24 can be used by replacing the flywheel diode 762. The PMOS-FET synchronous rectifying transistor 1500 may be controlled by a signal of the PWM block 765 so as to perform the synchronous switching off-on operations complimentarily with the high-frequency switching on-off operations of the switching transistor 761. The parasitic diode 1500d can perform a roll of the flywheel diode 762.

Further, the PMOS-FET synchronous rectifying transistor 1500 in replacing the flywheel diode 762 performs a roll of a power switch transistor such as the PMOS-FET power switch transistor 72 shown in FIG. 17, because the PMOS-FET synchronous rectifying transistor 1500 prevents a reverse current to flow from the windings 2, 3, and 4 toward the positive terminal side of the DC power source part 50 when the DC power source part 50 is turned off.

In the embodiment, the control signal forming part compares the command signal Ac with the current detected signal Bv, and outputs the first and second control current signals C1 and C2 responding with the comparison result. The conduction of the first power current-mirror circuits of the first power amplifying parts 11, 12, and 13 is controlled by using the first distributed current signals E1, E2, and E3 responding with the first control current signal C1, and that of the second power current-mirror circuits of the second power amplifying parts 615, 616, and 617 is controlled by using the second distributed current signals G1, G2, and G3 responding with the second control current signal C2.

According to this configuration, it is possible to supply accurate drive currents responding with the command signal Ac, to the windings 2, 3, and 4. At this time, the operation of altering the current paths is analoguely smoothly performed, and hence the drive currents I1, I2, and I3 analoguely vary, so that pulsation of the drive currents and that of the driving force due to alteration of the current paths are reduced to a very small level. This effect can be attained not only in the first activating mode of the bidirectional current supply in which the bypass transistor 710 is off, but also in the second activating mode of the unidirectional current supply in which the bypass transistor 710 is on.

In the embodiment, the DC power source part 50 and the voltage converting part 752 form a voltage supplying circuit for supplying the converted DC voltage Vm between the positive and negative output terminal sides of the voltage converting part 752.

The converted DC voltage Vm of the voltage supplying circuit can be larger than the voltage of the DC power source part 50.

The embodiment also can attain the various advantages same as those of the above-mentioned embodiments.

The specific configuration of the above-mentioned embodiments can be variously modified. For example, the winding of each phase may be configured by connecting plural partial windings in series or in parallel. The connection of the three-phase windings is not restricted to the star-connection and the windings may be delta-connected. Generally, a multi-phase motor can be configured. The field part of the movable body is not restricted to the illustrated one and may be variously configured. The number of poles is not limited to two, and a multi-pole configuration may be possible. Generally, there are many configurations of the field part usable in the embodiments, which produces fluxes to the windings changing in correspondence with the movement of the movable body. The motion of the movable body is not restricted to a rotary movement and the movable body may perform a linear movement.

The switching control part is not restricted to the above described configurations, and the switching control part and/or the voltage converting part may be omitted if the powerlosses of the first and second power transistors are allowable.

There are many modified configurations of the first and second power amplifying parts, some of which are shown in FIG. 19 to FIG. 22. And also, there are many modified configurations of the current path forming circuit of the flywheel diode, some of which are shown in FIG. 23 and FIG. 24. A circuit or a device in the embodiments can be replaced with a circuit or a device having an equivalent function.

In the integration, various one-chip integration techniques based on a well-known semiconductor process may be employed. Such techniques include a one-chip integration technique in which an FET power transistor with a double diffused MOS structure can be used, a one-chip integration technique in which a CMOS-FET power transistor can be used, and a one-chip integration technique in which a bipolar power transistor can be used. The specific transistor layout in a chip depends on the design of the integrated circuit, and hence its detail description is omitted.

Although the invention has been described in its preferred forms with a certain degree of particularity, it is understood that the present disclosure of the preferred forms should be changed in the details of construction, and variations of the combination and arrangement of elements may be realized without departing from the spirit and the scope of the invention as claimed.

I claim:

1. A motor comprising:

movable body, plural-phase windings, voltage supplying means for supplying a DC voltage, Q (Q: an integer of 2 or more) pieces of first power amplifying means each including a first power transistor and forming a current path from a negative output terminal side of said voltage supplying means to one of said plural-phase windings, Q pieces of second power amplifying means each including a second power transistor and forming a current path from a positive output terminal side of said voltage supplying means to one of said plural-phase windings, altering signal producing means for producing plural-phase altering signals, first distribution control means for controlling distribution of current from said Q pieces of first power amplifying means responding with output signals of said altering signal producing means, and second distribution control means for controlling distribution of current from said Q pieces of second power amplifying means responding with output signals of said altering signal producing means, wherein, said voltage supplying means includes inductor means for storing a magnetic energy, capacitor means for storing an electric energy, switching means having a switching transistor of which current output terminal side is connected to a negative terminal side of a DC power source and a current input terminal side is connected to one end of said inductor means and performing high frequency on-off switching of a power supply path for replenishing a magnetic energy to said inductor means from said DC power source, and current path forming means forming a current path from said inductor means to a circuit including said capacitor means, by means of a complementary off-on operations corresponding to a switching on-off operations of said switching transistor, said voltage supplying means is configured so as to output a converted DC voltage between one end of said capacitor means and one end of said DC power source and supply said converted DC voltage to said Q pieces of first power amplifying means and said Q pieces of second power amplifying means, and said switching transistor, said first power transistors, said second power transistors and at least one semiconductor element are integrated together in a one-chip integrated circuit.

2. The motor in accordance with claim 1, wherein said first distribution control means and said second distribution control means are so configured to control a composed supply current to said plural-phase windings responding with a command signal by means of either said first power transistors or said second power transistors and cause said second power transistors or said first power transistors to perform saturated operations each with resistive voltage drop in activated period.

3. The motor in accordance with claim 1, wherein switching operation of said switching transistor is controlled so as to respond with voltage drops in either said first power transistors or said second power transistors.

4. The motor in accordance with claim 1, wherein said first distribution control means and said second distribution control means comprise current signal producing means for producing a first current signal and a second current signal, first distributing means for distributing said first current signal responding with output signals from said altering signal producing means and outputting smoothly varying Q-phase first distributed current signals, Q pieces of first current amplifying means for producing Q-phase first amplified current signals obtained by current amplification of said first distributed current signals and supplying each of said first amplified current signals to each of said conduction control terminal sides of said Q pieces of first power amplifying means, second distributing means for distributing said second current signal responding with output signals from said altering signal producing means and outputting smoothly varying Q-phase second distributed current signals, and Q pieces of second current amplifying means for producing Q-phase second amplified current signals obtained by current amplification of said second distributed current signals and supplying each of said second amplified current signals to each of said conduction control terminal sides of said Q pieces of second power amplifying means.

5. The motor in accordance with claim 1, wherein each of said first power amplifying means has a reversely connected first power diode as a parasitic device between the current input terminal and the current output terminal of each of said first power transistors, and each of said second power amplifying means has a reversely connected second power diode as a parasitic device between the current input terminal and the current output terminal of each of said second power transistors and said motor further comprises
  power switch means for interrupting the power supplying path between the positive terminal side of said DC power source and the current input terminal sides of said Q pieces of second power amplifying means when said DC power source is turned off, and
  voltage output means for outputting a rectified DC voltage obtained by rectifying plural-phase back electromotive forces of said plural-phase windings when said DC power source is turned off.

6. The motor in accordance with claim 1, further comprising
  bypass switch means for interrupting or connecting a current path between the positive output terminal side of said voltage supplying means and a common terminal side of said plural-phase windings, and
  shut-off means for performing or stopping current supply to said plural-phase windings from said Q pieces of second power amplifying means.

7. The motor in accordance with claim 1, wherein voltage supplying means is so configured to be able to output said converted DC voltage between one end of said capacitor means and one end of said DC power source, said converted DC voltage being larger than the DC voltage of said DC power source.

8. The motor in accordance with claim 1, wherein said switching transistor is an NMOS-FET switching transistor, each of said first power transistors is a first NMOS-FET power transistor, each of said second power transistors is a second NMOS-FET power transistor, each of said first power amplifying means includes a first power current-mirror circuit having said first NMOS-FET power transistor, and each of said second power amplifying means includes a second power current-mirror circuit having said second NMOS-FET power transistor.

9. The motor in accordance with claim 1, wherein said switching transistor is an NMOS-FET switching transistor, each of said first power transistors is a first NMOS-FET power transistor, each of said second power transistors is a second PMOS-FET power transistor, each of said first power amplifying means includes a first power current-mirror circuit having said first NMOS-FET power transistor, and each of said second power amplifying means includes a second power current-mirror circuit having said second PMOS-FET power transistor.

10. A motor comprising:

movable body, plural-phase windings, voltage supplying means having a switching transistor for outputting a converted DC voltage which is a conversion of a DC voltage of a DC power source by switching a power supply path of said DC power source with said switching transistor at a high frequency, Q (Q: an integer of 2 or more) pieces of first power amplifying means each including a first power transistor and forming a current path from a negative output terminal side of said voltage supplying means to one of said plural-phase windings, Q pieces of second power amplifying means each including a second power transistor and forming current path from a positive output terminal side of said voltage supplying means to one of said plural-phase windings, altering signal producing means for producing plural-phase altering signals, first distribution control means for controlling distribution of current from said Q pieces of first power amplifying means responding with output signals of said altering signal producing means, and second distribution control means for controlling distribution of current from said Q pieces of second power amplifying means responding with output signals of said altering signal producing means, and further comprising:
  switching control means which includes
    modulating means for producing a modulated signal by analoguely varying an amplitude in synchronization with a movement of said movable body, and
    voltage detecting means for detecting voltage drops in either said first power transistors or said second power transistors, wherein
  said switching control means controls switching operation of said switching transistor responding with an output signal of said voltage detecting means and an output signal of said modulating means.

11. The motor in accordance with claim 10, wherein said modulating means comprises modulation signal forming means for obtaining a modulation signal synchronized with a movement of said movable body, current converting means for obtaining a converted current signal responding with the converted DC voltage of said voltage supplying means, and current modulating means for modulating said converted current signal by means of said modulation signal thereby to obtain a modulated current signal.

12. The motor in accordance with claim 10, wherein said first distribution control means and said second distribution control means control a composed supply current to said plural-phase windings responding with a command signal by means of either said first power transistors or said second power transistors of which said voltage detecting means detects the voltage drops and cause said second power transistors or said first power transistors of which said voltage detecting means does not detect voltage drops to perform saturated operations each with resistive voltage drop in activated period.

13. The motor in accordance with claim 10, wherein said first distribution control means and said second distribution control means comprise current signal producing means for producing a first current signal and a second current signal, first distributing means for distributing said first current signal responding with output signals from said altering signal producing means and outputting smoothly varying Q-phase first distributed current signals, Q pieces of first current amplifying means for producing Q-phase first amplified current signals obtained by current amplification of said first distributed current signal and supplying each of said first amplified current signals to each of said conduction control terminal sides of said Q pieces of first power amplifying means, second distributing means for distributing said second current signals responding with output signals from said altering signal producing means and outputting smoothly varying Q-phase second distributed current signals, and Q pieces of second current amplifying means for producing Q-phase second amplified current signals obtained by current amplification of said second distributed current signals and supplying each of said second amplified current signals to each of said conduction control terminal sides of said Q pieces of second power amplifying means.

14. The motor in accordance with claim 10, wherein said voltage supplying means comprises inductor means for storing a magnetic energy, capacitor means for storing an electric energy, switching means having a switching transistor of which a current output terminal side is connected to a negative terminal side of said DC power source and of which a current input terminal side is connected to one end of said inductor means and performing high frequency on-off switching of the power supply path for replenishing a magnetic energy to said inductor means from said DC power source, and current path forming means forming a current path from said inductor means to a circuit including said capacitor means, by means of a complementary off-on operations corresponding to a switching on-off operations of said switching transistor, and said voltage supplying means is configured so as to output a converted DC voltage between one end of said capacitor means and one end of said DC power source and supply said converted DC voltage to said Q pieces of first power amplifying means and said Q pieces of second power amplifying means.

15. The motor in accordance with claim 14, wherein voltage supplying means is so configured to be able to output said converted DC voltage between one end of said capacitor means and one end of said DC power source, said converted DC voltage being larger than the DC voltage of said DC power source.

16. The motor in accordance with claim 10, wherein each of said first power amplifying means has a reversely connected first power diode as a parasitic device between the current input terminal and the current output terminal of each of said first power transistors, and each of said second power amplifying means has a reversely connected second power diode as a parasitic device between the current input terminal and the current output terminal of each of said second power transistors, and said motor further comprises power switch means for interrupting the power supplying path between the positive terminal side of said DC power source and the current input terminal sides of said Q pieces of second power amplifying means when said DC power source is turned off, and voltage output means for outputting a rectified DC voltage obtained by rectifying plural-phase back electromotive forces of said plural-phase windings when said DC power source is turned off.

17. The motor in accordance with claim 10, further comprising bypass switch means for interrupting or connecting a current path between the positive output terminal side of said voltage supplying means and a common terminal side of said plural-phase windings, and shut-off means for performing or stopping current supply to said plural-phase windings from said Q pieces of second power amplifying means.

18. The motor in accordance with claim 10, wherein said switching transistor is an NMOS-FET switching transistor, each of said first power transistors is a first NMOS-FET power transistor, each of said second power transistors is a second NMOS-FET power transistor, each of said first power amplifying means includes a first power current-mirror circuit having said first NMOS-FET power transistor, and each of said second power amplifying means includes a second power current-mirror circuit having said second NMOS-FET power transistor.

19. The motor in accordance with claim 10, wherein said switching transistor is an NMOS-FET switching transistor, each of said first power transistors is a first NMOS-FET power transistor, each of said second power transistors is a second PMOS-FET power transistor, each of said first power amplifying means includes a first power current-mirror circuit having said first NMOS-FET power transistor, and each of said second power amplifying means includes a second power current-mirror circuit having said second PMOS-FET power transistor.

20. A motor comprising:

movable body, plural-phase windings, voltage supplying means for supplying a DC voltage, Q (Q: an integer of 2 or more) pieces of first power amplifying means each including a first FET power current-mirror circuit having a first FET power transistor and forming a current path from a negative output terminal side of said voltage supplying means to one of said plural-phase windings, Q pieces of second power amplifying means each including a second FET power current-mirror circuit having a second FET power transistor and forming a current path from a positive output terminal side of said voltage supplying means to one of said plural-phase windings, altering signal producing means for producing plural-phase altering signals, first distribution control means for producing first Q-phase current signals, each analoguely varying at least in rising and falling slopes, responding with output signals of said altering signal producing means and supplying said first Q-phase current signals to conduction control terminal sides of said Q pieces of first power amplifying means, respectively, and second distribution control means for producing second Q-phase current signals, each analoguely varying at least in rising and falling slopes, responding with output signals of said altering signal producing means and supplying said second Q-phase current signals to conduction control terminal sides of said Q pieces of second power amplifying means, respectively.

21. The motor in accordance with claim 20, wherein said first distribution control means and said second distribution control means control a composed supply current to said plural-phase windings responding with a command signal by means of either said first FET power transistors or said second FET power transistors and cause said second FET power transistors or said first FET power transistors to perform saturated operations each with resistive voltage drop in activated period.

22. The motor in accordance with claim 20, wherein said voltage supplying means comprises inductor means for storing a magnetic energy, capacitor means for storing an electric energy, switching means having a switching transistor of which a current output terminal side is connected to a negative terminal side of a DC power source and of which a current input terminal side is connected to one end of said inductor means and performing high frequency on-off switching of the power supply path for replenishing a magnetic energy to said inductor means from a DC power source, and current path forming means forming a current path from said inductor means to a circuit including said capacitor means, by means of a complementary off-on operations corresponding to a switching on-off operations of said switching transistor, and said voltage supplying means is configured so as to output a converted DC voltage between one end of said capacitor means and one end of said DC power source and supply said converted DC voltage to said Q pieces of first power amplifying means and said Q pieces of second power amplifying means.

23. The motor in accordance with claim 22, wherein voltage supplying means is so configured to be able to output said converted DC voltage between one end of said capacitor means and one end of said DC power source, said converted DC voltage being larger than the DC voltage of said DC power source.

24. The motor in accordance with claim 20, wherein each of said first power amplifying means has a reversely connected first power diode as a parasitic device between the current input terminal and the current output terminal of each of said first FET power transistors, and each of said second power amplifying means has a reversely connected second power diode as a parasitic device between the current input terminal and the current output terminal of each of said second FET power transistors, and said motor further comprises power switch means for interrupting a power supplying path between a positive terminal side of a DC power source of said voltage supplying means and the current input terminal sides of said Q pieces of second power amplifying means when said DC power source is turned off, and voltage output means for outputting a rectified DC voltage obtained by rectifying plural-phase back electromotive forces of said plural-phase windings when said DC power source is turned off.

25. The motor in accordance with claim 20, further comprising bypass switch means 700 for interrupting or connecting a current path between the positive output terminal side of said voltage supplying means and a common terminal side of said plural-phase windings, and shut-off means for performing or stopping current supply to said plural-phase windings from said Q pieces of second power amplifying means.

26. The motor in accordance with claim 20, wherein each of said first FET power transistors is a first NMOS-FET power transistor, and each of said second FET power transistors is a second NMOS-FET power transistor.

27. The motor in accordance with claim 20, wherein each of said first FET power transistors is a first NMOS-FET power transistor, and each of said second FET power transistors is a second PMOS-FET power transistor.

28. The motor in accordance with claim 20, wherein said first distribution control means and said second distribution control means comprise current signal producing means for producing a first current signal and a second current signal, first distributing means for distributing said first current signal responding with output signals of said altering signal producing means and outputting smoothly varying Q-phase first distributed current signals, Q pieces of first current amplifying means for supplying first amplified current signals responding with said first distributed current signals to conduction control terminal sides of said Q pieces of first power amplifying means, respectively, second distributing means for distributing said second current signal responding with output signals of said altering signal producing means and outputting smoothly varying Q-phase second distributed current signals, and Q pieces of second current amplifying means for supplying second amplified current signals responding with said second distributed current signals to conduction control terminal sides of said Q pieces of second power amplifying means, respectively.

29. The motor in accordance with claim 28, wherein said current signal forming means comprises current detecting means for obtaining a current detected signal responding with a supply current to said windings, and comparing means for comparing an output signal of said current detecting means with said command signal and outputting said first current signal and said second current signal responding with the result of said comparison.

30. A motor comprising:

movable body, plural-phase windings, voltage supplying means for supplying a DC voltage, Q (Q: an integer of 2 or more) pieces of first power amplifying means each including a first power transistor and forming a current path from a negative output terminal side of said voltage supplying means to one of said plural-phase windings, Q pieces of second power amplifying means each including a second power transistor and forming a current path from a positive output terminal side of said voltage supplying means to one of said plural-phase windings, altering signal producing means for producing plural-phase altering signals, first distribution control means for controlling distribution of current from said Q pieces of first power amplifying means responding with output signals of said altering signal producing means, and second distribution control means for controlling distribution of current from said Q pieces of second power amplifying means responding with output signals of said altering signal producing means, and further comprising:

bypass switch means having a bypass transistor for interrupting or connecting a current path between the positive output terminal side of said voltage supplying means and a common terminal side of said plural-phase windings, shut-off means having a shut-off transistor for connecting or interrupting a current path between the positive output terminal side of said voltage supplying means and the current input terminal sides of said second power amplifying means, and diode means allowing uni-directional current flow from a current output terminal side toward a current input terminal side of at least one of said second power transistors.

31. The motor in accordance with claim 30, wherein said shut-off transistor is an FET shut-off transistor connected reversely so as to form a parasitic diode device connected from the current input terminal side toward the current output terminal side of said FET shut-off transistor.

32. The motor in accordance with claim 30, wherein said first distribution control means and said second distribution control means control a composed supply current to said plural-phase windings responding with a command signal by means of said first power transistors and cause said second power transistors to perform saturated operations each with resistive voltage drop in activated period.

33. The motor in accordance with claim 30, wherein said first distribution control means and said second distribution control means comprise current signal producing means for producing a first current signal and a second current signal, first distributing means for distributing said first current signal responding with output signals from said altering signal producing means and outputting smoothly varying Q-phase first distributed current signals, Q pieces of first current amplifying means for producing Q-phase first amplified current signals obtained by current amplification of said first distributed current signals and supplying each of said first amplified current signals to each of said conduction control terminal sides of said Q pieces of first power amplifying means, second distributing means for distributing said second current signal responding with output signals from said altering signal producing means and outputting smoothly varying Q-phase second distributed current signals, and Q pieces of second current amplifying means for producing Q-phase second amplified current signals obtained by current amplification of said second distributed current signals and supplying each of said second amplified current signals to each of said conduction control terminal sides of said Q pieces of second power amplifying means.

34. The motor in accordance with claim 30, wherein said voltage supplying means comprises inductor means for storing a magnetic energy, capacitor means for storing an electric energy, switching means having a switching transistor of which a current output terminal side is connected to a negative terminal side of a DC power source and of which a current input terminal side is connected to one end of said inductor means and performing high frequency on-off switching of the power supply path for replenishing a magnetic energy to said inductor means from said DC power source, and current path forming means forming a current path from said inductor means to a circuit including said capacitor means, by means of a complementary off-on operations corresponding to a switching on-off operations of said switching transistor, and said voltage supplying means is configured so as to output a converted DC voltage between one end of said capacitor means and one end of said DC power source and supply said converted DC voltage to said Q pieces of first power amplifying means and said Q pieces of second power amplifying means.

35. The motor in accordance with claim 34, wherein switching operation of said switching transistor is controlled so as to respond with voltage drops in said first power transistors.

36. The motor in accordance with claim 34, wherein said voltage supplying means is so configured to be able to output said converted DC voltage between one end of said capacitor means and one end of said DC power source, said converted DC voltage being larger than the DC voltage of said DC power source.

37. The motor in accordance with claim 30, wherein each of said first power amplifying means has a reversely connected first power diode as a parasitic device between the current input terminal and the current output terminal of each of said first power transistors, and each of said second power amplifying means has a reversely connected second power diode as a parasitic device between the current input terminal and the current output terminal of each of said second power transistors, and said motor further comprises power switch means for interrupting a power supplying path between a positive terminal side of a DC power source of said voltage supplying means and the current input terminal sides of said Q pieces of second power amplifying means when said DC power source is turned off, and voltage output means for outputting a rectified DC voltage obtained by rectifying plural-phase back electromotive forces of said plural-phase windings when said DC power source is turned off.

38. The motor in accordance with claim 30, wherein each of said first power transistors is a first FET power transistor, each of said second power transistors is a second FET power transistor, said bypass transistor is an FET bypass transistor, and said shut-off transistor is an FET shut-off transistor.

39. The motor in accordance with claim 30, further comprising one-chip integrated circuit for integrating said first power transistors, said second power transistors, said bypass transistor, said shut-off transistor and at least one semiconductor element all together, said diode means including parasitic diode elements each of which is formed as a parasitic device from the current output terminal side toward the current input terminal side of each of said second power transistors.

40. A motor comprising:

movable body, plural-phase windings, voltage supplying means for supplying a DC voltage, Q (Q: an integer of 2 or more pieces of first power amplifying means each including a first NMOS-FET power transistor and forming a current path from a negative output terminal side of said voltage supplying means to one of said plural-phase windings, Q pieces of second power amplifying means each including a second PMOS-FET power transistor and forming a current path from a positive output terminal side of said voltage supplying means to one of said plural-phase windings, altering signal producing means for producing plural-phase altering signals, first distribution control means for controlling distribution of current from said Q pieces of first power amplifying means responding with output signals of said altering signal producing means, second distribution control means for controlling distribution of current from said Q pieces of second power amplifying means responding with output signals of said altering signal producing means, power switch means having a PMOS-FET power switch transistor for connecting a power supplying path from a positive terminal side of a DC power source of said voltage supplying means toward the current input terminal sides of said Q pieces of second power amplifying means when said DC power source is on, and for interrupting the power supplying path between the positive terminal side of said DC power source and the current input terminal sides of said Q pieces of second power amplifying means when said DC power source is turned off, and voltage output means for outputting a rectified DC voltage obtained by rectifying plural-phase back electromotive forces of said plural-phase windings when said DC power source is turned off.

41. The motor in accordance with claim 40, wherein said first distribution control means and said second distribution control means control a composed supply current to said plural-phase windings responding with a command signal by means of either said first NMOS-FET power transistors or said second PMOS-FET power transistors and cause said second PMOS-FET power transistors or said first NMOS-FET power transistors to perform saturated operations each with resistive voltage drop in activated period, when said PMOS-FET power switch transistor connects the power supplying path.

42. The motor in accordance with claim 40, wherein said voltage supplying means further comprises inductor means for storing a magnetic energy, capacitor means for storing an electric energy, switching means having a switching transistor of which a current output terminal side is connected to the negative terminal side of said DC power source and of which a current input terminal side is connected to one end of said inductor means and performing high frequency on-off switching of the power supply path for replenishing a magnetic energy to said inductor means from said DC power source, and current path forming means forming a current path from said inductor means to a circuit including said capacitor means, by means of a complementary off-on operations corresponding to a switching on-off operations of said switching transistor, and said voltage supplying means is configured so as to output a converted DC voltage between one end of said capacitor means and one end of said DC power source and supply said converted DC voltage to said Q pieces of first power amplifying means and said Q pieces of second power amplifying means.

43. The motor in accordance with claim 42, wherein switching operation of said switching transistor is controlled so as to respond with voltage drops in either said first NMOS-FET power transistors or said second PMOS-FET power transistors.

44. The motor in accordance with claim 42, wherein voltage supplying means is so configured to be able to output converted DC voltage between one end of said capacitor means and one end of said DC power source, said converted DC voltage being larger than the DC voltage of said DC power source.

45. The motor in accordance with claim 40, further comprising bypass switch means for interrupting or connecting a current path between the positive output terminal side of said voltage supplying means and a common terminal side of said plural-phase windings, and shut-off means for performing or stopping current supply to said plural-phase windings from said Q pieces of second power amplifying means.

46. The motor in accordance with claim 40, wherein each of said first power amplifying means includes a first FET power current-mirror circuit having said first NMOS-FET power transistor, and each of said second power amplifying means includes a second FET power current-mirror circuit having said second PMOS-FET power transistor.

47. The motor in accordance with claim 40, wherein said PMOS-FET power switch transistor is connected reversely so as to form a parasitic diode device connected from the current input terminal side toward the current output terminal side of said PMOS-FET power switch transistor.

* * * * *